US012808492B2

(12) United States Patent
Freeman et al.

(10) Patent No.: US 12,808,492 B2
(45) **Date of Patent: *Nov. 24, 2026**

(54) RENEWABLE DIESEL INTERFACE RECOMBINATION

(71) Applicant: Marathon Petroleum Company LP, Findlay, OH (US)

(72) Inventors: Matthew T. Freeman, Findlay, OH (US); R. Benjamin Hill, Findlay, OH (US); Terry Riesen, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,988

(22) Filed: Jun. 20, 2025

(65) Prior Publication Data

US 2025/0314358 A1 Oct. 9, 2025

Related U.S. Application Data

(63) Continuation of application No. 18/760,138, filed on Jul. 1, 2024, now Pat. No. 12,345,380, which is a (Continued)

(51) Int. Cl.

*F17D 3/03* (2006.01)
*C10L 1/08* (2006.01)

(52) U.S. Cl.

CPC .................. *F17D 3/03* (2013.01); *C10L 1/08* (2013.01); *C10L 2200/0446* (2013.01);

(Continued)

(58) Field of Classification Search

CPC .......... Y10T 137/063; F17D 3/03; C10L 1/08; C10L 2200/0446; C10L 2230/14; C10L 2270/026

(Continued)

(56) References Cited

U.S. PATENT DOCUMENTS 3,972,340 A * 8/1976 Miller ................ F02M 37/0023 180/282
5,193,594 A * 3/1993 Johansson .............. B67D 7/744 366/132

(Continued)

*Primary Examiner* — William M McCalister

(74) *Attorney, Agent, or Firm* — Ray Quinney & Nebeker P.C.; Daniel J. Bezdjian

(57) ABSTRACT

Methods and systems for, among other embodiments, transporting renewable diesel (RD) through a pipeline, or a portion thereof, are provided. In certain embodiments, the method may include transporting the renewable diesel from a first pipeline terminal to a second pipeline terminal, the renewable diesel wrapped head and tail with a compatible diesel fuel. The method may also include restricting the transport of the diesel fuel in the pipeline to diesel fuel compositions having a first composition or first specification, the first composition or first specification characterized by a selected amount of the renewable diesel, or a component thereof, the selected amount being less than the selected amount allowed in a second target specification for the diesel fuel. The method may also include combining, at the second pipeline terminal, at least a portion of the mixed interface fraction stream with at least a portion of the diesel fuel fraction stream so as to produce a diesel fuel stream meeting the second target specification.

21 Claims, 10 Drawing Sheets

Related U.S. Application Data continuation of application No. 18/637,651, filed on Apr. 17, 2024, now Pat. No. 12,092,270, which is a continuation of application No. 18/382,377, filed on Oct. 20, 2023, now Pat. No. 11,994,259.

(60) Provisional application No. 63/463,351, filed on May 2, 2023, provisional application No. 63/380,428, filed on Oct. 21, 2022.

(52) U.S. Cl.
CPC ..... *C10L 2230/14* (2013.01); *C10L 2270/026* (2013.01); *Y10T 137/0363* (2015.04)

(58) Field of Classification Search
USPC .............................................................. 137/9
See application file for complete search history.

(56) References Cited

U.S. PATENT DOCUMENTS

| | | | | | |
|---|---|---|---|---|---|
| 5,271,526 | A * | 12/1993 | Williams | G05D 11/132 | 377/16 |
| 5,430,295 | A * | 7/1995 | Le Febre | G01N 33/2829 | 250/340 |
| 6,966,326 | B2 * | 11/2005 | Murray | G05D 11/131 | 422/62 |
| 7,302,301 | B2 * | 11/2007 | Becker | G05B 19/4185 | 710/1 |
| 7,720,575 | B2 * | 5/2010 | Ferber | G05D 7/0647 | 700/282 |
| 8,506,656 | B1 * | 8/2013 | Turocy | C10L 10/02 | 44/451 |
| 8,597,380 | B2 * | 12/2013 | Buchanan | C10L 1/1824 | 585/14 |
| 9,080,111 | B1 * | 7/2015 | Huff | C10G 29/205 | |
| 9,773,097 | B2 * | 9/2017 | Mu | G16C 20/40 | |
| 10,480,718 | B2 * | 11/2019 | Robbins | F16K 37/0091 | |
| 10,605,411 | B2 * | 3/2020 | Robbins | F17D 1/08 | |
| 11,132,008 | B2 * | 9/2021 | Miller | B01F 35/2134 | |
| 11,378,234 | B2 * | 7/2022 | Rady | F17D 3/05 | |
| 11,441,088 | B2 * | 9/2022 | Robbins | G05D 11/132 | |
| 2005/0022446 | A1 * | 2/2005 | Brundage | C10L 1/06 | 44/451 |
| 2005/0058016 | A1 * | 3/2005 | Smith | G05D 11/132 | 366/152.1 |
| 2009/0322544 | A1 * | 12/2009 | McDowell | F17D 5/06 | 73/40.5 R |
| 2015/0093101 | A1 * | 4/2015 | Lee | F24H 1/102 | 392/488 |
| 2020/0291316 | A1 * | 9/2020 | Robbins | G05D 11/138 | |
| 2021/0192388 | A1 * | 6/2021 | Cunningham | F17D 3/00 | |
| 2021/0254793 | A1 * | 8/2021 | Rady | G05D 7/0652 | |

* cited by examiner

RENEWABLE DIESEL INTERFACE RECOMBINATION

CROSS REFERENCE TO RELATED APPLICATIONS

This application is a continuation of U.S. application Ser. No. 18/760,138, filed Jul. 1, 2024, which is a continuation of U.S. application Ser. No. 18/637,651, filed Apr. 17, 2024, titled "RENEWABLE DIESEL INTERFACE RECOMBINATION," now U.S. Pat. No. 12,092,270, issued Sep. 17, 2024, which is a continuation of U.S. application Ser. No. 18/382,377, filed Oct. 20, 2023, titled "RENEWABLE DIESEL INTERFACE RECOMBINATION," now U.S. Pat. No. 11,994,259, issued May 28, 2024, which claims priority to and the benefit of U.S. Provisional Application No. 63/463,351, filed May 2, 2023, titled "RENEWABLE DIESEL INTERFACE RECOMBINATION," and U.S. Provisional Application No. 63/380,428, filed Oct. 21, 2022, titled "RENEWABLE DIESEL INTERFACE REINJECTION," the disclosures of which are incorporated herein by reference in their entireties.

TECHNICAL FIELD

The present disclosure generally relates to methods and systems for transporting fuels through a pipeline. More specifically, the present disclosure relates to, the movement of compatible fuels, such as renewable diesel and substantially non-renewable diesel fuel, through pipelines while minimizing reclassification losses during transport due to the formation of mixed interfaces.

BACKGROUND

Fuels are commonly transported or moved through pipelines, including through common carrier pipelines. Pipelines are widely considered the safest, most cost-effective, and efficient mode of transporting fuels, available which contributes widely to affordable power generation and use. However, a disadvantage of transport by pipelines is that during the transport of a given movement of fuel between pipeline terminals the fuel necessarily interfaces with the preceding and subsequent movements of fuel to form mixed interfaces that must be cut out from the unmixed fuel volumes at the receiving terminal. The mixed interface volumes generated during pipeline transport are generally transported back to a refinery for re-processing and lose their fuel classification. Therefore, mixed interface volumes resulting from movement in pipelines represents lost fuel product that cannot be used or marketed for its intended purpose and that is not eligible for government credits or intended labeling. As a result, the formation of mixed interface volumes during fuel transport in pipelines significantly affects the cost and efficiency of pipeline operations. Accordingly, the Applicant has recognized that methods and systems for reducing or minimizing the mixed interface volumes that result or remain from fuel pipeline movements are desirable.

SUMMARY

To address these shortcomings, Applicant has developed methods and systems for transporting renewable diesel (RD) through a pipeline between pipeline terminals. In at least certain embodiments, the presently disclosed methods and system are capable of transporting renewable diesel through a pipeline while substantially reducing or eliminating the mixed interface volume losses that typically result from the transport or movement of renewable diesel through a pipeline, including common carrier pipelines that transport fuels other than renewable diesel. The present disclosure also provides methods and systems for transporting two different but compatible fuels through a pipeline from a first terminal to a second terminal, while also reducing or eliminating the mixed interface volume losses that typically result from the transport or movement of compatible fuels through a common carrier pipeline. Compatible fuels may include, for example, among other potential embodiments, two transportation fuels that may be combined or partially combined with each other without necessarily having to be relabeled, reclassified, or sent back to a refinery or similar facility for reprocessing.

According to at least one aspect of the present disclosure, a method for transporting renewable diesel (RD) through a pipeline, or a portion thereof, is provided. In certain embodiments, the method may include transporting the renewable diesel from a first pipeline terminal to a second pipeline terminal with the renewable diesel wrapped head and tail with a diesel fuel, such that a pipeline movement of a diesel fuel both immediately precedes and immediately follows the movement of the renewable diesel in the pipeline so that both the head and tail of the renewable diesel directly interfaces with the diesel fuel generating a mixed interface.

The method may further include restricting the transport of the diesel fuel in the pipeline to diesel fuel compositions having a first composition or first specification. In certain embodiments, the first composition or first specification may be characterized by a selected amount or, in another embodiment, a maximum amount of the renewable diesel, or a component thereof. The selected amount may be less than the selected amount allowed in a second target specification for the diesel fuel. The method may also include separating, at the second terminal, a renewable diesel fraction stream, a diesel fuel fraction stream, and a mixed interface fraction stream. The mixed interface fraction stream may be a mixture of the renewable diesel and diesel fuel resulting from interfacial mixing during transport of the renewable diesel and the diesel fuel from the first pipeline terminal to the second pipeline terminal. The method may further include combining at least a portion of the mixed interface fraction stream with at least a portion of the diesel fuel fraction stream so as to produce a diesel fuel stream meeting the second target specification. Some embodiments may include injecting at least a portion of the mixed interface fraction stream into the diesel fuel fraction stream, or portion thereof, so as to produce a diesel fuel stream meeting the second target specification.

In certain embodiments, the method may further include restricting the transport of the diesel fuel in the pipeline to diesel fuel compositions having 2% by volume or less of renewable diesel. In certain embodiments, the diesel fuel may be California Air Resources Board (CARB) Ultra Low Sulfur Diesel Fuel (ULSD) No. 2 and the second target specification for the diesel fuel may be the Federal Trade Commission (FTC) Label Law limit of less than 5% Renewable Diesel (RD) in CARB ULSD No. 2.

In certain embodiments, the method may include restricting the transport of renewable diesel in the pipeline, or pipeline segment thereof, to renewable diesel movements having a selected or maximum volume of 10,000 barrels, or a selected or maximum volume of 12,500 barrels, or a selected or maximum volume of 15,000 barrels. As noted, the selected amount may be the maximum amount. In another embodiment, the selected amount may include another amount other than the maximum amount. In certain embodiments, the method may further include restricting the transport of the diesel fuel in the pipeline, or pipeline segment thereof, to diesel fuel movements having a minimum volume of 20,000 barrels, or a minimum volume of 30,000 barrels, or a minimum volume of 40,000 barrels.

In certain embodiments, the method may further include restricting the transport of renewable diesel and diesel fuel in the pipeline, or pipeline segment thereof, to a total volumetric flow ratio of no less than about 20,000 barrels diesel fuel for every 10,000 barrels of renewable diesel. In certain other embodiments, the method may further include restricting the transport of renewable diesel and diesel fuel in the pipeline, or pipeline segment thereof, to a total volumetric flow ratio of no less than about 30,000 barrels diesel fuel for every 10,000 barrels of renewable diesel. In still other embodiments, the method may further include restricting the transport of renewable diesel and diesel fuel in the pipeline, or pipeline segment thereof, to a total volumetric flow ratio of no less than about 40,000 barrels diesel fuel for every 10,000 barrels of renewable diesel.

According to another aspect of the present disclosure, a method for transporting renewable diesel through a pipeline, or a portion thereof, with substantially reduced or substantially no mixed interface losses is provided. The method may include providing a diesel fuel compatible with the renewable diesel. The diesel fuel may have a first predetermined composition comprising a selected or maximum amount of the renewable diesel, or a component thereof. The selected or maximum amount may be less than the selected or maximum amount allowed in a second target composition for the diesel fuel. The method may further include transporting, from a first pipeline terminal to a second pipeline terminal, a first movement of the diesel fuel having the first predetermined composition. The method may further include transporting, from the first pipeline terminal to the second pipeline terminal, a first movement of the renewable diesel immediately sequentially following the first movement of the diesel fuel having the first predetermined composition, such that the head of the first movement of the renewable diesel is wrapped by (e.g., interfaces with) the tail of the first movement of the diesel fuel having the first predetermined composition generating a mixed interface between the renewable diesel and the diesel fuel. The method may further include transporting, from the first pipeline terminal to the second pipeline terminal, a second movement of the diesel fuel having the first predetermined composition immediately sequentially following the first movement of the renewable diesel, such that the tail of the first movement of the renewable diesel is wrapped by (e.g., interfaces with) the head of the second movement of the diesel fuel having the first predetermined composition generating a mixed interface between the renewable diesel.

The method may further include separating, at the second terminal, a renewable diesel fraction stream, a diesel fuel having the first predetermined composition fraction stream, and a mixed interface fraction stream. The mixed interface fraction stream may comprise a mixture of the renewable diesel and the diesel fuel having the first predetermined composition resulting from interfacial mixing during transport of the renewable diesel and the diesel fuel from the first pipeline terminal to the second pipeline terminal. The method may further include combining at least a portion of the mixed interface fraction stream with at least a portion of the diesel fuel having the first predetermined composition fraction stream so as to produce a diesel fuel stream having the second target composition. Some embodiments may include injecting at least a portion of the mixed interface fraction stream into the diesel fuel having the first predetermined composition fraction stream so as to produce a diesel fuel stream having the second target specification.

According to another aspect of the present disclosure, a method for substantially eliminating or substantially reducing the loss of mixed interface generated by a plurality of pipeline movements of renewable diesel is provided. The method may include transporting renewable diesel from a first pipeline terminal to a second pipeline terminal with the renewable diesel wrapped head and tail with a diesel fuel compatible with the renewable diesel, such that a pipeline movement of a diesel fuel both immediately precedes and immediately follows the movement of the renewable diesel in the pipeline so that both the head and tail of the renewable diesel directly interfaces with the diesel fuel generating a mixed interface. The method may further include restricting the transport of the diesel fuel in the pipeline to diesel fuel compositions having a first composition or first specification. The first composition or first specification may be characterized by a selected or maximum amount of the renewable diesel, or a component thereof. The selected or maximum amount may be less than the selected or maximum amount allowed in a second target specification for the diesel fuel. The method may further include separating, at the second terminal, a renewable diesel fraction stream, a diesel fuel fraction stream, and an interface fraction stream. The interface fraction stream may comprise a mixture of the renewable diesel and diesel fuels. The method may further include transporting the interface fraction stream from the second terminal to a third pipeline terminal with the interface fraction stream wrapped in (e.g., interfaces with) a head and a tail that is different from the head. The tail and head may be selected from the renewable diesel fraction stream and the diesel fuel fraction stream. The method may further include separating, at the third terminal, a renewable diesel fraction stream, a diesel fuel fraction stream, and an interface fraction stream. The interface fraction stream may comprise a mixture of the renewable diesel and diesel fuels. The method may further include combining, at the third terminal, at least a portion of the interface fraction stream with at least a portion of the diesel fuel fraction stream so as to produce a diesel fuel stream meeting the second target specification. Some embodiments may include injecting, at the third terminal, at least a portion of the interface fraction stream into the diesel fuel fraction stream so as to produce a diesel fuel stream meeting the second target specification.

According to another aspect of the present disclosure, a method for substantially eliminating or substantially reducing the loss of mixed interface generated by a plurality of pipeline movements of renewable diesel through a pipeline is provided. The method may include providing a diesel fuel compatible with renewable diesel. The diesel fuel may have a first predetermined composition comprising a selected or maximum amount of the renewable diesel, or a component thereof. The selected or maximum amount may be less than the selected or maximum amount allowed in a second target composition for the diesel fuel. The method may further include transporting, from a first pipeline terminal to a second pipeline terminal, a first movement of the diesel fuel having the first predetermined composition. The method may further include transporting, from the first pipeline terminal to the second pipeline terminal, a first movement of the renewable diesel immediately sequentially following The first movement of the diesel fuel having the first predetermined composition, such that the head of the first movement of the renewable diesel is wrapped by (e.g., interfaces with) the tail of the first movement of the diesel fuel having the first predetermined composition, thereby generating a mixed interface. The method may further include transporting, from the first pipeline terminal to the second pipeline terminal, a second movement of the diesel fuel having the first predetermined composition immediately sequentially following the first movement of the renewable diesel, such that the tail of the first movement of the renewable diesel is wrapped by (e.g., interfaces with) the head of the second movement of the diesel fuel having the first predetermined composition, thereby generating a mixed interface. The method may further include separating, at the second terminal, a renewable diesel fraction stream, a diesel fuel having the first predetermined composition fraction stream, and a mixed Interface fraction stream. The mixed interface fraction stream may comprise a mixture of the renewable diesel and the diesel fuel having the first predetermined composition.

The method may further include transporting, from the second pipeline terminal to the third pipeline terminal, a third movement of the diesel fuel having the first predetermined composition. The method may further include transporting, from the second pipeline terminal to the third pipeline terminal, the mixed interface fraction stream immediately sequentially following the third movement of the diesel fuel having the first predetermined composition, such that the head of the mixed interface fraction stream is wrapped by (e.g., interfaces with) the tail of the third movement of the diesel fuel having the first predetermined composition. The method may further include transporting, from the second pipeline terminal to the third pipeline terminal, a second movement of the renewable diesel immediately sequentially following the mixed interface fraction stream, such that the tail of the mixed interface fraction stream is wrapped by (e.g., interfaces with) the head of the second movement of the renewable diesel. The method may further include separating, at the third terminal, a renewable diesel fraction stream, a diesel fuel fraction stream having the first predetermined composition, and a mixed interface fraction stream. The mixed interface fraction stream may comprise a mixture of the renewable diesel and diesel fuels. The method may further include combining, at the third terminal, at least a portion of the mixed interface fraction stream with at least a portion of the second fuel fraction stream having the first predetermined composition, so as to produce a diesel fuel stream having the second target composition. Some embodiments may include injecting, at the third terminal, at least a portion of the mixed interface fraction stream into at least a portion of the second fuel fraction stream having the first predetermined composition, so as to produce a diesel fuel stream having the second target composition.

According to another aspect of the present disclosure, a method for transporting two compatible fuels through a pipeline, or a portion thereof, is provided. As used herein, the term "compatible fuel," in all of its forms, including a "first compatible fuel" and a "second compatible fuel," refers to a fuel that may be combined or partially combined with another compatible fuel without necessarily having to be relabeled, reclassified, or sent back to a refinery or similar facility for reprocessing. Therefore, the term "compatible fuel" refers to a fuel that may at least under certain circumstances be combined or mixed, or partially combined or mixed, with another compatible fuel without having to be relabeled, reclassified, or reprocessed at a refinery or similar facility. Accordingly, the term "compatible fuels," as used herein, refers to two fuels that may be combined or partially combined with each other without necessarily have to be relabeled, reclassified, or sent back to a refinery or similar facility for reprocessing. Some non-limiting examples of compatible fuels may include, for example, transportation fuels such as renewable diesel, diesel fuel, and biodiesel. Other compatible fuels that may be moved through pipelines are also within the scope and spirit of the present disclosure. The method may include transporting a first fuel from a first pipeline terminal to a second pipeline terminal with the first fuel wrapped head and tail with a second fuel compatible with the first fuel, such that a pipeline movement of a second fuel both immediately precedes and immediately follows the movement of the first fuel in the pipeline so that both the head and tail of the first fuel directly interfaces with the second fuel generating a mixed interface. The method may further include restricting the transport of the second fuel in the pipeline to second fuel compositions having a first composition or first specification. The first composition or first specification may be characterized by a selected or maximum amount of the first fuel, or a component thereof. The selected or maximum amount may be less than the selected or maximum amount allowed in a second target specification for the second fuel. The method may further include separating, at the second terminal, a first fuel fraction stream, a second fuel fraction stream, and an interface fraction stream. The interface fraction stream may be a mixture of the first and second fuels resulting from interfacial mixing during transport of the first fuel and the second fuel from the first pipeline terminal to the second pipeline terminal. The method may further include combining at least a portion of the mixed interface fraction stream with at least a portion of the second fuel fraction stream so as to produce a second fuel stream meeting the second target specification. Some embodiments may include injecting at least a portion of the mixed interface fraction stream into the second fuel fraction stream to produce a second fuel stream meeting the second target specification.

In certain embodiments, the method may further include restricting the transport of the second fuel in the pipeline, or segment thereof to first compositions or first specifications having a selected or maximum amount of the first fuel, or a component thereof, that is 60% or less of the selected or maximum amount allowed in the second target specification. In certain embodiments, the method may include restricting the transport of the first fuel in the pipeline, or pipeline segment thereof, to first fuel movements having a selected or maximum volume of 10,000 barrels, or a selected or maximum volume of 12,500 barrels, or a selected or maximum volume of 15,000 barrels. In certain embodiments, the method may further include restricting the transport of the second fuel in the pipeline, or pipeline segment thereof, to second fuel movements having a minimum volume of 20,000 barrels, or a minimum volume of 30,000 barrels, or a minimum volume of 40,000 barrels.

In certain embodiments, the method may further include restricting the transport of the first fuel and the second fuel in the pipeline, or pipeline segment thereof, to a total volumetric flow ratio of no less than about 20,000 barrels second fuel for every 10,000 barrels of first fuel. In certain other embodiments, the method may further include restricting the transport of first fuel and second fuel in the pipeline, or pipeline segment thereof, to a total volumetric flow ratio of no less than about 30,000 barrels second fuel for every 10,000 barrels of first fuel. In still other embodiments, the method may further include restricting the transport of renewable diesel and diesel fuel in the pipeline, or pipeline segment thereof, to a total volumetric flow ratio of no less than about 40,000 barrels second fuel for every 10,000 barrels of first fuel.

According to another aspect of the present disclosure, a method for transporting a first fuel through a pipeline, or a portion thereof, with substantially reduced or substantially no mixed interface losses is provided. The method may include providing a second fuel compatible with the first fuel. The second fuel may have a first predetermined composition comprising a selected or maximum amount of the first fuel, or a component thereof. The selected or maximum amount may be less than the selected or maximum amount allowed in a second target composition for the second fuel. The method may further include transporting, from a first pipeline terminal to a second pipeline terminal, a first movement of the second fuel having the first predetermined composition. The method may further include transporting, from the first pipeline terminal to the second pipeline terminal, a first movement of the first fuel immediately sequentially following the first movement of the second fuel having the first predetermined composition, such that the head of the first movement of the first fuel is wrapped by (e.g., interfaces with) the tail of the first movement of the second fuel having the first predetermined composition. The method may further include transporting, from the first pipeline terminal to the second pipeline terminal, a second movement of the second fuel having the first predetermined composition immediately sequentially following the first movement of the first fuel, such that the tail of the first movement of the first fuel is wrapped by (e.g., interfaces with) the head of the second movement of the second fuel having the first predetermined composition. The method may further include separating, at the second terminal, a first fuel fraction stream, a second fuel having the first predetermined composition fraction stream, and a mixed interface fraction stream. The mixed interface fraction stream may comprise a mixture of the first fuel and the second fuel having the first predetermined composition. The method may further include combining at least a portion of the mixed interface fraction stream with at least a portion of the second fuel having the first predetermined composition fraction stream so as to produce a second fuel stream having the second target composition. Some embodiments may include injecting at least a portion of the mixed interface fraction stream into the second fuel, or portion thereof, so as to produce a second fuel stream having the second target specification.

According to another aspect of the present disclosure, a method for substantially eliminating or substantially reducing the loss of mixed interface generated by a plurality of pipeline movements of two compatible fuels is provided. The method may include transporting a first fuel from a first pipeline terminal to a second pipeline terminal with the first fuel wrapped head and tail with a second fuel compatible with the first fuel, such that a pipeline movement of a second fuel both immediately precedes and immediately follows the movement of the first fuel in the pipeline so that both the head and tail of the first fuel directly interfaces with the second fuel generating a mixed interface. The method may further include restricting the transport of the second fuel in the pipeline to second fuel compositions having a first composition or first specification. The first composition or first specification may be characterized by a selected or maximum amount of the first fuel, or a component thereof. The selected or maximum amount may be less than the selected or maximum amount allowed in a second target specification for the second fuel. The method may further include separating, at the second terminal, a first fuel fraction stream, a second fuel fraction stream, and an interface fraction stream. The interface fraction stream may comprise a mixture of the first and second fuels. The method may also include transporting the interface fraction stream from the second terminal to a third pipeline terminal with the interface fraction stream wrapped in a head and a tail that is different from the head. The tail and head may be selected from the first fuel fraction stream and the second fuel fraction stream. The method may further include separating, at the third terminal, a first fuel fraction stream, a second fuel fraction stream, and an interface fraction stream. The interface fraction stream may comprise a mixture of the first and second fuels. The method may further include combining, at the third terminal, at least a portion of the interface fraction stream with at least a portion of the second fuel fraction stream so as to produce a second fuel stream meeting the second target specification. Some embodiments may include injecting, at the third terminal, at least a portion of the mixed interface fraction stream into the second fuel fraction stream, or portion thereof, so as to produce a second fuel stream meeting the second target specification.

According to another aspect of the present disclosure, a method for substantially eliminating or substantially reducing the loss of mixed interface generated by a plurality of pipeline movements of a first fuel through a pipeline is provided. The method may include providing a second fuel compatible with the first fuel. The second fuel may have a first predetermined composition comprising a selected or maximum amount of the first fuel, or a component thereof. The selected or maximum amount may be less than the selected or maximum amount allowed in a second target composition for the second fuel. The method may further include transporting, from a first pipeline terminal to a second pipeline terminal, a first movement of the second fuel having the first predetermined composition. The method may further include transporting, from the first pipeline terminal to the second pipeline terminal, a first movement of the first fuel immediately sequentially following the first movement of the second fuel having the first predetermined composition, such that the head of the first movement of the first fuel is wrapped by (e.g., interfaces with) the tail of the first movement of the second fuel having the first predetermined composition. The method may further include transporting, from the first pipeline terminal to the second pipeline terminal, a second movement of the second fuel having the first predetermined composition immediately sequentially following the first movement of the first fuel, such that the tail of the first movement of the first fuel is wrapped by (e.g., interfaces with) the head of the second movement of the second fuel having the first predetermined composition. The method may further include separating, at the second terminal, a first fuel fraction stream, a second fuel having the first predetermined composition fraction stream, and a mixed interface fraction stream. The mixed interface fraction stream may comprise a mixture of the first fuel and the second fuel having the first predetermined composition.

The method may also include transporting, from the second pipeline terminal to the third pipeline terminal, a third movement of the second fuel having the first predetermined composition. The method may further include transporting, from the second pipeline terminal to the third pipeline terminal, the mixed interface fraction stream immediately sequentially following the third movement of the second fuel having the first predetermined composition, such that the head of the mixed interface fraction stream is wrapped by (e.g., interfaces with) the tail of the third movement of the second fuel having the first predetermined composition. The method may further include transporting, from the second pipeline terminal to the third pipeline terminal, a second movement of the first fuel immediately sequentially following the mixed interface fraction stream, such that the tail of the mixed interface fraction stream is wrapped by (e.g., interfaces with) the head of the second movement of the first fuel. The method may further include separating, at the third terminal, a first fuel fraction stream, a second fuel fraction stream having the first predetermined composition, and a mixed interface fraction stream. The mixed interface fraction stream may comprise a mixture of the first and second fuels. The method may also include combining, at the third terminal, at least a portion of the mixed interface fraction stream with at least a portion of the second fuel fraction stream having the first predetermined composition, so as to produce a second fuel stream having the second target composition. Some embodiments may include injecting, at the third terminal, at least a portion of the mixed interface stream into the second fuel fraction stream having the first predetermined composition, so as to produce a second fuel stream having the second target specification.

According to another aspect of the present disclosure, a system for transporting two compatible fuels through a pipeline, or a portion thereof, is provided. The system may include a downstream pipeline terminal in fluid communication with or fluidly coupled with one or more upstream pipeline terminals. The downstream pipeline terminal may be configured to receive an inlet stream from the one or more upstream terminals. The inlet stream may comprise a first fuel wrapped head and tail with a second fuel compatible with the first fuel, such that a pipeline movement of the second fuel immediately precedes and immediately follows the movement of the first fuel in the pipeline so that both the head and tail of the first fuel directly interfaces with the second fuel. The second fuel may have a first predetermined composition comprising a selected or maximum amount of the first fuel, or a component thereof. The selected or maximum amount may be less than the selected or maximum amount allowed in a second target composition for the second fuel. The system may further include a separator, at the downstream terminal, a first fuel fraction stream, a second fuel fraction stream, and an interface fraction stream from the inlet stream. The interface fraction stream may comprise a mixture of the first and second fuels.

In an embodiment, the separator may include one or more devices, components, or equipment, such as one or more flow control devices operating, in an example, in conjunction with one or more sensors or meters and a controller. In such examples, the controller may determine, based on a number of injection parameters and/or other parameters (such as gravity, density, bbl for each selected cut, and/or flow rate) when (for example, a time to separate one type of fluid from another) and where (for example, a selected storage tank and/or transportation vehicle) to divert a selected cut. In another embodiment, the flow control device may be manually actuatable to enable a user to physically divert flow, thus allowing for redundancy and backup. The flow control device may include one or more of a pump, a valve, a control valve, diverters, or a manifold. The flow control device may ensure that a pipeline cut is directed to the proper storage tank based on the selected cut (for example, the selected comprising one of the renewable diesel, the diesel fuel or first and second diesel fuel, and/or the mixed interface at the head or tail of the renewable diesel). In an embodiment, the one or more sensors or meters may include gravitometers, densitometers, temperature sensors, pressure sensors or transducers, flow meters, sensors or meters to determine other compositional characteristics of a fluid, and/or other sensors or meters configured to measure some parameter of fluid flowing through a pipeline. Such one or more sensors or meters may be positioned proximate the flow control and/or at a selected distance from the flow control device. Thus, diversion may occur at a time to minimize blending a mixing interface with a diesel or renewable diesel.

The system may further include a first storage tank in fluid communication with or fluidly coupled with the downstream terminal and the separator. The first storage tank may be configured to receive and store the first fuel fraction stream. The system may further include a second storage tank in fluid communication with or fluidly coupled with the downstream terminal and the separator. The second storage tank may be configured to receive and store the interface fraction stream. The system may further include a third storage tank in fluid communication with or fluidly coupled with the downstream terminal and the separator. The third storage tank may be in fluid communication with or fluidly coupled with the separator via a first flow line operable to flow the second fuel fraction stream from the separator to the third storage tank. The first flow line may be in fluid communication with or fluidly coupled with an injection flow line in fluid communication with or fluidly coupled with the second storage tank and operable to receive at least a portion of the interface fraction stream stored in the second storage tank and inject it into the first flow line such that a second fuel stream meeting the second target specification is generated by the mixing of the second fuel fraction stream and a stream of the stored interface fraction stream. The third storage tank may be operable to receive and store the second fuel stream having the second target specification.

In certain embodiments, the system may further include an injection control system operable to control the injection of the interface fraction stream stored in the second storage tank into the first flow line, so as to generate controlled mixing of the first fuel fraction stream and the interface fraction stream to generate the second fuel stream having the second target specification. The injection control system may include a controller in electronic communication with one or more measurement devices, one or more flowmeters, one or more injection valves, and one or more injection pumps. The controller may be operable to determine one or more injection parameters based on: compositional data for the stored mixed interface fraction stream, compositional data for the second fuel fraction stream in the first flow line, and flow rate data for the second fuel fraction stream in the first flow line. In certain embodiments, the one or more injection parameters may be the injection flow rate of the injection stream necessary to efficiently consume the stored mixed interface fraction stream while generating the second fuel stream having the target specification.

The system may further include one or more measurement devices in electronic communication with the controller. The one or more measurement devices may be configured to physically measure one or more chemical or physical characteristics of the stored mixed interface fraction. The one or more chemical or physical characteristics may correspond to compositional data for the stored mixed interface fraction stream. The system may further include one or more measurement devices configured to physically measure one or more chemical or physical characteristics of the second fuel fraction stream in the first flow line. In such instances, the one or more chemical or physical characteristics may correspond to compositional data for the second fuel fraction stream in the first flow line. In certain embodiments, the one or more chemical or physical characteristics may be specific gravity and the one or more measurement devices may include at least one gravitometer.

In certain embodiments, the system may further include one or more flowmeters in electronic communication with the controller. The one or more flowmeters may be configured to physically measure the flow rate of the second fuel fraction stream in the first flow line. In such instances, the measured flow rate may correspond to flow rate data for the second fuel fraction stream in the first flow line. The system may further include a mixing manifold fluidly coupling the or enabling fluid communication between the first flow line to the injection flow line and operable to facilitate homogenous mixing of the first fuel and the second fuel having the first predetermined composition to generate the second fuel having the target specification. The system may further include one or more injection pumps in electronic communication with the controller. The injection pump or pumps may be operable to receive instructions from the controller and cause the injection stream to flow from the second storage tank to the first flow line or the mixing manifold coupling the first flow line to the injection flow line. The system may further include one or more injection valves in electronic communication with the controller. The one or more injection valves may be operable to regulate the flow of the injection stream in the injection flow line connecting the second storage tank to the mixing manifold or first flow line.

In certain embodiments, the first fuel in the system is renewable diesel and the second fuel in the system is a diesel fuel. In certain embodiments, the diesel fuel may be a substantially non-renewable diesel fuel. In certain embodiments, the diesel fuel may be an Ultra Low Sulfur Diesel Fuel (ULSD). In certain embodiments, the diesel fuel may be a diesel fuel comprising a sulfur level no higher than 0.0015 percent by weight (15 ppm). In certain embodiments, the diesel fuel may be a No. 2 diesel fuel with a sulfur level no higher than 0.0015 percent by weight (15 ppm) and with an aromatic hydrocarbon content limited to 10 percent by volume. In certain embodiments of the system, the first predetermined composition may comprise a selected or maximum amount of 3% by volume of renewable diesel. In certain embodiments of the system, the second target specification may comprise less than 5% by volume renewable diesel. In certain embodiments of the system, the diesel fuel is California Air Resources Board (CARB) Ultra Low Sulfur Diesel Fuel (ULSD) No. 2 and the second target specification is the Federal Trade Commission (FTC) Label Law limit of less than 5% Renewable Diesel (RD) in CARB ULSD No. 2.

According to another aspect of the present disclosure, a system for transporting two compatible fuels through a pipeline, or a portion thereof, is provided. The system may include a midstream pipeline terminal in fluid communication with or fluidly coupled with one or more upstream pipeline terminals and one or more downstream pipeline terminals. The midstream pipeline terminal may be configured to receive an inlet stream from the one or more upstream terminals. The inlet stream may comprise a first fuel wrapped head and tail with a second fuel compatible with the first fuel. The second fuel may have a first predetermined composition comprising a selected or maximum amount of the first fuel, or a component thereof. The selected or maximum amount may be less than the selected or maximum amount allowed in a second target composition for the second fuel. The system may further include a separator, at the midstream terminal, a first fuel fraction stream, a second fuel fraction stream, and an interface fraction stream from the inlet stream. The interface fraction stream may comprise a mixture of the first and second fuels.

The system may further include a first storage tank positioned at the midstream terminal and in fluid communication with or fluidly coupled with the separator. The first storage tank may be configured to receive and store the first fuel fraction stream. The system may also include a second storage tank positioned at the midstream terminal and in fluid communication with or fluidly coupled with the separator. The second storage tank may be configured to receive and store the interface fraction stream. The system may also include a third storage tank positioned at the midstream terminal and in fluid communication with or fluidly coupled with the separator. The third storage tank may be configured to receive and store the second fuel fraction stream. The system may further include a midstream terminal outlet stream in fluid communication with or fluidly coupled with one or more downstream terminals. The third storage tank may be in fluid communication with or fluidly coupled with the midstream outlet stream by a first flow line configured to flow the second fuel fraction stream stored in the third storage tank to the midstream terminal outlet stream. The first flow line may be in fluid communication with or fluidly coupled with an injection flow line in fluid communication with or fluidly coupled with the second storage tank and operable to flow at least a portion of the interface fraction stream stored in the second storage tank into the first flow line such that a second fuel stream meeting the second target specification is generated by the mixing of the second fuel fraction stream and a stream of the stored interface fraction stream. The midstream terminal outlet stream may comprise the second fuel stream having the second target specification.

Another embodiment of the disclosure is directed to a controller to transport two compatible fuels through a pipeline. The controller may include a processor and a machine-readable storage medium, the machine-readable storage medium to store instructions to, when executed by the processor, may obtain injection parameters including (a) an amount of a renewable diesel, (b) an amount of a first diesel fuel pumped through the pipeline prior to the renewable diesel, and (c) an amount of a second diesel fuel pumped through the pipeline subsequent to the renewable diesel, and (d) a first specification characterized by a minimum and a selected amount of renewable diesel allowable in the pipeline and the injection parameters further including one or more of (i) compositional data of the renewable diesel, (ii) compositional data of the first diesel fuel, (iii) compositional data of the second diesel fuel, and (iv) a flow rate of fluid within the pipeline. The instructions when executed may adjust, based on the injection parameters and a first diesel fuel specification, one or more first flow control devices to separate (a) the first diesel from a first mixed interface comprising portions of the amount of the first diesel fuel and the renewable diesel, (b) the first mixed interface from the renewable diesel fuel, (c) the renewable diesel fuel from a second mixed interface comprising portions of the amount of the renewable diesel and the second diesel fuel, and (d) the second mixed interface from the second diesel fuel. The instructions when executed may blend, based on the injection parameters and a second diesel fuel specification and via one or more second flow control devices, one or more of portions of the first mixed interface, portions of the second mixed interface, portions of the first diesel fuel, or portions of the second diesel fuel to form a diesel mixture.

The controller may include further instructions to, when executed, obtain compositional data of the diesel mixture stored in a storage tank; and verify that the mixture meets composition specifications in the second diesel fuel specification.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
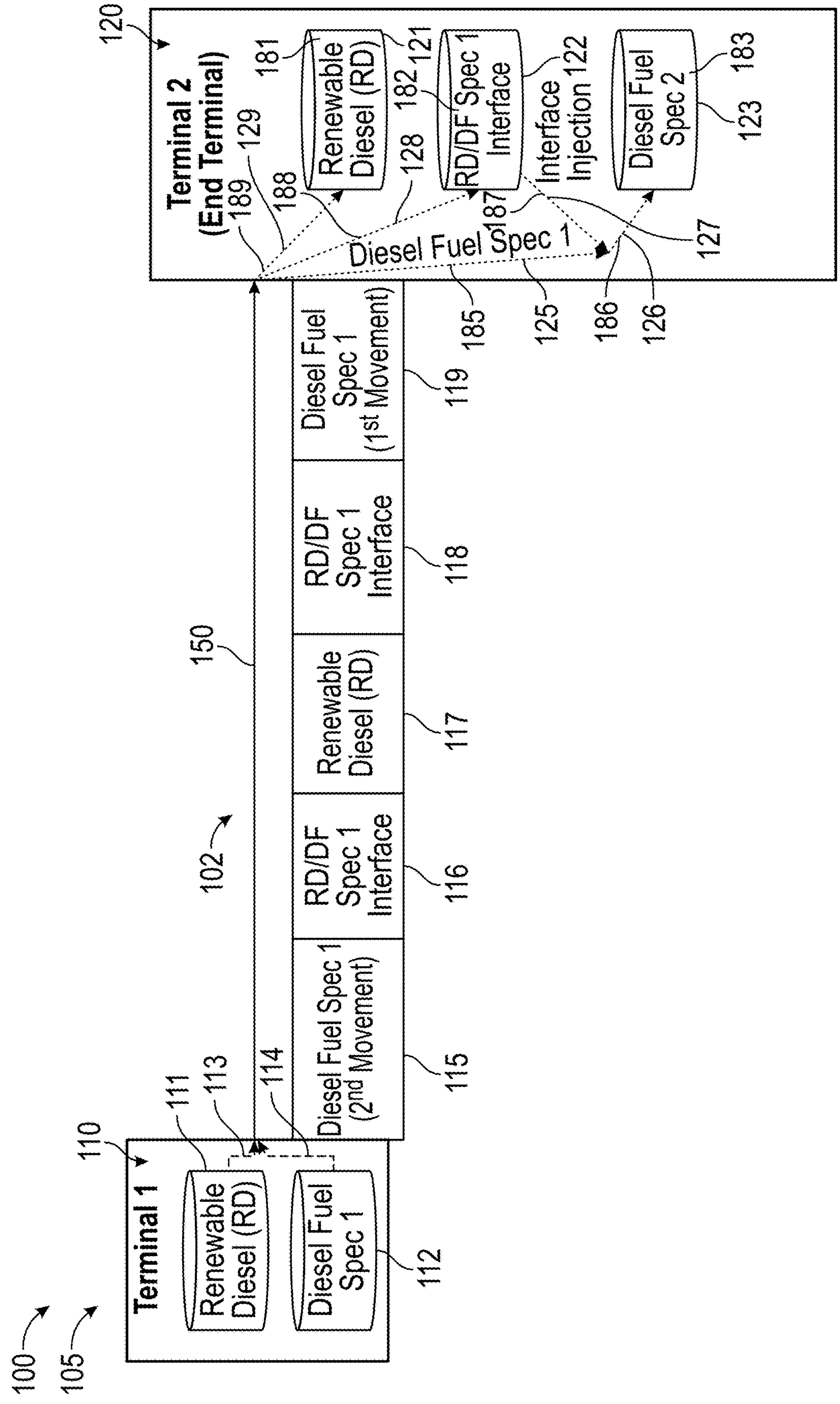
FIG. 1 is a graphical representation of a system and method for transporting renewable diesel through a pipeline between a first terminal and a second terminal, according to an exemplary embodiment of the present disclosure.

The present disclosure describes various embodiments related to methods and systems for transporting two different but compatible fuels through a pipeline from a first terminal to a second terminal, while reducing or eliminating the mixed interface volume losses that typically result from the transport or movement of compatible fuels through a common carrier pipeline. Further embodiments may be described and disclosed.

In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases “in some embodiments,” “in various embodiments,” “in an embodiment,” or “in embodiments,” which may each refer to one or more of the same or different embodiments. Furthermore, the terms “comprising.” “including,” “having,” and the like, as used with respect to embodiments of the present disclosure, are synonymous.

The term “about” or “approximately” are defined as being close to as understood by one of ordinary skill in the art. In one non-limiting embodiment, the terms are defined to be within 10%, preferably within 5%, more preferably within 1%, and most preferably within 0.5%.

The terms “reducing,” “reduced,” or any variation thereof, when used in the claims and/or the specification includes any measurable decrease or complete inhibition to achieve a desired result.

The use of the words "a" or "an" when used in conjunction with any of the terms "comprising." "including." "containing." or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Disclosed herein are methods and systems for transporting a first fuel, such as renewable diesel (RD), through a pipeline between pipeline terminals. In at least certain embodiments, the presently disclosed methods and system are capable of transporting a first fuel, such as renewable diesel, through a pipeline while substantially reducing or eliminating the mixed interface volume losses that typically result from the transport or movement of fuels such as renewable diesel through a pipeline, including common carrier pipelines that transport fuels other than renewable diesel. The present disclosure also provides methods and systems for transporting two different but compatible fuels through a pipeline from a first terminal to a second terminal, while also reducing or eliminating the mixed interface volume losses that typically result from the transport or movement of compatible fuels through a common carrier pipeline.

FIG. 1 is a graphical representation of a method 100 and a system 105 for transporting renewable diesel 117 through a pipeline segment 150 of pipeline 102 between a first terminal 110 and a second terminal 120, according to an exemplary embodiment of the present disclosure. In certain embodiments, pipeline segment 150 and/or pipeline 102 may be a common carrier pipeline in which many different fuels are transported from many different sources or producers. In at least some embodiments, pipeline segment 150 and/or pipeline 102 may be a Federal Energy Regulatory Commission (FERC) regulated pipeline. Pipeline 102 may extend between and therethrough many terminals. As depicted in FIG. 1, pipeline segment 150 of pipeline 102 extends between a first terminal 110, or "Terminal 1" 110, and a second terminal 120, or "Terminal 2" 120, thereby fluidly coupling "Terminal 1" 110 and "Terminal 2" 120. However, pipeline 102 may extend beyond "Terminal 1" 110 and "Terminal 2" 120 to fluidly couple or enable fluid communication between "Terminal 1" 110 and "Terminal 2" 120 to other pipeline terminals along pipeline 102. Accordingly, first terminal 110 or "Terminal 1" 110 may be in fluid communication with or fluidly coupled to one or more preceding terminals upstream of first terminal 110 or "Terminal 1" 110, in addition to being in fluid communication with or fluidly coupled with one or more downstream terminals, such as second terminal 120 or "Terminal 2" 120. Likewise, second terminal 120 or "Terminal 2" 120 may be in fluid communication with or fluidly coupled to one or more subsequent terminals downstream of second terminal 120 or "Terminal 2" 120, in addition to being in fluid communication with or fluidly coupled with one or more upstream terminals, such as first terminal 110 or "Terminal 1" 110.

As depicted in FIG. 1, "Terminal 1" 110 may have a plurality of storage tanks, such as storage tanks 111, 112, configured to at least temporarily store a particular fuel before the particular fuel is injected or pumped into pipeline segment 150 of pipeline 102. The fuel stored in storage tanks 111, 112, may be received from an upstream pipeline segment of pipeline 102, or from a pipeline segment belonging to a different pipeline, or received from another transportation types or methods, such as by rail, truck, or marine transport. The storage tanks 111, 112 are in fluid communication with or fluidly coupled with pipeline segment 150 of pipeline 102 by one or more conduits, such as conduits 113, 114. As depicted in FIG. 1, "Terminal 1" 110 includes storage tank 111 configured to store and contain renewable diesel (RD) and storage tank 112 configured to store and contain a compatible diesel fuel having a first specification or first composition, such as "Diesel Fuel Spec 1." Storage tank 111 is in fluid communication with or fluidly coupled with pipeline segment 150 of pipeline 102 by conduit 113. Conduit 113 is operable is to conduct the flow of renewable diesel from storage tank 111 to pipeline segment 150 of pipeline 102. Conduit 113 and storage tank 111 may be coupled with a pump that is operable to inject or pump renewable diesel from storage tank 111 into pipeline segment 150 of pipeline 102.

Similarly, storage tank 112 is in fluid communication with or fluidly coupled with pipeline segment 150 of pipeline 102 by conduit 114. Conduit 114 is operable to conduct the flow of a compatible diesel fuel having a first composition or specification, such as "Diesel Fuel Spec 1" from storage tank 112 to pipeline segment 150 of pipeline 102. Conduit 114 and storage tank 112 may be coupled with a pump that is operable to inject or pump a compatible diesel fuel having a first composition or specification, such as "Diesel Fuel Spec 1," from storage tank 112 into pipeline segment 150 of pipeline 102. "Terminal 1" 110 may include many additional storage tanks in addition to storage tanks 111, 112, shown in FIG. 1. Each of the additional storage tanks may be in fluid communication with or fluidly coupled with pipeline segment 150 of pipeline 102 as well as upstream pipeline segments of pipeline 102 or another pipeline.

"Terminal 1" 110 is in fluid communication with or fluidly coupled with "Terminal 2" 120 via pipeline segment 150 of pipeline 102, as depicted in FIG. 1. "Terminal 2" 120 may have a plurality of storage tanks, such as storage tanks 121, 122, 123 configured to at least temporarily store a particular fuel before the particular fuel is injected or pumped into another pipeline segment or into a truck, rail car, or marine transport. As depicted in FIG. 1, the fuel stored in storage tanks 121, 122, 123 is received from upstream pipeline segment 150 of pipeline 102 via one or more conduits 125, 126, 127, 128, 129. Storage tanks 121, 122, 123 may be in fluid communication with or fluidly coupled to one or more additional pipeline segments of pipeline 102 or another pipeline, or may be configured to discharge the fuel contained therein to another form of transport such as railcar, truck, or marine transport.

Figure 6:
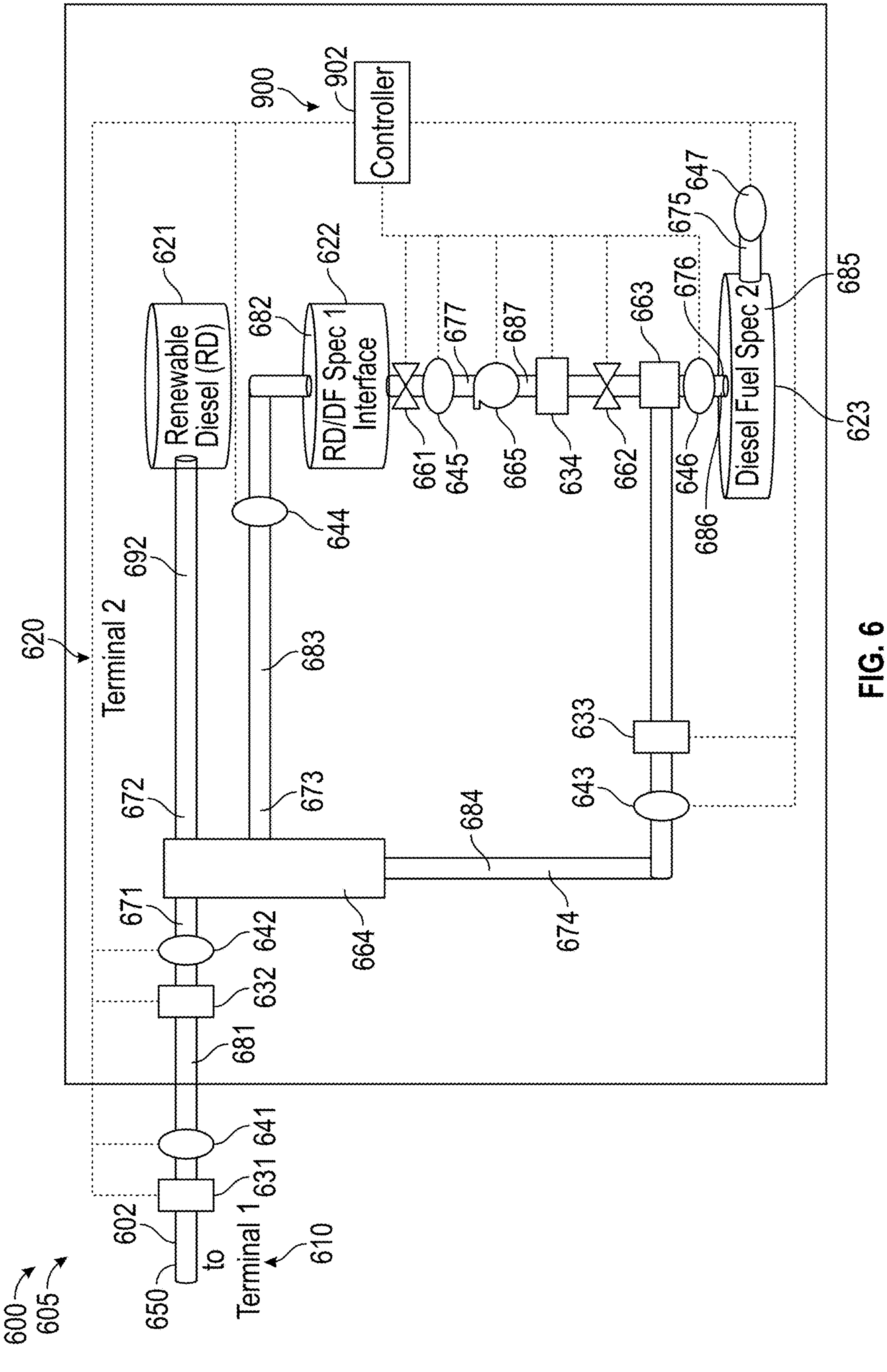
FIG. 6 is a graphical representation of a system and method for injecting a mixed interface stream generated by the transport of a first fuel through a pipeline into a compatible second fuel to produce a second fuel stream having a second target specification, according to an exemplary embodiment of the present disclosure.
Figure 7:
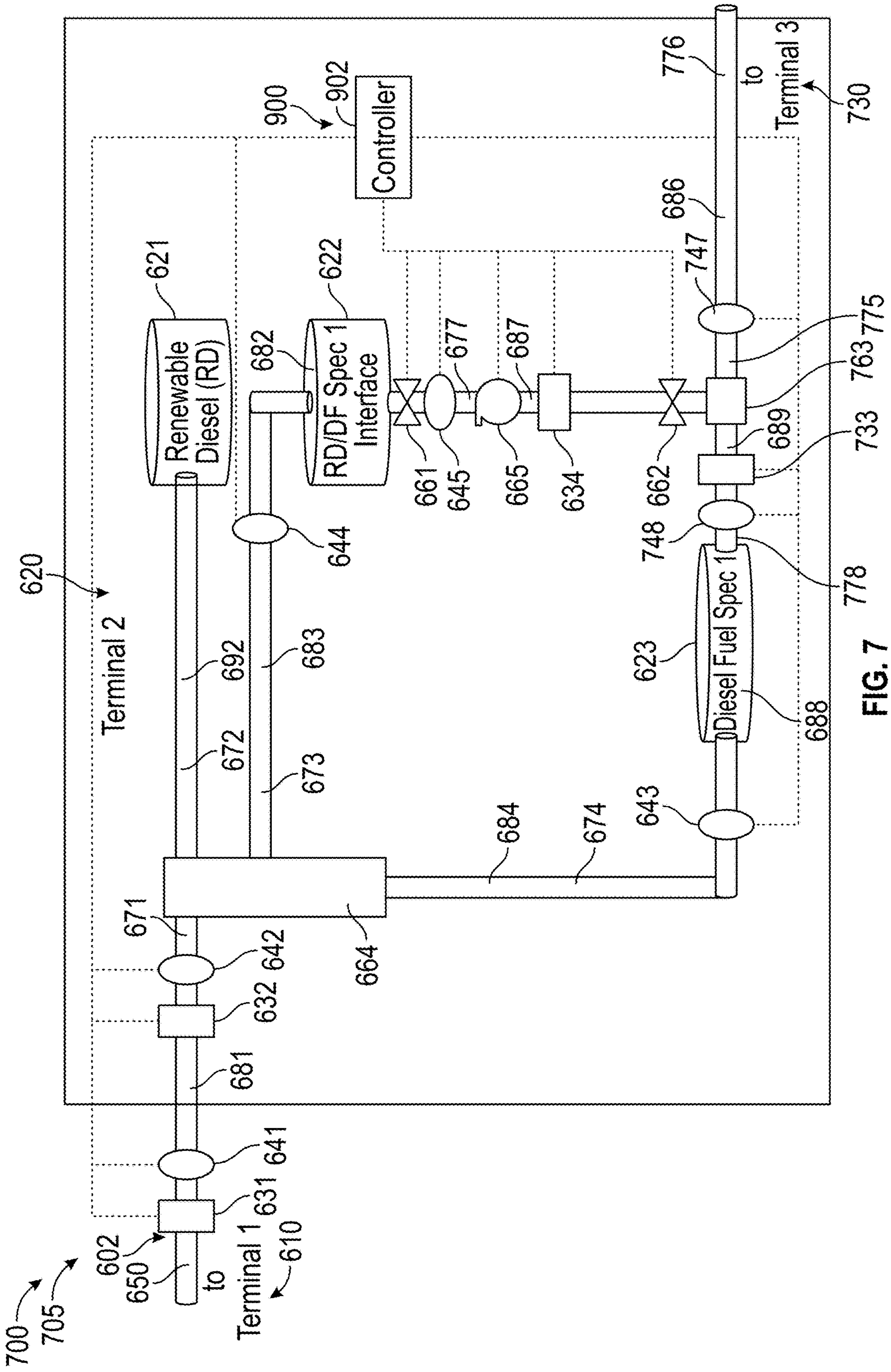
FIG. 7 is a graphical representation of a system and method for injecting a mixed interface stream generated by the transport of a first fuel through a pipeline into a compatible second fuel to produce a second fuel stream having a second target specification, according to an exemplary embodiment of the present disclosure.
Figure 8:
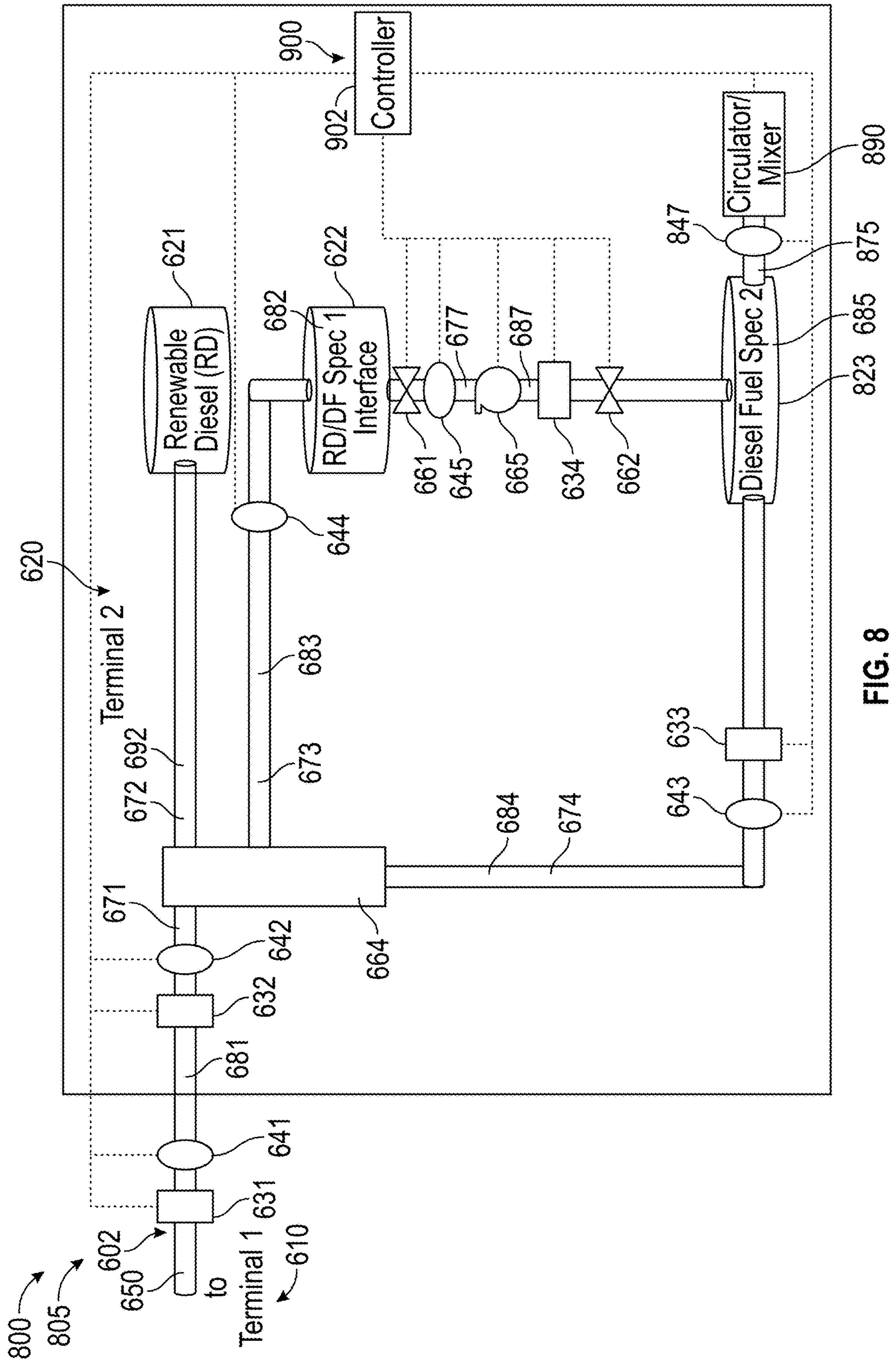
FIG. 8 is a graphical representation of a system and method for injecting a mixed interface stream generated by the transport of a first fuel through a pipeline into a compatible second fuel to produce a second fuel stream having a second target specification, according to an exemplary embodiment of the present disclosure.

As depicted in FIG. 1, "Terminal 2" 120 includes storage tank 121 configured to store and contain renewable diesel (RD). Storage tank 121 is in fluid communication with or fluidly coupled with pipeline segment 150 of pipeline 102 via conduit 129. Conduit 129 is operable to conduct the flow of renewable diesel from the terminal end of pipeline segment 150 to storage tank 121. Storage tank 121 may be in fluid communication or fluidly coupled via conduit 129 with/to a separator for separating the fuels and their mixed interface volumes, as well as one or more flowmeters and composition measurement devices, for example as shown in FIGS. 6-8. "Terminal 2" may also include storage tank 122 configured to store and contain the mixed interface volume, e.g., "RD/DF Spec 1 Interface," generated by moving or transporting renewable diesel through pipeline segment 150 of pipeline 102 wrapped or preceded by and followed by movements of a compatible diesel fuel, such as "Diesel Fuel Spec 1." Storage tank 122 is in fluid communication with or fluidly coupled to the terminal end of pipeline segment 150 by conduit 128. Storage tank 122 may be in fluid communication with or fluidly coupled via conduit 128 to the separator for separating the fuels and their mixed interface volumes, as well as one or more flowmeters and composition measurement devices, for example as shown in FIGS. 6-8.

"Terminal 2" 120 also includes conduit 125 for conducting the flow of a compatible diesel fuel, such as "Diesel Fuel Spec 1," from the terminal end of pipeline segment 150 towards storage tank 123. "Terminal 2" 120 also includes an injection conduit 127 operable to conduct the mixed interface volume, or a portion thereof, stored in storage tank 122 into the flowline conducting the compatible diesel fuel, such as "Diesel Fuel Spec 1," toward storage tank 123. As shown in FIG. 1, injection conduit 127 is in fluid communication with or fluidly coupled to conduit 125 such that injection conduit 127 is operable to cause the combination or mixing of the mixed interface volume stored in storage tank 122 with the separated compatible diesel fuel conducted by conduit 125. Injection conduit 127 may also be in fluid communication with or fluidly coupled with one or more injection valves, mixing manifolds, pumps, flowmeters, and composition measurement devices, as shown for example in FIG. 6. "Terminal 2" 120 may also include conduit 126 operable to conduct the injected mixed fuel, such as "Diesel Fuel Spec 2," to storage tank 123 for storage and containment.

"Terminal 2" 120 may include many additional storage tanks in addition to storage tanks 121, 122, 123 shown in FIG. 1. Each of the additional storage tanks may be in fluid communication with or fluidly coupled with pipeline segment 150 of pipeline 102 as well as downstream pipeline segments of pipeline 102 or another pipeline. In certain embodiments, "Terminal 2" 120 may be an end terminal with respect to "Diesel Fuel Spec 2," such that no further movements of "Diesel Fuel Spec 2" in pipeline 102 are needed and the "Diesel Fuel Spec 2" stored in storage tank 123 may comprise an end product ready to be marketed, labeled, and/or transported via private pipeline, railcar, truck, or water-based transport.

As depicted in FIG. 1, method 100 for transporting renewable diesel through pipeline 102, or pipeline segment 150 thereof, may include transporting the renewable diesel 117 from a first pipeline terminal 110 to a second pipeline terminal 120, the renewable diesel 117 wrapped head and tail with a compatible diesel fuel 115, 119, such as "Diesel Fuel Spec 1" 115, 119. For example, a first movement of renewable diesel 117 may be wrapped head and tail with pipeline movements of a diesel fuel 115, 119 having a first composition or specification, such as "Diesel Fuel Spec 1," so that pipeline movements of diesel fuel 115, 119 immediately precede and immediately follow the movement of the renewable diesel 117 in the pipeline 102 so as to define a wrap of diesel fuel around the head and tail of the renewable diesel 117. In particular, the first movement of renewable diesel 117 may be preceded in the pipeline segment 150 of pipeline 102 by a first movement of diesel fuel 119 such that the head of the renewable diesel 117 is wrapped by (e.g., interfaces with) the tail of the first movement of the diesel fuel 119. The first movement of renewable diesel 117 may be followed in the pipeline by a second movement of diesel fuel 115 such that the tail of the renewable diesel movement 117 is wrapped by (e.g., interfaces with) the head of the second movement of the diesel fuel 115.

Method 100 may further include restricting the transport of the diesel fuel in pipeline segment 150 and/or pipeline 102 to diesel fuel compositions having a first specification or first composition, e.g., "Diesel Fuel Spec 1." The first specification or first composition may be characterized, in certain embodiments, by a selected or maximum amount of the renewable diesel, or a component thereof. In certain embodiments, the selected or maximum amount is less than the selected or maximum amount allowed in a second target specification or second target composition for the diesel fuel. In certain embodiments, method 100 may include restricting use of pipeline 102 and/or pipeline segment 150 with respect to all movements of the diesel fuel to diesel fuel compositions having the first specification or the first composition. In certain embodiments, method 100 may include restricting the use of selected terminals of the pipeline 102, such as the first terminal 110 and the second terminal 120 depicted in FIG. 1, with respect to movements of diesel fuel to diesel fuel compositions having the first specification or first composition. In an embodiment, the selected amount may be the maximum amount. In another embodiment, the selected amount may include another amount other than the maximum amount restricting the transport of the diesel fuel in pipeline segment 150 and/or pipeline 102 to diesel fuel compositions having a first specification or first composition may include, for example, changing the requirements of the transport of all movements of fuels classified as the diesel fuel on pipeline 102 and/or pipeline segment 150 between the first terminal 110 and the second terminal 120, such that all movements of fuels classified as the diesel fuel have a composition corresponding to the first specification or first composition. As a result, all users or shippers using the pipeline 102 and/or pipeline segment 150 would be restricted from the transport or movement of fuels classified as the diesel fuel unless that fuel is characterized by a composition meeting the first specification or the first composition.

In certain embodiments, the first specification or the first composition may comprise a selected or maximum amount of renewable diesel by volume. For example, in certain embodiments, the first specification or first composition may comprise a selected or maximum amount of 2% by volume of renewable diesel. In certain other embodiments, the first specification or first composition may comprise a selected or maximum amount of 3% by volume of renewable diesel. In certain embodiments, the first specification or first composition may comprise a selected or maximum amount of about 1% by volume, or about 1.25% by volume, or about 1.5% by volume, or about 1.75% by volume, or about 2.0% by volume, or about 2.25% by volume, or about 2.5% by volume, or about 2.75% by volume, or about 3.0% by volume, or about 3.25% by volume, or about 3.5% by volume, or about 3.75% by volume, or about 4.0% by volume, or about 4.25% by volume, or about 4.5% by volume of renewable diesel, or a component thereof. In certain embodiments, the first specification or the first composition may correspond to a selected or maximum amount of from about 0% to about 3% by volume, or from about 0% to about 2% by volume, or from about 0% to about 4.5% by volume, or from about 1% to about 2.5% by volume, or from about 1% to about 3% by volume or from about 1% to about 4.5% by volume, or from about 2% to about 4.5% by volume of renewable diesel, or a component thereof.

In certain embodiments, the first specification or first composition may comprise a selected or maximum amount of the renewable diesel, or a component thereof, that is 60% or less of the selected or maximum amount allowed in the second target specification. In certain embodiments, the first specification or first composition may comprise a selected or maximum amount of the renewable diesel, or a component thereof, that is no greater than half of the selected or maximum amount allowed in the second target specification. In certain other embodiments, the first specification or the first composition may comprise a selected or maximum amount of the renewable diesel, or a component thereof, that is 40% or less of the selected or maximum amount allowed in the second target specification. In still other embodiments, the first specification or first composition may comprise a selected or maximum amount of the renewable diesel, or a component thereof, that is 60% of the selected or maximum amount allowed in the second target specification. In certain embodiments, the first specification or first composition may comprise a selected or maximum amount of the renewable diesel, or a component thereof, that is half of the selected or maximum amount allowed in the second target specification. In certain other embodiments, the first specification or first composition may comprise a selected or maximum amount of the renewable diesel, or a component thereof, that is 40% of the selected or maximum amount allowed in the second target specification.

In certain embodiments, the diesel fuel, such as "Diesel Fuel Spec 1" depicted as an exemplary embodiment in FIG. 1, is a substantially non-renewable diesel fuel. In such embodiments, the diesel fuel may be classified as a type or sub-type of diesel fuel but is not classified as a renewable diesel fuel. In certain embodiments, the diesel fuel may be classified as a No. 2 diesel fuel. In certain embodiments, the diesel fuel may be an Ultra Low Sulfur Diesel Fuel (ULSD). In such embodiments, the diesel fuel may be a diesel fuel comprising a sulfur level no greater than 0.0015 percent by weight (15 ppm). In some embodiments, the diesel fuel may be a No. 2 diesel fuel with a sulfur level no greater than 0.0015 percent by weight (15 ppm) and with an aromatic hydrocarbon content limited to 10 percent by volume. In certain embodiments, the diesel fuel may be a California Air Resources Board (CARB) Ultra Low Sulfur Diesel Fuel (ULSD) No. 2.

In certain embodiments, the second target specification or second target composition may correspond to a diesel fuel composition selected from the group consisting of a diesel fuel end product specification, a diesel fuel labeling requirement, a diesel fuel composition required for government accreditation or credit, a diesel fuel composition corresponding to a particular known emissions rating, and any combination thereof. In certain embodiments, the second target specification or second target composition comprises less than 5% by volume renewable diesel. In certain embodiments, the second target specification is the Federal Trade Commission (FTC) Label Law limit of less than 5% Renewable Diesel (RD) in CARB ULSD No. 2.

In certain embodiments, the first movement of renewable diesel 117 may comprise a minimum volume of 10,000 barrels. In certain embodiments, the first movement of renewable diesel 117 may comprise a minimum volume of 12,500 barrels, or 15,000 barrels, or 17,500 barrels, or 20,000 barrels. In certain embodiments, the first movement of renewable diesel 117 may comprise a volume of from about 10,000 barrels to about 12,500 barrels, or from about 10,000 barrels, to about 15,000 barrels, or from about 10,000 barrels to about 17,500 barrels, or from about 10,000 barrels to about 20,000 barrels. In certain embodiments, method 100 may further include restricting pipeline 102 and/or pipeline segment 150 to renewable diesel movements having a minimum volume of 10,000 barrels and a selected or maximum volume of 12,500 barrels, or having a minimum volume of 10,000 barrels and a selected or maximum volume of 15,000 barrels, or having a minimum volume of 10,000 barrels and a selected or maximum volume of 17,500 barrels, or having a minimum volume of 10,000 barrels and a selected or maximum volume of 20,000 barrels.

In certain embodiments, the first movement of diesel fuel 119 and the second movement of diesel fuel 115 may comprise a minimum volume of 10,000 barrels. In certain embodiments, the first movement of diesel fuel 119 and the second movement of diesel fuel 115 may comprise a minimum volume of 20,000 barrels, or 25,000 barrels, or 30,000 barrels, or 32,000 barrels, or 35,000 barrels, or 37,000 barrels, or 40,000 barrels. In certain embodiments, the first movement of diesel fuel 119 and the second movement of diesel fuel 115 may comprise a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 100 may further include restricting pipeline 102 and/or pipeline segment 150 to diesel fuel movements having a minimum volume of 20,000 barrels, or 25,000 barrels, or 30,000 barrels, or 32,000 barrels, or 35,000 barrels, or 37,000 barrels, or 40,000 barrels. In certain embodiments, method 100 may further include restricting pipeline 102 and/or pipeline segment 150 to diesel fuel movements having a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 100 may further include restricting pipeline 102 and/or pipeline segment 150 to a total volumetric flow ratio, with respect to renewable diesel and diesel fuel, of no less than about 20,000 barrels, or about 25,000 barrels, or about 30,000 barrels, or about 32,750 barrels, or about 35,000 barrels, or about 37,500 barrels, or about 40,000 barrels, or about 45,000 barrels, or about 50,000 barrels diesel fuel for every 10,000 barrels of renewable diesel transported through pipeline 102 or a segment thereof, such as pipeline segment 150.

During transit of the first movement of renewable diesel 117 though pipeline segment 150, a mixed interface volume is formed between the head and tail portions of renewable diesel 117 and a respective one of the first movement of diesel fuel 119 and the second movement of diesel fuel 115 which wrapped the first movement of renewable diesel 117. In particular, a first mixed interface volume 118, e.g., "RD/DF Spec 1 Interface" 118, is formed at the interface of the first movement of renewable diesel 117 and the first movement of diesel fuel 119 due to the mixing of the two fuels during transit through pipeline segment 150 of pipeline 102. Additionally, a second mixed interface volume 116, e.g., "RD/DF Spec 1 Interface" 116 is formed at the interface of the first movement of renewable diesel 117 and the second movement of diesel fuel 115 due to the mixing of the two fuels during transit through pipeline segment 150 of pipeline 102. The mixed interface volumes 116, 118 generated during movement of renewable diesel 117 may be "cut-out" or separated from the unmixed renewable diesel 117 and unmixed diesel fuel volumes 115, 119 at the second terminal 120 and stored in one or more storage tanks, such as storage tank 122 depicted in FIG. 1. Such "cut-outs" may be referred to as pipeline cuts.

Method 100 may further include separating, at the second terminal 120, a renewable diesel fraction stream 189, a diesel fuel fraction stream 185, and a mixed interface fraction stream 188 from the fuel volumes received at the second terminal 120. The mixed interface fraction stream 188 comprises a mixture of the renewable diesel and diesel fuel that results from interfacial mixing between the first movement of diesel fuel 119 and the first movement of renewable diesel 117, as well as interfacial mixing between the second movement of diesel fuel 115 and the first movement of renewable diesel 117.

Method 100 may also include injecting at least a portion of the mixed interface fraction stream 188 into the diesel fuel fraction stream 185 so as to produce a diesel fuel stream 186 meeting the second target specification. In certain embodiments, method 100 may further include flowing the renewable diesel fraction stream 189 to a first storage tank 121 positioned at the second terminal 120 via conduit 129 to generate a stored renewable diesel fraction 181. Method 100 may further include flowing the mixed interface fraction stream 188 to a second storage tank 122 positioned at the second terminal 120 via conduit 128 to generate a stored mixed interface fraction 182. Method 100 may further include flowing, via conduit 125, a first flow stream 185 comprising the diesel fuel fraction stream having the first specification or first composition towards a third storage tank 123 positioned at the second terminal 120. Method 100 may further include injecting via conduit 127, an injection flow stream 187 comprising the stored mixed interface fraction 182, or a portion thereof, into the first flow stream 185 to produce a diesel fuel stream meeting the second target specification 186. Method 100 may further include storing the diesel fuel stream 186 having the second target specification (e.g., "Diesel Fuel Spec 2") in the third storage tank 123 as stored diesel fuel having the second target specification 183 (e.g., "Diesel Fuel Spec 2") after flowing diesel fuel stream 186 to the third storage tank 123 via conduit 126.

In certain embodiments, method 100 may include injecting at least a portion of the mixed interface fraction stream 188 or stored mixed interface fraction 182 into the diesel fuel fraction stream 185 such that substantially all of the mixed interface fraction stream generated from the movement of the first movement of renewable diesel 117 between the first terminal 110 and the second terminal 120 is eliminated as diesel fuel having the second target specification 183, 186 rather than being lost as trans-mix that needs to be reprocessed at a refinery or similar facility. In certain embodiments, the entire volume of the first movement of renewable diesel 117 transported from the first terminal 110 to the second terminal 120 qualifies and/or maintains its qualifying status for the Renewable Identification Number (RIN) credit and the Low Carbon Fuel Standard (LCFS) credit, as a result of the mixed interface reinjection system 105 and method 100 depicted in FIG. 1.

In certain embodiments, the second terminal 120 may be an end product terminal with respect to the diesel fuel stream 183 or stored diesel fraction having the second target composition or the second target composition. In such embodiments, the method 100 may include supplying the diesel fuel stream 186 having the second target specification to a storage tank, such as storage tank 123, in fluid communication with or fluidly coupled with pipeline segment 150 or pipeline 102. Method 100 may further include supplying, from the storage tank (e.g., storage tank 123 or another storage tank at the second terminal 120), the diesel fuel having the second target specification 186 or the stored diesel fuel fraction 183 to one or more transportation vehicles selected from the group consisting of a waterborne transport vessel, tanker truck, railway car, and aircraft. Method 100 may alternatively include supplying the diesel fuel having the second target specification 186 or the stored diesel fuel fraction 183 to one or more end-use product pipelines.

In certain embodiments, method 100 may further include determining one or more chemical or physical characteristics of the diesel fuel fraction stream 185 having the first specification or first composition (e.g., "Diesel Fuel Spec 1") and/or the mixed interface stream 188 or stored mixed interface fraction 182. The one or more chemical or physical characteristics may be measured by one or more measurement devices placed in-line or coupled with pipeline segment 150, the separator for separating the fuel streams at the second terminal 120, or the conduits 125, 128 conducting the diesel fuel fraction stream 185 or mixed interface stream 188, as further elucidated in FIGS. 6-8. In certain embodiments, the one or more chemical or physical characteristics of the stored mixed interface fraction may be measured at or in the storage tank 122 containing the stored mixed interface fraction 182. In at least certain embodiments, the one or more chemical or physical characteristics may be specific gravity. In such embodiments, the specific gravity may be measured by one or more gravitometers. For example, the one or more measurement devices may be one or more in-line gravitometers or one or more manual gravitometers.

Method 100 may also include determining the flow rate of the diesel fuel fraction stream 185 having the first specification or first composition. For example, the flow rate may be measured by one or more flowmeters coupled with conduit 125 conducting the flow of the diesel fuel fraction stream 185 having the first specification or first composition, as further elucidated in FIGS. 6-8. Method 100 may further include determining, based on the determined one or more chemical or physical characteristics and the flow rate, one or more injection parameters such that when the stored mixed interface fraction 182 (e.g., "RD/DF Spec 1 Interface") is injected according to the one or more determined injection parameters, the diesel fuel stream having the second target specification 186 (e.g., "Diesel Fuel Spec 2") is produced. The one or more injection parameters may be, for example, the injection flow rate necessary to efficiently consume the stored mixed interface fraction 182 while still generating the diesel fuel stream having the second target specification 186 (e.g., "Diesel Fuel Spec 2"). Method 100 may further include injecting, based on the one or more determined injection parameters, the stored mixed interface fraction 182, or a portion thereof, into the first flow stream 185 to produce the diesel fuel stream meeting the second target specification 186.

In certain embodiments, the stored mixed interface fraction 182 may have an approximate composition corresponding to a 50/50 mixture by volume of the renewable diesel and the diesel fuel as a result of wrapping the renewable diesel 117 head and tail with the diesel fuel 115, 119 and as a result of the operating parameters of pipeline segment 150 and/or pipeline 102. In such embodiments, method 100 may further include determining, based solely on the restricted first compositional specification or a known composition or specification of the first and second diesel fuel movements 115, 119, the flow rate of the diesel fuel stream having the first specification or first composition 185, and the approximate composition of the stored mixed interface fraction 182, one or more injection parameters such that when the stored mixed interface fraction 182 is injected according to the one or more determined injection parameters, the diesel fuel stream having the second target specification 186 is produced. In such embodiments, method 100 may further include injecting, based on the one or more determined injection parameters, the stored mixed interface fraction 183, or a portion thereof, into the first flow stream 185 to produce the diesel fuel stream 186 meeting the second target specification. In certain instances, the known composition or specification of the first and second diesel fuel movements 115, 119 may be known, from reporting provided by the supplier of the particular fuel and/or movement to the pipeline 102 or pipeline segment 150.

Figure 2:
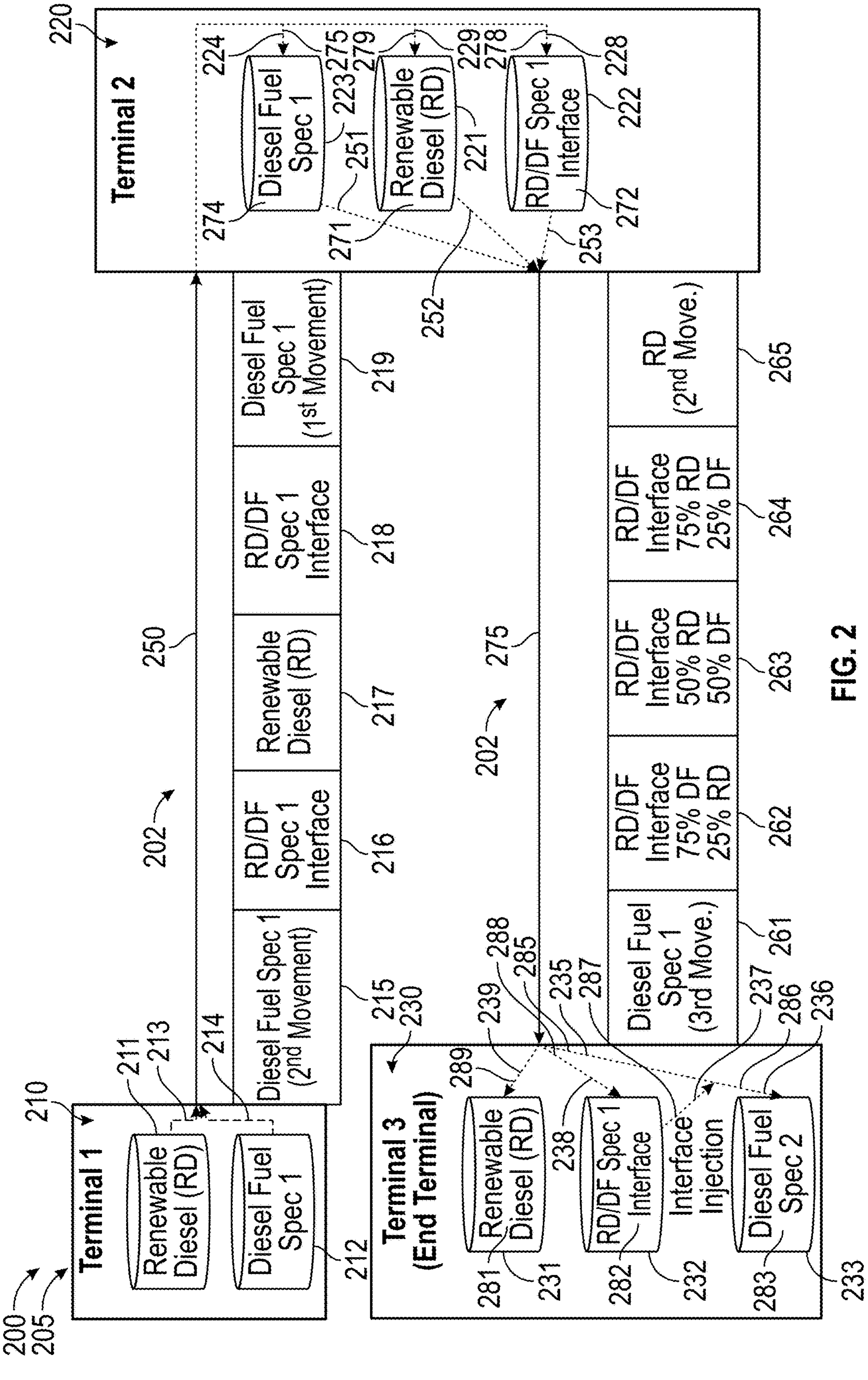
FIG. 2 is a graphical representation of a system and method for transporting renewable diesel through a pipeline which includes transporting a mixed interface, that was generated by movement from an upstream terminal, to a downstream terminal for reinjection into a compatible diesel fuel, according to an exemplary embodiment of the present disclosure.

FIG. 2 is a graphical representation of a method 200 and system 205 for transporting renewable diesel through a pipeline 202 which includes transporting a mixed interface, that was generated by movement from an upstream terminal, to a downstream terminal for reinjection into a compatible diesel fuel, according to an exemplary embodiment of the present disclosure. As depicted in FIG. 2, pipeline 202 includes pipeline segment 250 fluidly coupling or enabling fluid communication between "Terminal 1" 210 with "Terminal 2" 220, as well as pipeline segment 275 fluidly coupling or enabling fluid communication between "Terminal 2" 220 with "Terminal 3" 230. In certain embodiments, pipeline segments 250, 275 and/or pipeline 202 may be a common carrier pipeline in which many different fuels are transported from many different sources or producers. In at least some embodiments, pipeline segments 250, 275 and/or pipeline 202 may be a Federal Energy Regulatory Commission (FERC) regulated pipeline. Pipeline 202 may extend between and therethrough many terminals. While FIG. 2 depicts pipeline segment 250 of pipeline 202 extending between a first terminal 210, or "Terminal 1" 210, and a second terminal 220, or "Terminal 2" 220, thereby fluidly coupling or enabling fluid communication between "Terminal 1" 210 and "Terminal 2" 220, as well as pipeline segment 275 extending between the second terminal 220 and a third terminal 230 or "Terminal 3" 230, pipeline 202 may extend upstream of "Terminal 1" 210 as well as downstream of "Terminal 3" 230, thereby coupling Terminals 1-3 to additional terminals and pipeline segments not shown in FIG. 2.

As depicted in FIG. 2. "Terminal 1" 210 may have a plurality of storage tanks, such as storage tanks 211, 212, configured to at least temporarily store a particular fuel before the particular fuel is injected or pumped into pipeline segment 250 of pipeline 202. The fuel stored in storage tanks 211, 212, may be received from an upstream pipeline segment of pipeline 202, or from a pipeline segment belonging to a different pipeline, or received from another transportation types or methods, such as by rail, truck, or marine transport. The storage tanks 211, 212 are in fluid communication with or fluidly coupled with pipeline segment 250 of pipeline 202 by one or more conduits, such as conduits 213, 214. As depicted in FIG. 2, "Terminal 1" 210 includes storage tank 211 configured to store and contain renewable diesel (RD) and storage tank 212 configured to store and contain a compatible diesel fuel having a first specification or first composition, such as "Diesel Fuel Spec 1." Storage tank 211 is in fluid communication with or fluidly coupled with pipeline segment 250 of pipeline 202 by conduit 213. Conduit 213 is operable to conduct the flow of renewable diesel from storage tank 211 to pipeline segment 250 of pipeline 202. Conduit 213 and storage tank 211 may be coupled with a pump that is operable to inject or pump renewable diesel from storage tank 211 into pipeline segment 250 of pipeline 202.

Similarly, storage tank 212 is in fluid communication with or fluidly coupled with pipeline segment 250 of pipeline 202 by conduit 214. Conduit 214 is operable to conduct the flow of a compatible diesel fuel having a first composition or specification, such as "Diesel Fuel Spec 1" from storage tank 212 to pipeline segment 250 of pipeline 202. Conduit 214 and storage tank 212 may be coupled with a pump that is operable to inject or pump a compatible diesel fuel having a first composition or specification, such as "Diesel Fuel Spec 1," from storage tank 212 into pipeline segment 250 of pipeline 202. "Terminal 1" 210 may include many additional storage tanks in addition to storage tanks 211, 212, shown in FIG. 2. Each of the additional storage tanks may be in fluid communication with or fluidly coupled with pipeline segment 250 of pipeline 202 as well as upstream pipeline segments of pipeline 202 or another pipeline.

"Terminal 1" 210 is in fluid communication with or fluidly coupled with "Terminal 2" 220 via pipeline segment 250 of pipeline 202, as depicted in FIG. 2. "Terminal 2" 220 may have a plurality of storage tanks, such as storage tanks 221, 222, 223 configured to at least temporarily store a particular fuel before the particular fuel is injected or pumped into pipeline segment 275 to be transported to "Terminal 3" 230, or into another pipeline segment, truck, railcar, plane, or waterborne transport. As depicted in FIG. 2, the fuel stored in storage tanks 221, 222, 223 is received from upstream pipeline segment 250 of pipeline 202 via one or more conduits 224, 228, 229, after being separated into separate fuel streams after being received at "Terminal 2" 220. Storage tanks 221, 222, 223 may be in fluid communication with or fluidly coupled to one or more additional pipeline segments of pipeline 202, such as pipeline segment 275, or another pipeline, or may be configured to discharge the fuel contained therein to another form of transport such as railcar, truck, or marine transport.

As depicted in FIG. 2, "Terminal 2" 220 includes storage tank 221 configured to store and contain renewable diesel (RD). Storage tank 221 is in fluid communication with or fluidly coupled with pipeline segment 250 of pipeline 202 via conduit 229. Conduit 229 is operable to conduct the flow of renewable diesel from the terminal end of pipeline segment 250 to storage tank 221. Storage tank 221 may be in fluid communication with or fluidly coupled via conduit 229 to a separator for separating the fuels and their mixed interface volumes, as well as one or more flowmeters and composition measurement devices, for example as shown in FIGS. 6-8. "Terminal 2" 220 may also include storage tank 222 configured to store and contain the mixed interface volume, e.g., "RD/DF Spec 1 Interface," generated by moving or transporting renewable diesel through pipeline segment 250 of pipeline 202 wrapped or preceded by and followed by movements of a compatible diesel fuel, such as "Diesel Fuel Spec 1." Storage tank 222 is in fluid communication with or fluidly coupled to the terminal end of pipeline segment 250 by conduit 228. Storage tank 222 may be in fluid communication with or fluidly coupled via conduit 228 to a separator for separating the fuels and their mixed interface volumes, as well as one or more flowmeters and composition measurement devices, for example as shown in FIGS. 6-8. "Terminal 2" 220 may also include storage tank 223 configured to store and contain diesel fuel having a first specification or first composition, e.g., "Diesel Fuel Spec 1." Storage tank 223 is in fluid communication with or fluidly coupled to the terminal end of pipeline segment 250 by conduit 224. Storage tank 223 may be in fluid communication with or fluidly coupled via conduit 224 to a separator for separating the fuels and their mixed interface volumes, as well as one or more flowmeters and composition measurement devices, for example as shown in FIGS. 6-8.

"Terminal 2" 220 is in fluid communication with or fluidly coupled with "Terminal 3" 230 via pipeline segment 275 of pipeline 202, as depicted in FIG. 2. Storage tank 223 is in fluid communication with or fluidly coupled with pipeline segment 275 of pipeline 202 by conduit 251. Conduit 251 is operable to conduct the flow of diesel fuel having the first specification or first composition (e.g., "Diesel Fuel Spec 1") from storage tank 223 to pipeline segment 275 of pipeline 202. Conduit 251 and storage tank 223 may be coupled with a pump that is operable to inject or pump diesel fuel from storage tank 223 into pipeline segment 275 of pipeline 202. Storage tank 221 is in fluid communication with or fluidly coupled with pipeline segment 275 of pipeline 202 by conduit 252. Conduit 252 is operable to conduct the flow of renewable diesel from storage tank 221 to pipeline segment 275 of pipeline 202. Conduit 252 and storage tank 221 may be coupled with a pump that is operable to inject or pump renewable diesel from storage tank 221 into pipeline segment 275 of pipeline 202. Similarly, storage tank 222 is in fluid communication with or fluidly coupled with pipeline segment 275 of pipeline 202 by conduit 253. Conduit 253 is operable to conduct the flow of mixed interface volume (e.g., "RD/DF Spec 1 Interface") from storage tank 222 to pipeline segment 275 of pipeline 202. Conduit 253 and storage tank 222 may be coupled with a pump that is operable to inject or pump renewable diesel from storage tank 222 into pipeline segment 275 of pipeline 202.

As depicted in FIG. 2, "Terminal 3" 230 includes storage tank 231 configured to store and contain renewable diesel (RD). Storage tank 231 is in fluid communication with or fluidly coupled with pipeline segment 275 of pipeline 202 via conduit 239. Conduit 239 is operable to conduct the flow of renewable diesel from the terminal end of pipeline segment 275 to storage tank 231. Storage tank 231 may be (a) in fluid communication with or (b) fluidly coupled via conduit 239 to a separator for separating the fuels and their mixed interface volumes, as well as one or more flowmeters and composition measurement devices, for example as shown in FIGS. 6-8. "Terminal 3" 230 may also include storage tank 232 configured to store and contain the mixed interface volume, e.g., "RD/DF Spec 1 Interface," that has been transported from storage tank 222 at "Terminal 2" 220 via conduit 253 and pipeline segment 275, as well as additional mixed interface volume generated by moving or transporting the mixed interface volume itself as well as any renewable diesel through pipeline segment 275 of pipeline 202. For example, as shown in FIG. 2, when mixed interface volume 263, e.g., "RD/DF Spec 1 Interface," is moved through pipeline segment 275, additional mixed interface volume 262, 264 is generated at the interface of the mixed interface volume 263 and the fuels that may be used to wrap the mixed interface volume 261, 265, such as renewable diesel 265 and diesel fuel having the first specification or first composition 261.

Storage tank 232 is in fluid communication with or fluidly coupled to the terminal end of pipeline segment 275 by conduit 238. Storage tank 232 may be in fluid communication with or fluidly coupled via conduit 238 to a separator for separating the fuels and their mixed interface volumes, as well as one or more flowmeters and composition measurement devices, for example as shown in FIGS. 6-8. "Terminal 3" 230 may also include storage tank 233 configured to store and contain diesel fuel having a second target specification or second target composition, e.g., "Diesel Fuel Spec 2." "Terminal 3" 230 also includes conduit 235 for conducting the flow of a compatible diesel fuel, such as "Diesel Fuel Spec 1," from the terminal end of pipeline segment 275 towards storage tank 233. "Terminal 3" 230 also includes an injection conduit 237 operable to conduct the mixed interface volume, or a portion thereof, stored in storage tank 232 into the flowline 235 conducting the compatible diesel fuel, such as "Diesel Fuel Spec 1," toward storage tank 233. As shown in FIG. 2, injection conduit 237 is in fluid communication with or fluidly coupled to conduit 235 such that injection conduit 237 is operable to cause the combining or mixing of the mixed interface volume stored in storage tank 232 with the separated compatible diesel fuel conducted by conduit 235. Injection conduit 237 may also be in fluid communication with or fluidly coupled with one or more injection valves, mixing manifolds, pumps, flowmeters, and composition measurement devices, as shown for example in FIG. 6. "Terminal 3" 230 may also include conduit 236 operable to conduct the injected mixed fuel, such as "Diesel Fuel Spec 2," to storage tank 233 for storage and containment.

"Terminal 3" 230 may include many additional storage tanks in addition to storage tanks 231, 232, 233 shown in FIG. 2. Each of the additional storage tanks may be in fluid communication with or fluidly coupled with pipeline segment 275 of pipeline 202 as well as downstream pipeline segments of pipeline 202 or another pipeline. In certain embodiments, "Terminal 3" 230 may be an end terminal with respect to "Diesel Fuel Spec 2," such that no further movements of "Diesel Fuel Spec 2" in pipeline 202 are needed and the "Diesel Fuel Spec 2" stored in storage tank 233 may comprise an end product ready to be marketed, labeled, and/or transported via private pipeline, railcar, truck, or water-based transport.

In certain embodiments, method 200, depicted in FIG. 2, is a method for transporting renewable diesel through pipeline 102, or pipeline segment 150 thereof. In certain other embodiments, method 200 is a method for substantially eliminating or substantially reducing the loss of mixed interface generated by a plurality of pipeline movements of renewable diesel through a pipeline 102 or segments thereof. In certain embodiments, method 200 may include providing a diesel fuel (e.g., "Diesel Fuel Spec 1" 215, 219) compatible with renewable diesel 217. The diesel fuel may have a first predetermined composition comprising a selected or maximum amount of the renewable diesel, or a component thereof, the selected or maximum amount being less than the selected or maximum amount allowed in a second target composition for the diesel fuel 283 (e.g., "Diesel Fuel Spec 2" 283). Method 200 may further include transporting a first movement of the diesel fuel 219 having the first predetermined composition from a first pipeline terminal 210 to a second pipeline terminal 220. Method 200 may further include transporting a first movement of the renewable diesel 217 immediately sequentially following the first movement of the diesel fuel 219 having the first predetermined composition from the first pipeline terminal 210 to the second pipeline terminal 220, such that the head of the first movement of the renewable diesel 217 is wrapped by (e.g., interfaces with) the tail of the first movement of the diesel fuel 219 having the first predetermined composition. Method 200 may further include transporting a second movement of the diesel fuel 215 having the first predetermined composition immediately sequentially following the first movement of the renewable diesel 217 from the first pipeline terminal 210 to the second pipeline terminal 220, such that the tail of the first movement of the renewable diesel 217 is wrapped by (e.g., interfaces with) the head of the second movement of the diesel fuel 215 having the first predetermined composition.

Method 200 may further include separating, at the second terminal 220, a renewable diesel fraction stream 279, a diesel fuel having the first predetermined composition fraction stream 275, and a mixed interface fraction stream 278 from the fuel volumes received at the second terminal 220. The mixed interface fraction stream 278 comprises a mixture of the renewable diesel and diesel fuel that results from interfacial mixing between the first movement of diesel fuel 219 and the first movement of renewable diesel 217, as well as interfacial mixing between the second movement of diesel fuel 215 and the first movement of renewable diesel 217.

In certain embodiments, method 200 may include flowing, at the second terminal 220, the renewable diesel fraction stream 279 to a first storage tank 221 positioned at the second terminal 220 via conduit 229 to generate a stored renewable diesel fraction 271. Method 200 may further include flowing the mixed interface fraction stream 278 to a second storage tank 222 positioned at the second terminal 220 via conduit 228 to generate a stored mixed interface fraction 272. Method 200 may further include flowing the diesel fuel having the first predetermined composition (e.g., "Diesel Fuel Spec 1") stream 275 to a third storage tank 223 positioned at the second terminal 220 via conduit 224 to generate a stored diesel fuel fraction 274.

Method 200 may further include flowing the stored mixed interface fraction 272 from the second storage tank 222 to the second terminal 220 end of pipeline segment 275, via conduit 253, so that the stored mixed interface fraction 272 may be transported to the third terminal 230. Method 200 may further include flowing the stored renewable diesel fraction 271 from the first storage tank 221 to the second terminal 220 end of pipeline segment 275, via conduit 252, so that the stored renewable diesel fraction 271 may be transported to the third terminal 230. Method 200 may further include flowing the stored diesel fuel fraction 274 from the third storage tank 223 to the second terminal 220 end of pipeline segment 275, via conduit 251, so that the stored diesel fuel fraction 274 may be transported to the third terminal 230.

Method 200 may further include transporting a third movement 261 of the diesel fuel having the first predetermined composition from the second pipeline terminal 220 to the third pipeline terminal 230. Method 200 may further include transporting a first movement 263 of the mixed interface stream 278 or the stored mixed interface fraction 272 immediately sequentially following the third movement 261 of the diesel fuel having the first predetermined composition, from the second pipeline terminal 220 to the third pipeline terminal 230 via pipeline segment 275, such that the head of the mixed interface fraction movement 263 is wrapped by (e.g., interfaces with) the tail of the third movement 261 of the diesel fuel having the first predetermined composition. Method 200 may further include transporting a second movement 265 of the renewable diesel immediately sequentially following the mixed interface fraction stream 263, from the second pipeline terminal 220 to the third pipeline terminal 230 via pipeline segment 275, such that the tail of the mixed interface fraction movement 263 is wrapped by (e.g., interfaces with) the head of the second movement of the renewable diesel 265.

As shown in FIG. 2, the mixed interface fraction 263 moved from the second terminal 220 to the third terminal 230 may be expected to have an approximate composition corresponding to a 50/50 mixture by volume of the renewable diesel and the diesel fuel as a result of wrapping the renewable diesel 217 head and tail with the diesel fuel 215, 219 during movement from the first terminal 210 to the second terminal 220, and as a result of the operating parameters of pipeline segment 250 and/or pipeline 202. This approximate 50/50 composition, achieved as a result of controlling the compositional parameters and relative volumes of the fuel movements used to wrap the renewable diesel, confers certain advantages for the later injection of the mixed interface. In particular, the approximate 50/50 composition allows more efficient and predictable determination of the injection parameters required for consuming the mixed interface at an end terminal through injection into the diesel fuel to produce the diesel fuel meeting the second target specification 283 or composition, while reducing the burden and reliance of the use of compositional measurements in determining the injection parameters. By wrapping the mixed interface volume 263 with a head of diesel fuel having the first predetermined specification 261 and a tail of renewable diesel 265, or vice versa, the mixed interfaces 262, 264 resulting from movement of the mixed interface volume 263, once cut out and combined, maintain the approximate 50/50 composition of the mixed interface stream 288 and stored mixed interface fraction 282. For example, the mixed interface 262 formed between the third movement of diesel fuel having the first predetermined composition 261 and the mixed interface volume 263 would be expected to have an approximate composition of 75/25 diesel fuel volume to renewable diesel volume. However, the composition of mixed interface volume 262 is offset by the mixed interface volume 264 generated at the interface of mixed interface volume 263 and the second movement of renewable diesel 265, which is expected to have an approximate composition of 75/25 renewable diesel volume to diesel fuel volume. Method 200 may further include separating, at the third terminal 230, a renewable diesel fraction stream 289, a diesel fuel fraction stream 285 having the first predetermined composition, and a mixed interface fraction stream 288 from the fuel volumes received at the third terminal 230. The mixed interface fraction stream 288 comprises the mixed interface volume 263 originating from the mixed interface stream 278 or stored mixed interface fraction 272 transported from the second terminal 220, as well as the mixed interface fractions 262, 264 formed during transport along pipeline segment 275 from the second terminal 220 to the third terminal 230.

Method 200 may also include injecting at the third terminal 230 at least a portion of the mixed interface fraction stream 288 into the diesel fuel fraction stream 285 having the first predetermined composition so as to produce a diesel fuel stream 286 meeting the second target specification. In certain embodiments, method 200 may further include flowing the renewable diesel fraction stream 289 to a first storage tank 231 positioned at the third terminal 230 via conduit 239 to generate a stored renewable diesel fraction 281. Method 200 may further include flowing the mixed interface fraction stream 288 to a second storage tank 232 positioned at the third terminal 230 via conduit 238 to generate a stored mixed interface fraction 282. Method 200 may further include flowing, via conduit 235, a first flow stream 285 comprising the diesel fuel fraction stream having the first predetermined composition, or first specification, or first composition towards a third storage tank 233 positioned at the third terminal 230. Method 200 may further include injecting via conduit 237, an injection flow stream 287 comprising the stored mixed interface fraction 282, or a portion thereof, into the first flow stream 285 to produce a diesel fuel stream meeting the second target specification 286. Method 200 may further include storing the diesel fuel stream 286 having the second target specification (e.g., "Diesel Fuel Spec 2") in the third storage tank 233 as stored diesel fuel having the second target specification 283 (e.g., "Diesel Fuel Spec 2") after flowing diesel fuel stream 286 to the third storage tank 233 via conduit 236.

In certain embodiments, method 200 may include injecting at least a portion of the mixed interface fraction stream 288 or stored mixed interface fraction 282 into the diesel fuel fraction stream 285 having the first predetermined composition such that substantially all of the mixed interface fraction stream generated from the movement of the first movement of renewable diesel 217 between the first terminal 210 and the second terminal 220 is eliminated as diesel fuel having the second target specification 283, 286 rather than being lost as trans-mix that needs to be reprocessed at a refinery or similar facility. In certain embodiments, substantially the entire volume of the mixed interface fraction stream generated from the movement of the first movement of renewable diesel 217 between the first terminal 210 and the second terminal 220, as well as the mixed interface volumes 262, 264 generated as a result of the transport of the mixed interface volume from the second terminal 220 to the third terminal 230, is eliminated as diesel fuel having the second target specification 283, 286 rather than being lost as trans-mix that needs to be reprocessed at a refinery or similar facility. In certain embodiments, the entire volume of the first movement of renewable diesel 217 transported from the first terminal 210 to the second terminal 220 qualifies and/or maintains its qualifying status for the Renewable Identification Number (RIN) credit and the Low Carbon Fuel Standard (LCFS) credit, as a result of the mixed interface reinjection system 205 and method 200 depicted in FIG. 2. In certain embodiments, the entire volume of the second movement of renewable diesel 265 transported from the second terminal 220 to the third terminal 230 qualifies and/or maintains its qualifying status for the Renewable Identification Number (RIN) credit and the Low Carbon Fuel Standard (LCFS) credit, as a result of the mixed interface reinjection system 205 and method 200 depicted in FIG. 2.

In certain embodiments, the third terminal 230 may be an end product terminal with respect to the diesel fuel stream 286 or stored diesel fraction 283 having the second target composition or the second target composition. In such embodiments, the method 200 may include supplying the diesel fuel stream 286 having the second target specification to a storage tank, such as storage tank 233, in fluid communication with or fluidly coupled with pipeline segment 275 or pipeline 202. Method 200 may further include supplying, from the storage tank (e.g., storage tank 233 or another storage tank at the third terminal 230), the diesel fuel having the second target specification 286 or the stored diesel fuel fraction 283 to one or more transportation vehicles selected from the group consisting of a waterborne transport vessel, tanker truck, railway car, and aircraft. Method 200 may alternatively include supplying the diesel fuel having the second target specification 286 or the stored diesel fuel fraction 283 to one or more end-use product pipelines.

Method 200 may further include restricting the transport of the diesel fuel in pipeline segments 250, 275 and/or pipeline 202 to diesel fuel compositions having the first predetermined composition, a first specification, or first composition, e.g., "Diesel Fuel Spec 1." The predetermined composition, first specification, or first composition may be characterized, in certain embodiments, by a selected or maximum amount of the renewable diesel, or a component thereof. In certain embodiments, the selected or maximum amount is less than the selected or maximum amount allowed in a second target specification or second target composition for the diesel fuel. In certain embodiments, method 200 may include restricting use of pipeline 202 and/or pipeline segments 250, 275 with respect to all movements of the diesel fuel to diesel fuel compositions having the first predetermined composition, first specification, or the first composition. In certain embodiments, method 200 may include restricting the use of selected terminals of the pipeline 202, such as the first terminal 210, second terminal 220, and third terminal 230, depicted in FIG. 2, with respect to movements of diesel fuel to diesel fuel compositions having the first predetermined composition, first specification, or first composition.

Restricting the transport of the diesel fuel in pipeline segments 250, 275 and/or pipeline 202 to diesel fuel compositions having the first predetermined composition, first specification, or first composition may include, for example, changing the requirements of the transport of all movements of fuels classified as the diesel fuel on pipeline 202 and/or pipeline segments 250, 275 between the first terminal 210 and the second terminal 220, and between the second terminal 220 and the third terminal 230, such that all movements of fuels classified as the diesel fuel have a composition corresponding to the first predetermined composition, the first specification, or the first composition. As a result, all users or shippers using the pipeline 202 and/or pipeline segments 250, 275 would be restricted from the transport or movement of fuels classified as the diesel fuel unless that fuel is characterized by a composition meeting the first predetermined composition, the first specification, or the first composition.

In certain embodiments, the first predetermined composition, first specification, or the first composition may comprise a selected or maximum amount of renewable diesel by volume. For example, in certain embodiments, the first specification or first composition may comprise a selected or maximum amount of 2% by volume of renewable diesel. In certain other embodiments, the first specification or first composition may comprise a selected or maximum amount of 3% by volume of renewable diesel. In certain embodiments, the first specification or first composition may comprise a selected or maximum amount of about 1% by volume, or about 1.25% by volume, or about 1.5% by volume, or about 1.75% by volume, or about 2.0% by volume, or about 2.25% by volume, or about 2.5% by volume, or about 2.75% by volume, or about 3.0% by volume, or about 3.25% by volume, or about 3.5% by volume, or about 3.75% by volume, or about 4.0% by volume, or about 4.25% by volume, or about 4.5% by volume of renewable diesel, or a component thereof. In certain embodiments, the first specification or the first composition may correspond to a selected or maximum amount of from about 0% to about 3% by volume, or from about 0% to about 2% by volume, or from about 0% to about 4.5% by volume, or from about 1% to about 2.5% by volume, or from about 1% to about 3% by volume or from about 1% to about 4.5% by volume, or from about 2% to about 4.5% by volume of renewable diesel, or a component thereof.

In certain embodiments, the first predetermined composition, first specification, or first composition may comprise a selected or maximum amount of the renewable diesel, or a component thereof, that is 60% or less of the selected or maximum amount allowed in the second compositional target specification. In certain embodiments, the first specification or first composition may comprise a selected or maximum amount of the renewable diesel, or a component thereof, that is no greater than half of the selected or maximum amount allowed in the second compositional target specification. In certain other embodiments, the first specification or the first composition may comprise a selected or maximum amount of the renewable diesel, or a component thereof, that is 40% or less of the selected or maximum amount allowed in the second compositional target specification. In still other embodiments, the first specification or first composition may comprise a selected or maximum amount of the renewable diesel, or a component thereof, that is 60% of the selected or maximum amount allowed in the second compositional target specification. In certain embodiments, the first specification or first composition may comprise a selected or maximum amount of the renewable diesel, or a component thereof, that is half of the selected or maximum amount allowed in the second compositional target specification. In certain other embodiments, the first specification or first composition may comprise a selected or maximum amount of the renewable diesel, or a component thereof, that is 40% of the selected or maximum amount allowed in the second compositional target specification.

In certain embodiments, the diesel fuel, such as "Diesel Fuel Spec 1" depicted as an exemplary embodiment in FIG. 2, is a substantially non-renewable diesel fuel. In such embodiments, the diesel fuel may be classified as a type or sub-type of diesel fuel but is not classified as a renewable diesel fuel. In certain embodiments, the diesel fuel may be classified as a No. 2 diesel fuel. In certain embodiments, the diesel fuel may be an Ultra Low Sulfur Diesel Fuel (ULSD). In such embodiments, the diesel fuel may be a diesel fuel comprising a sulfur level no greater than 0.0015 percent by weight (15 ppm). In some embodiments, the diesel fuel may be a No. 2 diesel fuel with a sulfur level no greater than 0.0015 percent by weight (15 ppm) and with an aromatic hydrocarbon content limited to 10 percent by volume. In certain embodiments, the diesel fuel may be a California Air Resources Board (CARB) Ultra Low Sulfur Diesel Fuel (ULSD) No. 2.

In certain embodiments, the second target specification or second target composition may correspond to a diesel fuel composition selected from the group consisting of a diesel fuel end product specification, a diesel fuel labeling requirement, a diesel fuel composition required for government accreditation or credit, a diesel fuel composition corresponding to a particular known emissions rating, and any combination thereof. In certain embodiments, the second target specification or second target composition comprises less than 5% by volume renewable diesel. In certain embodiments, the second target specification is the Federal Trade Commission (FTC) Label Law limit of less than 5% Renewable Diesel (RD) in CARB ULSD No. 2.

In certain embodiments, the first movement of renewable diesel 217 and/or the second movement of renewable diesel 265 may comprise a minimum volume of 10,000 barrels. In certain embodiments, the first movement of renewable diesel 217 and/or the second movement of renewable diesel 265 may comprise a minimum volume of 12.500 barrels, or 15,000 barrels, or 17,500 barrels, or 20,000 barrels. In certain embodiments, the first movement of renewable diesel 217 and/or the second movement of renewable diesel 265 may comprise a volume of from about 10,000 barrels to about 12,500 barrels, or from about 10,000 barrels, to about 15,000 barrels, or from about 10,000 barrels to about 17,500 barrels, or from about 10,000 barrels to about 20,000 barrels. In certain embodiments, method 200 may further include restricting pipeline 202 and/or pipeline segments 250, 275 to renewable diesel movements having a minimum volume of 10,000 barrels and a selected or maximum volume of 12.500 barrels, or having a minimum volume of 10,000 barrels and a selected or maximum volume of 15,000 barrels, or having a minimum volume of 10,000 barrels and a selected or maximum volume of 17,500 barrels, or having a minimum volume of 10,000 barrels and a selected or maximum volume of 20,000 barrels.

In certain embodiments, the first movement of diesel fuel 219 and/or the second movement of diesel fuel 215 and/or the third movement of diesel fuel 261 may comprise a minimum volume of 10,000 barrels. In certain embodiments, the first movement of diesel fuel 219 and/or the second movement of diesel fuel 215 and/or the third movement of diesel fuel 261 may comprise a minimum volume of 20,000 barrels, or 25,000 barrels, or 30,000 barrels, or 32,000 barrels, or 35,000 barrels, or 37,000 barrels, or 40,000 barrels. In certain embodiments, the first movement of diesel fuel 219 and/or the second movement of diesel fuel 215 and/or the third movement of diesel fuel 261 may comprise a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 200 may further include restricting pipeline 202 and/or pipeline segments 250, 275 to diesel fuel movements having a minimum volume of 20,000 barrels, or 25,000 barrels, or 30,000 barrels, or 32,000 barrels, or 35,000 barrels, or 37,000 barrels, or 40,000 barrels. In certain embodiments, method 200 may further include restricting pipeline 202 and/or pipeline segments 250, 275 to diesel fuel movements having a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 200 may further include restricting pipeline 202 and/or pipeline segments 250, 275 to a total volumetric flow ratio, with respect to renewable diesel and diesel fuel, of no less than about 20,000 barrels, or about 25,000 barrels, or about 30,000 barrels, or about 32,750 barrels, or about 35,000 barrels, or about 37,500 barrels, or about 40,000 barrels, or about 45,000 barrels, or about 50,000 barrels diesel fuel for every 10,000 barrels of renewable diesel transported through pipeline 202 or a segment thereof, such as pipeline segments 250, 275. In certain embodiments, method 200 may include injecting at least a portion of the mixed interface fraction stream 288 or stored mixed interface fraction 282 into the diesel fuel fraction stream 285 such that substantially all of the mixed interface fraction stream generated from the movements of the first movement of renewable diesel 217 between the first terminal 210 and the second terminal 220, as well as the second movement of renewable diesel 265 and the movement of mixed interface 263 (generated during the first movement of renewable diesel) from the second terminal 220 to the third terminal 230, is eliminated as diesel fuel having the second target specification 283, 286 rather than being lost as trans-mix that needs to be reprocessed at a refinery or similar facility. In certain embodiments, the entire volume of the first movement of renewable diesel 217 transported from the first terminal 210 to the second terminal 220 qualifies and/or maintains its qualifying status for the Renewable Identification Number (RIN) credit and the Low Carbon Fuel Standard (LCFS) credit, as a result of the mixed interface reinjection system 205 and method 200 depicted in FIG. 2. In certain embodiments, the entire volume of the first and second movements of renewable diesel 217, 265 transported from the first terminal 210 to the third terminal 230 qualifies and/or maintains its qualifying status for the Renewable Identification Number (RIN) credit and the Low Carbon Fuel Standard (LCFS) credit, as a result of the mixed interface reinjection system 205 and method 200 depicted in FIG. 2.

In certain embodiments, the third terminal 220 may be an end product terminal with respect to the diesel fuel stream 283 or stored diesel fraction having the second target composition or the second target composition. In such embodiments, the method 200 may include supplying the diesel fuel stream 286 having the second target specification to a storage tank, such as storage tank 233, in fluid communication with or fluidly coupled with pipeline segment 275 or pipeline 202. Method 200 may further include supplying, from the storage tank (e.g., storage tank 233 or another storage tank at the third terminal 230), the diesel fuel having the second target specification 286 or the stored diesel fuel fraction 283 to one or more transportation vehicles selected from the group consisting of a waterborne transport vessel, tanker truck, railway car, and aircraft. Method 200 may alternatively include supplying the diesel fuel having the second target specification 286 or the stored diesel fuel fraction 283 to one or more end-use product pipelines.

In certain embodiments, method 200 may further include determining one or more chemical or physical characteristics of the diesel fuel fraction stream 285 having the first specification or first composition (e.g., "Diesel Fuel Spec 1") and/or the mixed interface stream 288 or stored mixed interface fraction 282. The one or more chemical or physical characteristics may be measured by one or more measurement devices placed in-line or coupled with pipeline segment 275, the separator for separating the fuel streams at the second terminal 230, or the conduits 235, 238 conducting the diesel fuel fraction stream 285 or mixed interface stream 288, as further elucidated in FIGS. 6-8. In certain embodiments, the one or more chemical or physical characteristics of the stored mixed interface fraction may be measured at or in the storage tank 232 containing the stored mixed interface fraction 282. In at least certain embodiments, the one or more chemical or physical characteristics may be specific gravity. In such embodiments, the specific gravity may be measured by one or more gravitometers. For example, the one or more measurement devices may be one or more in-line gravitometers or one or more manual gravitometers.

Method 200 may also include determining the flow rate of the diesel fuel fraction stream 285 having the first specification or first composition. For example, the flow rate may be measured by one or more flowmeters coupled with conduit 225 conducting the flow of the diesel fuel fraction stream 285 having the first specification or first composition, as further elucidated in FIGS. 6-8. Method 200 may further include determining, based on the determined one or more chemical or physical characteristics and the flow rate, one or more injection parameters such that when the stored mixed interface fraction 282 (e.g., "RD/DF Spec 1 Interface") is injected according to the one or more determined injection parameters, the diesel fuel stream having the second target specification 286 (e.g., "Diesel Fuel Spec 2") is produced. The one or more injection parameters may be, for example, the injection flow rate necessary to efficiently consume the stored mixed interface fraction 282 while still generating the diesel fuel stream having the second target specification 286 (e.g., "Diesel Fuel Spec 2"). Method 200 may further include injecting, based on the one or more determined injection parameters, the stored mixed interface fraction 282, or a portion thereof, into the first flow stream 285 to produce the diesel fuel stream meeting the second target specification 286.

Figure 3:
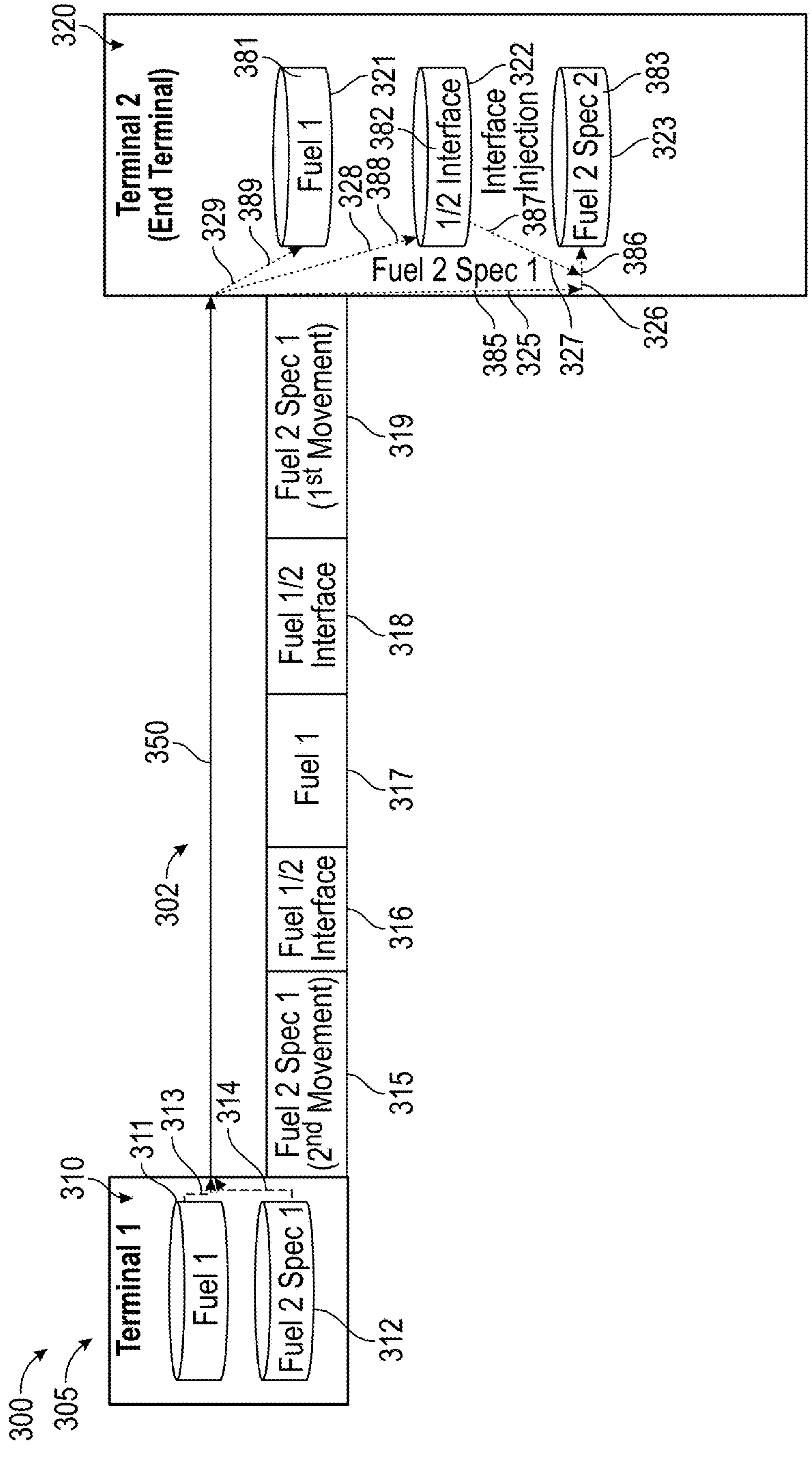
FIG. 3 is a graphical representation of a system and method for transporting a first fuel and a second fuel compatible with the first fuel through a pipeline between a first terminal and a second terminal, according to an exemplary embodiment of the present disclosure.

FIG. 3 is a graphical representation of a method 300 and a system 305 for transporting a first fuel (e.g., "Fuel 1") 317 through a pipeline segment 350 of pipeline 302 between a first terminal 310 and a second terminal 320, according to an exemplary embodiment of the present disclosure. In certain embodiments, pipeline segment 350 and/or pipeline 302 may be a common carrier pipeline in which many different fuels are transported from many different sources or producers. In at least some embodiments, pipeline segment 350 and/or pipeline 302 may be a Federal Energy Regulatory Commission (FERC) regulated pipeline. Pipeline 302 may extend between and therethrough many terminals. As depicted in FIG. 3, pipeline segment 350 of pipeline 302 extends between a first terminal 310, or "Terminal 1" 310, and a second terminal 320, or "Terminal 2" 320, thereby fluidly coupling or enabling fluid communication between "Terminal 1" 310 and "Terminal 2" 320. However, pipeline 302 may extend beyond "Terminal 1" 310 and "Terminal 2" 320 to fluidly couple or enabling fluid communication between "Terminal 1" 310 and "Terminal 2" 320 to other pipeline terminals along pipeline 302. Accordingly, first terminal 310 or "Terminal 1" 310 may be in fluid communication with or fluidly coupled to one or more preceding terminals upstream of first terminal 310 or "Terminal 1" 310, in addition to being in fluid communication with or fluidly coupled with one or more downstream terminals, such as second terminal 320 or "Terminal 2" 320. Likewise, second terminal 320 or "Terminal 2" 320 may be in fluid communication with or fluidly coupled to one or more subsequent terminals downstream of second terminal 320 or "Terminal 2" 320, in addition to being in fluid communication with or fluidly coupled with one or more upstream terminals, such as first terminal 310 or "Terminal 1" 310.

As depicted in FIG. 3, "Terminal 1" 310 may have a plurality of storage tanks, such as storage tanks 311, 312, configured to at least temporarily store a particular fuel before the particular fuel is injected or pumped into pipeline segment 350 of pipeline 302. The fuel stored in storage tanks 311, 312, may be received from an upstream pipeline segment of pipeline 302, or from a pipeline segment belonging to a different pipeline, or received from another transportation types or methods, such as by rail, truck, or marine transport. The storage tanks 311, 312 are in fluid communication with or fluidly coupled with pipeline segment 350 of pipeline 302 by one or more conduits, such as conduits 313, 314.

As depicted in FIG. 3, "Terminal 1" 310 includes storage tank 311 configured to store and contain the first fuel (e.g., "Fuel 1") and storage tank 312 configured to store and contain a compatible second fuel having a first predetermined composition, a first specification, or a first composition (e.g., "Fuel 2 Spec 1"). Storage tank 311 is in fluid communication with or fluidly coupled with pipeline segment 350 of pipeline 302 by conduit 313. Conduit 313 is operable is to conduct the flow of the first fuel from storage tank 311 to pipeline segment 350 of pipeline 302. Conduit 313 and storage tank 311 may be coupled with a pump that is operable to inject or pump the first fuel from storage tank 311 into pipeline segment 350 of pipeline 302.

Similarly, storage tank 312 is in fluid communication with or fluidly coupled with pipeline segment 350 of pipeline 302 by conduit 314. Conduit 314 is operable to conduct the flow of a compatible second fuel having a first composition or specification, such as "Fuel 2 Spec 1" from storage tank 312 to pipeline segment 350 of pipeline 302. Conduit 314 and storage tank 312 may be coupled with a pump that is operable to inject or pump a compatible second fuel having a first composition or specification, such as "Fuel 2 Spec 1," from storage tank 312 into pipeline segment 350 of pipeline 302. "Terminal 1" 310 may include many additional storage tanks in addition to storage tanks 311, 312, shown in FIG. 3. Each of the additional storage tanks may be in fluid communication with or fluidly coupled with pipeline segment 350 of pipeline 302 as well as upstream pipeline segments of pipeline 302 or another pipeline.

"Terminal 1" 310 is in fluid communication with or fluidly coupled with "Terminal 2" 320 via pipeline segment 350 of pipeline 302, as depicted in FIG. 3. "Terminal 2" 320 may have a plurality of storage tanks, such as storage tanks 321, 322, 323 configured to at least temporarily store a particular fuel before the particular fuel is injected or pumped into another pipeline segment or into a truck, rail car, or marine transport. As depicted in FIG. 3, the fuel stored in storage tanks 321, 322, 323 is received from upstream pipeline segment 350 of pipeline 302 via one or more conduits 325, 326, 327, 328, 329. Storage tanks 321, 322, 323 may be in fluid communication with or fluidly coupled to one or more additional pipeline segments of pipeline 302 or another pipeline, or may be configured to discharge the fuel contained therein to another form of transport such as railcar, truck, or marine transport.

As depicted in FIG. 3, "Terminal 2" 320 includes storage tank 321 configured to store and contain the first fuel (e.g., "Fuel 1"). Storage tank 321 is in fluid communication with or fluidly coupled with pipeline segment 350 of pipeline 302 via conduit 329. Conduit 329 is operable to conduct the flow of fuel 1 from the terminal end of pipeline segment 350 to storage tank 321. Storage tank 321 may be in fluid communication with or fluidly coupled via conduit 329 to a separator for separating the fuels and their mixed interface volumes, as well as one or more flowmeters and composition measurement devices, for example as shown in FIGS. 6-8. "Terminal 2" may also include storage tank 322 configured to store and contain the mixed interface volume, e.g., "Fuel 1/Fuel 2 Interface," generated by moving or transporting the first fuel through pipeline segment 350 of pipeline 302 wrapped or preceded by and followed by movements of a compatible second fuel, such as "Fuel 2 Spec 1." Storage tank 322 is in fluid communication with or fluidly coupled to the terminal end of pipeline segment 350 by conduit 328. Storage tank 322 may be in fluid communication with or fluidly coupled via conduit 328 to a separator for separating the fuels and their mixed interface volumes, as well as one or more flowmeters and composition measurement devices, for example as shown in FIGS. 6-8.

In an embodiment, the separator may include one or more devices, components, or equipment, such as one or more flow control devices operating, in an example, in conjunction with one or more sensors or meters and a controller. In such examples, the controller may determine, based on a number of injection parameters and/or other parameters (such as gravity, density, bbl for each selected cut, and/or flow rate) when (for example, a time to separate one type of fluid from another) and where (for example, a selected storage tank and/or transportation vehicle) to divert a selected cut. In another embodiment, the flow control device may be manually actuatable to enable a user to physically divert flow, thus allowing for redundancy and backup. The flow control device may include one or more of a pump, a valve, a control valve, diverters, or a manifold. The flow control device may ensure that a pipeline cut is directed to the proper storage tank based on the selected cut (for example, the selected comprising one of the renewable diesel, the diesel fuel or first and second diesel fuel, and/or the mixed interface at the head or tail of the renewable diesel). In an embodiment, the one or more sensors or meters may include gravitometers, densitometers, temperature sensors, pressure sensors or transducers, flow meters, sensors or meters to determine other compositional characteristics of a fluid, and/or other sensors or meters configured to measure some parameter of fluid flowing through a pipeline. Such one or more sensors or meters may be positioned proximate the flow control and/or at a selected distance from the flow control device. Thus, diversion may occur at a time to minimize blending a mixing interface with a diesel or renewable diesel.

"Terminal 2" 320 also includes conduit 325 for conducting the flow of a compatible second fuel, such as "Fuel 2 Spec 1," from the terminal end of pipeline segment 350 towards storage tank 323. "Terminal 2" 320 also includes an injection conduit 327 operable to conduct the mixed interface volume, or a portion thereof, stored in storage tank 322 into the flowline conducting the compatible second fuel, such as "Fuel 2 Spec 1," toward storage tank 323. As shown in FIG. 3, injection conduit 327 is in fluid communication with or fluidly coupled to conduit 325 such that injection conduit 327 is operable to cause the mixing of the mixed interface volume stored in storage tank 322 with the separated compatible second fuel conducted by conduit 325. Injection conduit 327 may also be in fluid communication with or fluidly coupled with one or more injection valves, mixing manifolds, pumps, flowmeters, and composition measurement devices, as shown for example in FIG. 6. "Terminal 2" 320 may also include conduit 326 operable to conduct the injected mixed fuel, such as "Fuel 2 Spec 2," to storage tank 323 for storage and containment.

"Terminal 2" 320 may include many additional storage tanks in addition to storage tanks 321, 322, 323 shown in FIG. 3. Each of the additional storage tanks may be in fluid communication with or fluidly coupled with pipeline segment 350 of pipeline 302 as well as downstream pipeline segments of pipeline 302 or another pipeline. In certain embodiments, "Terminal 2" 320 may be an end terminal with respect to "Fuel 2 Spec 2," such that no further movements of "Fuel 2 Spec 2" in pipeline 302 are needed and the "Fuel 2 Spec 2" stored in storage tank 323 may comprise an end product ready to be marketed, labeled, and/or transported via private pipeline, railcar, truck, or water-based transport. As depicted in FIG. 3, method 300 for transporting the first fuel through pipeline 302, or pipeline segment 350 thereof, may include transporting the first fuel 317 from a first pipeline terminal 310 to a second pipeline terminal 320 with the first fuel 317 wrapped head and tail with a compatible second fuel 315, 319, such as "Fuel 2 Spec 1" 315, 319. For example, a first movement of first fuel 317 may be wrapped head and tail with pipeline movements of a second fuel 315, 319 having a first predetermined composition, a first composition, or a first specification, such as "Fuel 2 Spec 1," so that pipeline movements of second fuel 315, 319 immediately precede and immediately follow the movement of the first fuel 317 in the pipeline 302 so as to define a wrap of second fuel around the head and tail of the first fuel 317. In particular, the first movement of first fuel 317 may be preceded in the pipeline segment 350 of pipeline 302 by a first movement of second fuel 319 such that the head of the first fuel 317 is wrapped by the tail of the first movement of the second fuel 319. The first movement of first fuel 317 may be followed in the pipeline by a second movement of second fuel 315 such that the tail of the first fuel movement 317 is wrapped by the head of the second movement of the second fuel 315.

Method 300 may further include restricting the transport of the second fuel in pipeline segment 350 and/or pipeline 302 to second fuel compositions having a first specification or first composition, e.g., "Fuel 2 Spec 1." The first specification or first composition may be characterized, in certain embodiments, by a selected or maximum amount of the first fuel, or a component thereof. In certain embodiments, the selected or maximum amount is less than the selected or maximum amount allowed in a second target specification or second target composition for the second fuel. In certain embodiments, method 300 may include restricting use of pipeline 302 and/or pipeline segment 350 with respect to all movements of the second fuel to second fuel compositions having the first predetermined composition, first specification, or the first composition. In certain embodiments, method 300 may include restricting the use of selected terminals of the pipeline 302, such as the first terminal 310 and the second terminal 320 depicted in FIG. 3, with respect to movements of the second fuel to second fuel compositions having the first predetermined composition, first specification, or first composition.

Restricting the transport of the second fuel in pipeline segment 350 and/or pipeline 302 to second fuel compositions having a first predetermined composition, first specification, or first composition may include, for example, changing the requirements of the transport of all movements of fuels classified as the second fuel on pipeline 302 and/or pipeline segment 350 between the first terminal 310 and the second terminal 320, such that all movements of fuels classified as the second fuel have a composition corresponding to the first predetermined composition, the first specification, or the first composition. As a result, all users or shippers using the pipeline 302 and/or pipeline segment 350 would be restricted from the transport or movement of fuels classified as the second fuel unless that fuel is characterized by a composition meeting the first predetermined composition, first specification, or the first composition.

In certain embodiments, the first specification or the first composition may comprise a selected or maximum amount of first fuel by volume. For example, in certain embodiments, the first specification or first composition may comprise a selected or maximum amount of 2% by volume of first fuel. In certain other embodiments, the first specification or first composition may comprise a selected or maximum amount of 3% by volume of first fuel. In certain embodiments, the first specification or first composition may comprise a selected or maximum amount of about 1% by volume, or about 1.25% by volume, or about 1.5% by volume, or about 1.75% by volume, or about 2.0% by volume, or about 2.25% by volume, or about 2.5% by volume, or about 2.75% by volume, or about 3.0% by volume, or about 3.25% by volume, or about 3.5% by volume, or about 3.75% by volume, or about 4.0% by volume, or about 4.25% by volume, or about 4.5% by volume of renewable first fuel, or a component thereof. In certain embodiments, the first specification or the first composition may correspond to a selected or maximum amount of from about 0% to about 3% by volume, or from about 0% to about 2% by volume, or from about 0% to about 4.5% by volume, or from about 1% to about 2.5% by volume, or from about 1% to about 3% by volume or from about 1% to about 4.5% by volume, or from about 2% to about 4.5% by volume of first fuel, or a component thereof.

In certain embodiments, the first specification or first composition may comprise a selected or maximum amount of the first fuel, or a component thereof, that is 60% or less of the selected or maximum amount allowed in the second target specification. In certain embodiments, the first specification or first composition may comprise a selected or maximum amount of the first fuel, or a component thereof, that is no greater than half of the selected or maximum amount allowed in the second target specification. In certain other embodiments, the first specification or the first composition may comprise a selected or maximum amount of the first fuel, or a component thereof, that is 40% or less of the selected or maximum amount allowed in the second target specification. In still other embodiments, the first specification or first composition may comprise a selected or maximum amount of the first fuel, or a component thereof, that is 60% of the selected or maximum amount allowed in the second target specification. In certain embodiments, the first specification or first composition may comprise a selected or maximum amount of the first fuel, or a component thereof, that is half of the selected or maximum amount allowed in the second target specification. In certain other embodiments, the first specification or first composition may comprise a selected or maximum amount of the first fuel, or a component thereof, that is 40% of the selected or maximum amount allowed in the second target specification.

In certain embodiments, the first fuel may be a biodiesel. In other embodiments, the first fuel may be a renewable diesel. In certain embodiments, the second fuel, such as "Fuel 2 Spec 1" depicted as an exemplary embodiment in FIG. 3, is a substantially non-renewable diesel fuel. In such embodiments, the diesel fuel may be classified as a type or sub-type of diesel fuel but is not classified as a renewable diesel fuel. In certain embodiments, the diesel fuel may be classified as a No. 2 diesel fuel. In certain embodiments, the diesel fuel may be an Ultra Low Sulfur Diesel Fuel (ULSD). In such embodiments, the diesel fuel may be a diesel fuel comprising a sulfur level no greater than 0.0015 percent by weight (15 ppm). In some embodiments, the diesel fuel may be a No. 2 diesel fuel with a sulfur level no greater than 0.0015 percent by weight (15 ppm) and with an aromatic hydrocarbon content limited to 10 percent by volume. In certain embodiments, the diesel fuel may be a California Air Resources Board (CARB) Ultra Low Sulfur Diesel Fuel (ULSD) No. 2.

In certain embodiments, the second target specification or second target composition may correspond to a second fuel composition selected from the group consisting of a second fuel end product specification, a second fuel labeling requirement, a second fuel composition required for government accreditation or credit, a second fuel composition corresponding to a particular known emissions rating, and any combination thereof. In certain embodiments, the second target specification or second target composition comprises less than 5% by volume of the first fuel. In certain embodiments, the first movement of the first fuel 317 may comprise a minimum volume of 10,000 barrels. In certain embodiments, the first movement of the first fuel 317 may comprise a minimum volume of 12,500 barrels, or 15,000 barrels, or 17,500 barrels, or 20,000 barrels. In certain embodiments, the first movement of the first fuel 317 may comprise a volume of from about 10,000 barrels to about 12,500 barrels, or from about 10,000 barrels, to about 15,000 barrels, or from about 10,000 barrels to about 17,500 barrels, or from about 10,000 barrels to about 20,000 barrels. In certain embodiments, method 300 may further include restricting pipeline 302 and/or pipeline segment 350 to first fuel movements having a minimum volume of 10,000 barrels and a selected or maximum volume of 12,500 barrels, or having a minimum volume of 10,000 barrels and a selected or maximum volume of 15,000 barrels, or having a minimum volume of 10,000 barrels and a selected or maximum volume of 17.500 barrels, or having a minimum volume of 10,000 barrels and a selected or maximum volume of 20,000 barrels.

In certain embodiments, the first movement of the second fuel 319 and the second movement of the second fuel 315 may comprise a minimum volume of 10,000 barrels. In certain embodiments, the first movement of the second fuel 319 and the second movement of the second fuel 315 may comprise a minimum volume of 20,000 barrels, or 25,000 barrels, or 30,000 barrels, or 32,000 barrels, or 35,000 barrels, or 37,000 barrels, or 40,000 barrels. In certain embodiments, the first movement of the second fuel 319 and the second movement of the second fuel 315 may comprise a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 300 may further include restricting pipeline 302 and/or pipeline segment 350 to second fuel movements having a minimum volume of 20,000 barrels, or 25,000 barrels, or 30,000 barrels, or 32,000 barrels, or 35,000 barrels, or 37,000 barrels, or 40,000 barrels. In certain embodiments, method 300 may further include restricting pipeline 302 and/or pipeline segment 350 to second fuel movements having a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 300 may further include restricting pipeline 302 and/or pipeline segment 350 to a total volumetric flow ratio, with respect to the first fuel and the second fuel, of no less than about 20,000 barrels, or about 25,000 barrels, or about 30,000 barrels, or about 32,750 barrels, or about 35,000 barrels, or about 37,500 barrels, or about 40,000 barrels, or about 45,000 barrels, or about 50,000 barrels second fuel for every 10,000 barrels of first fuel transported through pipeline 302 or a segment thereof, such as pipeline segment 350.

During transit of the first movement of the first fuel 317 though pipeline segment 350, a mixed interface volume is formed between the head and tail portions of the first fuel 317 and a respective one of the first movement of second fuel 319 and the second movement of second fuel 315 which wrapped the first movement of the first fuel 317. In particular, a first mixed interface volume 318, e.g., "Fuel 1/Fuel 2 Interface" 318, is formed at the interface of the first movement of the first fuel 317 and the first movement of the second fuel 319 due to the mixing of the two fuels during transit through pipeline segment 350 of pipeline 302. Additionally, a second mixed interface volume 316, e.g., "Fuel 1/Fuel 2 Interface" 316 is formed at the interface of the first movement of the first fuel 317 and the second movement of the second fuel 315 due to the mixing of the two fuels during transit through pipeline segment 350 of pipeline 302. The mixed interface volumes 316, 318 generated during movement of the first fuel 317 may be "cut-out" or separated from the unmixed first fuel 317 and unmixed second fuel volumes 315, 319 at the second terminal 320 and stored in one or more storage tanks, such as storage tank 322 depicted in FIG. 3. Method 300 may further include separating, at the second terminal 320, a first fuel fraction stream 389, a second fuel fraction stream 385, and a mixed interface fraction stream 388 from the fuel volumes received at the second terminal 320. The mixed interface fraction stream 388 comprises a mixture of the first fuel and the second fuel that results from interfacial mixing between the first movement of second fuel 319 and the first movement of first fuel 317, as well as interfacial mixing between the second movement of second fuel 315 and the first movement of the first fuel 317.

Method 300 may also include injecting at least a portion of the mixed interface fraction stream 388 into the second fuel fraction stream 385 so as to produce a second fuel stream 386 meeting the second target specification. In certain embodiments, method 300 may further include flowing the first fuel fraction stream 389 to a first storage tank 321 positioned at the second terminal 320 via conduit 329 to generate a stored first fuel fraction 381. Method 300 may further include flowing the mixed interface fraction stream 388 to a second storage tank 322 positioned at the second terminal 320 via conduit 328 to generate a stored mixed interface fraction 382. Method 300 may further include flowing, via conduit 325, a first flow stream 385 comprising the second fuel fraction stream having the first specification or first composition towards a third storage tank 323 positioned at the second terminal 320. Method 300 may further include injecting via conduit 327, an injection flow stream 387 comprising the stored mixed interface fraction 382, or a portion thereof, into the first flow stream 385 to produce a second fuel stream meeting the second target specification 386. Method 300 may further include storing the second fuel stream 386 having the second target specification (e.g., "Fuel 2 Spec 2") in the third storage tank 323 as stored second fuel having the second target specification 383 (e.g., "Fuel 2 Spec 2") after flowing the second fuel stream 386 to the third storage tank 323 via conduit 326.

In certain embodiments, method 300 may include injecting at least a portion of the mixed interface fraction stream 388 or stored mixed interface fraction 382 into the second fuel fraction stream 385 such that substantially all of the mixed interface fraction stream generated from the movement of the first movement of the first fuel 317 between the first terminal 310 and the second terminal 320 is eliminated as second fuel having the second target specification 383, 386 rather than being lost as trans-mix that needs to be reprocessed at a refinery or similar facility. In certain embodiments, the entire volume of the first movement of the first fuel 317 transported from the first terminal 310 to the second terminal 320 qualifies and/or maintains its qualifying status for the Renewable Identification Number (RIN) credit and the Low Carbon Fuel Standard (LCFS) credit, as a result of the mixed interface reinjection system 305 and method 300 depicted in FIG. 3. In certain embodiments, the second terminal 320 may be an end product terminal with respect to the second fuel stream 383 or stored second fuel fraction having the second target composition or the second target composition. In such embodiments, the method 300 may include supplying the second fuel stream 386 having the second target specification to a storage tank, such as storage tank 323, in fluid communication with or fluidly coupled with pipeline segment 350 or pipeline 302. Method 300 may further include supplying, from the storage tank (e.g., storage tank 323 or another storage tank at the second terminal 320), the second fuel having the second target specification 386 or the stored second fuel fraction 383 to one or more transportation vehicles selected from the group consisting of a waterborne transport vessel, tanker truck, railway car, and aircraft. Method 300 may alternatively include supplying the second fuel having the second target specification 386 or the stored second fuel fraction 383 to one or more end-use product pipelines.

In certain embodiments, method 300 may further include determining one or more chemical or physical characteristics of the second fuel fraction stream 385 having the first specification or first composition (e.g., "Fuel 2 Spec 1") and/or the mixed interface stream 388 or stored mixed interface fraction 382. The one or more chemical or physical characteristics may be measured by one or more measurement devices placed in-line or coupled with pipeline segment 350, the separator for separating the fuel streams at the second terminal 320, or the conduits 325, 328 conducting the second fuel fraction stream 385 or mixed interface stream 388, as further elucidated in FIGS. 6-8. In certain embodiments, the one or more chemical or physical characteristics of the stored mixed interface fraction may be measured at or in the storage tank 322 containing the stored mixed interface fraction 382. In at least certain embodiments, the one or more chemical or physical characteristics may be specific gravity. In such embodiments, the specific gravity may be measured by one or more gravitometers. For example, the one or more measurement devices may be one or more in-line gravitometers or one or more manual gravitometers.

Method 300 may also include determining the flow rate of the second fuel fraction stream 385 having the first specification or first composition. For example, the flow rate may be measured by one or more flowmeters coupled with conduit 325 conducting the flow of the second fuel fraction stream 385 having the first specification or first composition, as further elucidated in FIGS. 6-8. Method 300 may further include determining, based on the determined one or more chemical or physical characteristics and the flow rate, one or more injection parameters such that when the stored mixed interface fraction 382 (e.g., "Fuel 1/Fuel 2 Interface") is injected according to the one or more determined injection parameters, the second fuel stream having the second target specification 386 (e.g., "Fuel 2 Spec 2") is produced. The one or more injection parameters may be, for example, the injection flow rate necessary to efficiently consume the stored mixed interface fraction 382 while still generating the second fuel stream having the second target specification 386 (e.g., "Fuel 2 Spec 2"). Method 300 may further include injecting, based on the one or more determined injection parameters, the stored mixed interface fraction 382, or a portion thereof, into the first flow stream 385 to produce the second fuel stream meeting the second target specification 386.

In certain embodiments, the stored mixed interface fraction 382 may have an approximate composition corresponding to a 50/50 mixture by volume of the first fuel and the second fuel as a result of wrapping the first fuel 317 head and tail with the second fuel 315, 319 and as a result of the operating parameters of pipeline segment 350 and/or pipeline 302. In such embodiments, method 300 may further include determining, based solely on the restricted first compositional specification or a known composition or specification of the first and second fuel movements 315, 319, the flow rate of the second fuel stream having the first specification or first composition 385, and the approximate composition of the stored mixed interface fraction 382, one or more injection parameters such that when the stored mixed interface fraction 382 is injected according to the one or more determined injection parameters, the second fuel stream having the second target specification 386 is produced. In such embodiments, method 300 may further include injecting, based on the one or more determined injection parameters, the stored mixed interface fraction 383, or a portion thereof, into the first flow stream 385 to produce the second fuel stream 386 meeting the second target specification. In certain instances, the known composition or specification of the first and second fuel movements 315, 319 may be known, from reporting provided by the supplier of the particular fuel and/or movement to the pipeline 302 or pipeline segment 350.

Figure 4:
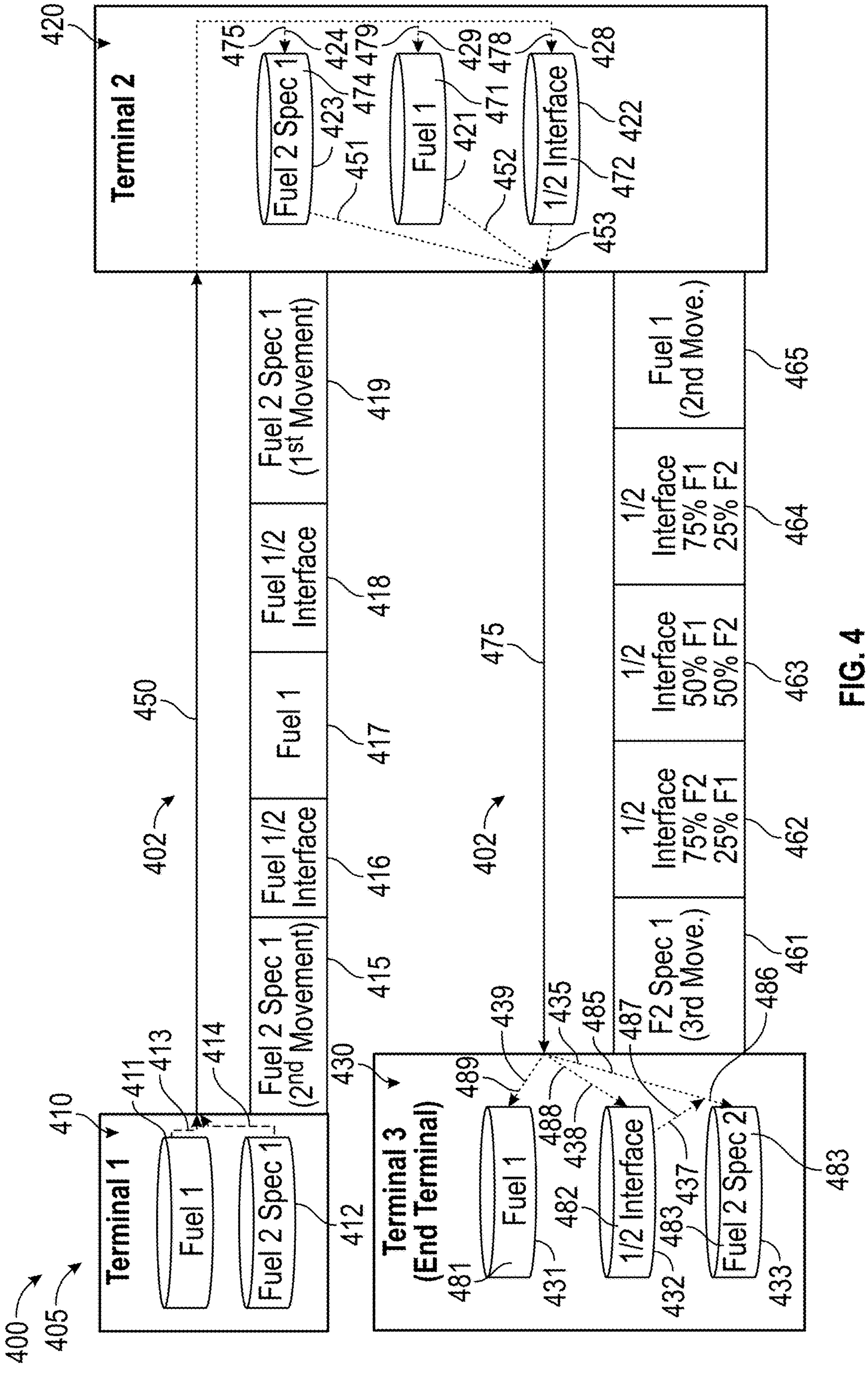
FIG. 4 is a graphical representation of a system and method for transporting a first fuel through a pipeline which includes transporting a mixed interface, that was generated by movement of the first fuel from an upstream terminal, to a downstream terminal for reinjection into a compatible second fuel, according to an exemplary embodiment of the present disclosure.

FIG. 4 is a graphical representation of a method 400 and system 405 for transporting a first fuel through a pipeline 402 which includes transporting a mixed interface, that was generated by movement from an upstream terminal, to a downstream terminal for reinjection into a compatible second fuel, according to an exemplary embodiment of the present disclosure. As depicted in FIG. 4, pipeline 402 includes pipeline segment 450 fluidly coupling or enabling fluid communication between "Terminal 1" 410 with "Terminal 2" 420, as well as pipeline segment 475 fluidly coupling or enabling fluid communication between "Terminal 2" 420 with "Terminal 3" 430. In certain embodiments, pipeline segments 450, 475 and/or pipeline 402 may be a common carrier pipeline in which many different fuels are transported from many different sources or producers. In at least some embodiments, pipeline segments 450, 475 and/or pipeline 402 may be a Federal Energy Regulatory Commission (FERC) regulated pipeline. Pipeline 402 may extend between and therethrough many terminals. While FIG. 4 depicts pipeline segment 450 of pipeline 402 extending between a first terminal 410, or "Terminal 1" 410, and a second terminal 420, or "Terminal 2" 420, thereby fluidly coupling or enabling fluid communication between "Terminal 1" 410 and "Terminal 2" 420, as well as pipeline segment 475 extending between the second terminal 420 and a third terminal 430 or "Terminal 3" 430, pipeline 402 may extend upstream of "Terminal 1" 410 as well as downstream of "Terminal 3" 430, thereby coupling Terminals 1-3 to additional terminals and pipeline segments not shown in FIG. 4.

As depicted in FIG. 4, "Terminal 1" 410 may have a plurality of storage tanks, such as storage tanks 411, 412, configured to at least temporarily store a particular fuel before the particular fuel is injected or pumped into pipeline segment 450 of pipeline 402. The fuel stored in storage tanks 411, 412, may be received from an upstream pipeline segment of pipeline 402, or from a pipeline segment belonging to a different pipeline, or received from another transportation types or methods, such as by rail, truck, or marine transport. The storage tanks 411, 412 are in fluid communication with or fluidly coupled with pipeline segment 450 of pipeline 402 by one or more conduits, such as conduits 413, 414. As depicted in FIG. 4, "Terminal 1" 410 includes storage tank 411 configured to store and contain a first fuel (e.g., "Fuel 1") and storage tank 412 configured to store and contain a compatible second fuel having a first predetermined composition, a first specification, or a first composition, such as "Fuel 2 Spec 1." Storage tank 411 is in fluid communication with or fluidly coupled with pipeline segment 450 of pipeline 402 by conduit 413. Conduit 413 is operable to conduct the flow of the first fuel from storage tank 411 to pipeline segment 450 of pipeline 402. Conduit 413 and storage tank 411 may be coupled with a pump that is operable to inject or pump the first fuel from storage tank 411 into pipeline segment 450 of pipeline 402.

Similarly, storage tank 412 is in fluid communication with or fluidly coupled with pipeline segment 450 of pipeline 402 by conduit 414. Conduit 414 is operable to conduct the flow of a compatible second fuel having a first predetermined composition, a first composition, or a first specification, such as "Fuel 1 Spec 1," from storage tank 412 to pipeline segment 450 of pipeline 402. Conduit 414 and storage tank 412 may be coupled with a pump that is operable to inject or pump a compatible second fuel having a first composition or specification, such as "Fuel 1 Spec 1," from storage tank 412 into pipeline segment 450 of pipeline 402. "Terminal 1" 410 may include many additional storage tanks in addition to storage tanks 411, 412, shown in FIG. 4. Each of the additional storage tanks may be in fluid communication with or fluidly coupled with pipeline segment 450 of pipeline 402 as well as upstream pipeline segments of pipeline 402 or another pipeline.

"Terminal 1" 410 is in fluid communication with or fluidly coupled with "Terminal 2" 420 via pipeline segment 450 of pipeline 402, as depicted in FIG. 4. "Terminal 2" 420 may have a plurality of storage tanks, such as storage tanks 421, 422, 423 configured to at least temporarily store a particular fuel before the particular fuel is injected or pumped into pipeline segment 475 to be transported to "Terminal 3" 430, or into another pipeline segment, truck, railcar, plane, or waterborne transport. As depicted in FIG. 4, the fuel stored in storage tanks 421, 422, 423 is received from upstream pipeline segment 450 of pipeline 402 via one or more conduits 424, 428, 429, after being separated into separate fuel streams after being received at "Terminal 2" 420. Storage tanks 421, 422, 423 may be in fluid communication with or fluidly coupled to one or more additional pipeline segments of pipeline 402, such as pipeline segment 475, or another pipeline, or may be configured to discharge the fuel contained therein to another form of transport such as railcar, truck, or marine transport.

As depicted in FIG. 4, "Terminal 2" 420 includes storage tank 421 configured to store and contain the first fuel. Storage tank 421 is in fluid communication with or fluidly coupled with pipeline segment 450 of pipeline 402 via conduit 429. Conduit 429 is operable to conduct the flow of the first fuel from the terminal end of pipeline segment 450 to storage tank 421. Storage tank 421 may be in fluid communication with or fluidly coupled via conduit 429 to a separator for separating the fuels and their mixed interface volumes, as well as one or more flowmeters and composition measurement devices, for example as shown in FIGS. 6-8. "Terminal 2" 420 may also include storage tank 422 configured to store and contain the mixed interface volume, e.g., "Fuel 1/Fuel 2 Interface," generated by moving or transporting the second fuel through pipeline segment 450 of pipeline 402 wrapped or preceded by and followed by movements of a compatible second fuel, such as "Fuel 2 Spec 1." Storage tank 422 is in fluid communication with or fluidly coupled to the terminal end of pipeline segment 450 by conduit 428. Storage tank 422 may be in fluid communication with or fluidly coupled via conduit 428 to a separator for separating the fuels and their mixed interface volumes, as well as one or more flowmeters and composition measurement devices, for example as shown in FIGS. 6-8. "Terminal 2" 420 may also include storage tank 423 configured to store and contain the second fuel having a first specification or first composition, e.g., "Fuel 2 Spec 1." Storage tank 423 is in fluid communication with or fluidly coupled to the terminal end of pipeline segment 450 by conduit 424. Storage tank 423 may be in fluid communication with or fluidly coupled via conduit 424 to a separator for separating the fuels and their mixed interface volumes, as well as one or more flowmeters and composition measurement devices, for example as shown in FIGS. 6-8.

"Terminal 2" 420 is in fluid communication with or fluidly coupled with "Terminal 3" 430 via pipeline segment 475 of pipeline 402, as depicted in FIG. 4. Storage tank 423 is in fluid communication with or fluidly coupled with pipeline segment 475 of pipeline 402 by conduit 451. Conduit 451 is operable to conduct the flow of the second fuel having the first specification or first composition (e.g., "Fuel 1 Spec 1") from storage tank 423 to pipeline segment 475 of pipeline 402. Conduit 451 and storage tank 423 may be coupled with a pump that is operable to inject or pump the second fuel from storage tank 423 into pipeline segment 475 of pipeline 402. Storage tank 421 is in fluid communication with or fluidly coupled with pipeline segment 475 of pipeline 402 by conduit 452. Conduit 452 is operable to conduct the flow of the first fuel from storage tank 421 to pipeline segment 475 of pipeline 402. Conduit 452 and storage tank 421 may be coupled with a pump that is operable to inject or pump the first fuel from storage tank 421 into pipeline segment 475 of pipeline 402. Similarly, storage tank 422 is in fluid communication with or fluidly coupled with pipeline segment 475 of pipeline 402 by conduit 453. Conduit 453 is operable to conduct the flow of mixed interface volume (e.g., "Fuel 1/Fuel 2 Interface") from storage tank 422 to pipeline segment 475 of pipeline 402. Conduit 453 and storage tank 422 may be coupled with a pump that is operable to inject or pump the first fuel from storage tank 422 into pipeline segment 475 of pipeline 402.

As depicted in FIG. 4, "Terminal 3" 430 includes storage tank 431 configured to store and contain the first fuel. Storage tank 431 is in fluid communication with or fluidly coupled with pipeline segment 475 of pipeline 402 via conduit 439. Conduit 439 is operable to conduct the flow of the first fuel from the terminal end of pipeline segment 475 to storage tank 431. Storage tank 431 may be in fluid communication with or fluidly coupled via conduit 439 to a separator for separating the fuels and their mixed interface volumes, as well as one or more flowmeters and composition measurement devices, for example as shown in FIGS. 6-8. "Terminal 3" 430 may also include storage tank 432 configured to store and contain the mixed interface volume, e.g., "Fuel 1/Fuel 2 Interface," that has been transported from storage tank 422 at "Terminal 2" 420 via conduit 453 and pipeline segment 475, as well as additional mixed interface volume generated by moving or transporting the mixed interface volume itself as well as any first fuel through pipeline segment 475 of pipeline 402. For example, as shown in FIG. 4, when mixed interface volume 463, e.g., "Fuel 1/Fuel 2 Interface," is moved through pipeline segment 475, additional mixed interface volume 462, 464 is generated at the interface of the mixed interface volume 463 and the fuels that may be used to wrap the mixed interface volume 461, 465 such as first fuel 465 and second fuel having the first specification or first composition 461. Storage tank 432 is in fluid communication with or fluidly coupled to the terminal end of pipeline segment 475 by conduit 438. Storage tank 432 may be in fluid communication with or fluidly coupled via conduit 438 to a separator for separating the fuels and their mixed interface volumes, as well as one or more flowmeters and composition measurement devices, for example as shown in FIGS. 6-8. "Terminal 3" 430 may also include storage tank 433 configured to store and contain second fuel having a second target specification or second target composition, e.g., "Fuel 2 Spec 2." "Terminal 3" 430 also includes conduit 435 for conducting the flow of a compatible second fuel, such as "Fuel 2 Spec 1," from the terminal end of pipeline segment 475 towards storage tank 433. "Terminal 3" 430 also includes an injection conduit 437 operable to conduct the mixed interface volume, or a portion thereof, stored in storage tank 432 into the flowline 435 conducting the compatible second fuel, such as "Fuel 2 Spec 1," toward storage tank 433. As shown in FIG. 4, injection conduit 437 is in fluid communication with or fluidly coupled to conduit 435 such that injection conduit 437 is operable to cause the mixing of the mixed interface volume stored in storage tank 432 with the separated compatible second fuel conducted by conduit 435. Injection conduit 437 may also be in fluid communication with or fluidly coupled with one or more injection valves, mixing manifolds, pumps, flowmeters, and composition measurement devices, as shown for example in FIG. 6. "Terminal 3" 430 may also include conduit 436 operable to conduct the injected mixed fuel, such as "Fuel 2 Spec 2," to storage tank 433 for storage and containment.

"Terminal 3" 430 may include many additional storage tanks in addition to storage tanks 431, 432, 433 shown in FIG. 4. Each of the additional storage tanks may be in fluid communication with or fluidly coupled with pipeline segment 475 of pipeline 402 as well as downstream pipeline segments of pipeline 402 or another pipeline. In certain embodiments, "Terminal 3" 430 may be an end terminal with respect to "Fuel 2 Spec 2," such that no further movements of "Fuel 2 Spec 2" in pipeline 402 are needed and the "Fuel 2 Spec 2" stored in storage tank 433 may comprise an end product ready to be marketed, labeled, and/or transported via private pipeline, railcar, truck, or water-based transport. In certain embodiments, method 400, depicted in FIG. 4, is a method for transporting two compatible fuels through pipeline 402, or pipeline segment 450 thereof. In certain other embodiments, method 400 is a method for substantially eliminating or substantially reducing the loss of mixed interface generated by a plurality of pipeline movements of two compatible fuels through a pipeline 402 or segments thereof. In certain embodiments, method 400 may include providing a second fuel (e.g., "Fuel 2 Spec 1" 415, 419) compatible with the firs fuel 417. The second fuel may have a first predetermined composition comprising a selected or maximum amount of the first fuel, or a component thereof, the selected or maximum amount being less than the selected or maximum amount allowed in a second target composition for the second fuel 483 (e.g., "Fuel 1 Spec 2" 483). Method 400 may further include transporting a first movement of the second fuel 419 having the first predetermined composition from a first pipeline terminal 410 to a second pipeline terminal 420. Method 400 may further include transporting a first movement of the first fuel 417 immediately sequentially following the first movement of the second fuel 419 having the first predetermined composition from the first pipeline terminal 410 to the second pipeline terminal 420, such that the head of the first movement of the first fuel 417 is wrapped by the tail of the first movement of the second fuel 419 having the first predetermined composition. Method 400 may further include transporting a second movement of the second fuel 415 having the first predetermined composition immediately sequentially following the first movement of the first fuel 417 from the first pipeline terminal 410 to the second pipeline terminal 420, such that the tail of the first movement of the first fuel 417 is wrapped by the head of the second movement of the second fuel 415 having the first predetermined composition.

Method 400 may further include separating, at the second terminal 420, a first fuel fraction stream 479, a second fuel having the first predetermined composition fraction stream 475, and a mixed interface fraction stream 478 from the fuel volumes received at the second terminal 420. The mixed interface fraction stream 478 comprises a mixture of the first fuel and second fuel that results from interfacial mixing between the first movement of second fuel 419 and the first movement of the first fuel 417, as well as interfacial mixing between the second movement of second fuel 415 and the first movement of the first fuel 417.

In certain embodiments, method 400 may include flowing, at the second terminal 420, the first fuel fraction stream 479 to a first storage tank 421 positioned at the second terminal 420 via conduit 429 to generate a stored first fuel fraction 471. Method 400 may further include flowing the mixed interface fraction stream 478 to a second storage tank 422 positioned at the second terminal 420 via conduit 428 to generate a stored mixed interface fraction 472. Method 400 may further include flowing the second fuel having the first predetermined composition (e.g., "Fuel 2 Spec 1") stream 475 to a third storage tank 423 positioned at the second terminal 420 via conduit 424 to generate a stored second fuel fraction 474.

Method 400 may further include flowing the stored mixed interface fraction 472 from the second storage tank 422 to the second terminal 420 end of pipeline segment 475, via conduit 453, so that the stored mixed interface fraction 472 may be transported to the third terminal 430. Method 400 may further include flowing the stored first fuel fraction 471 from the first storage tank 421 to the second terminal 420 end of pipeline segment 475, via conduit 452, so that the stored first fuel fraction 471 may be transported to the third terminal 430. Method 400 may further include flowing the stored second fuel fraction 474 from the third storage tank 423 to the second terminal 420 end of pipeline segment 475, via conduit 451, so that the stored second fuel fraction 474 may be transported to the third terminal 430.

Method 400 may further include transporting a third movement 461 of the second fuel having the first predetermined composition from the second pipeline terminal 420 to the third pipeline terminal 430. Method 400 may further include transporting a first movement 463 of the mixed interface stream 478 or the stored mixed interface fraction 472 immediately sequentially following the third movement 461 of the second fuel having the first predetermined composition, from the second pipeline terminal 420 to the third pipeline terminal 430 via pipeline segment 475, such that the head of the mixed interface fraction movement 463 is wrapped by the tail of the third movement 461 of the second fuel having the first predetermined composition. Method 400 may further include transporting a second movement 465 of the first fuel immediately sequentially following the mixed interface fraction stream 463, from the second pipeline terminal 420 to the third pipeline terminal 430 via pipeline segment 475, such that the tail of the mixed interface fraction movement 463 is wrapped by the head of the second movement of the first fuel 465. As shown in FIG. 4, the mixed interface fraction 463 moved from the second terminal 420 to the third terminal 430 may be expected to have an approximate composition corresponding to a 50/50 mixture by volume of the first fuel and the second fuel as a result of wrapping the first fuel 417 head and tail with the second fuel 415, 419 during movement from the first terminal 410 to the second terminal 420, and as a result of the operating parameters of pipeline segment 450 and/or pipeline 402. This approximate 50/50 composition, achieved as a result of controlling the compositional parameters and relative volumes of the fuel movements used to wrap the first fuel, confers certain advantages for the later injection of the mixed interface. In particular, the approximate 50/50 composition allows more efficient and predictable determination of the injection parameters required for consuming the mixed interface at an end terminal through injection into the second fuel to produce the second fuel meeting the second target specification or composition, while reducing the burden and reliance of the use of compositional measurements in determining the injection parameters. By wrapping the mixed interface volume 463 with a head of second fuel having the first predetermined specification 461 and a tail of first fuel 465, or vice versa, the mixed interfaces 462, 464 resulting from movement of the mixed interface volume 463, once cut out and combined, maintain the approximate 50/50 composition of the mixed interface stream 488 and stored mixed interface fraction 482. For example, the mixed interface 462 formed between the third movement of the second fuel having the first predetermined composition 461 and the mixed interface volume 463 would be expected to have an approximate composition of 75/25 second fuel volume to first fuel volume. However, the composition of mixed interface volume 462 is offset by the mixed interface volume 464 generated at the interface of mixed interface volume 463 and the second movement of first fuel 465, which is expected to have an approximate composition of 75/25 first fuel volume to second fuel volume.

Method 400 may further include separating, at the third terminal 430, a first fuel fraction stream 489, a second fuel fraction stream 485 having the first predetermined composition, and a mixed interface fraction stream 488 from the fuel volumes received at the third terminal 430. The mixed interface fraction stream 488 comprises the mixed interface volume 463 originating from the mixed interface stream 478 or stored mixed interface fraction 472 transported from the second terminal 420, as well as the mixed interface fractions 462, 464 formed during transport along pipeline segment 475 from the second terminal 420 to the third terminal 430.

Method 400 may also include injecting at the third terminal 430 at least a portion of the mixed interface fraction stream 488 into the second fuel fraction stream 485 having the first predetermined composition so as to produce a second fuel stream 486 meeting the second target specification. In certain embodiments, method 400 may further include flowing the first fuel fraction stream 489 to a first storage tank 431 positioned at the third terminal 430 via conduit 439 to generate a stored first fuel fraction 481. Method 400 may further include flowing the mixed interface fraction stream 488 to a second storage tank 432 positioned at the third terminal 430 via conduit 438 to generate a stored mixed interface fraction 482. Method 400 may further include flowing, via conduit 435, a first flow stream 485 comprising the second fuel fraction stream having the first predetermined composition, or first specification, or first composition towards a third storage tank 433 positioned at the third terminal 430. Method 400 may further include injecting via conduit 437, an injection flow stream 487 comprising the stored mixed interface fraction 482, or a portion thereof, into the first flow stream 485 to produce a second fuel stream meeting the second target specification 486. Method 400 may further include storing the second fuel stream 486 having the second target specification (e.g., “Fuel 2 Spec 2”) in the third storage tank 433 as stored second fuel having the second target specification 483 (e.g., “Fuel 2 Spec 2”) after flowing second fuel stream 486 to the third storage tank 433 via conduit 436.

In certain embodiments, method 400 may include injecting at least a portion of the mixed interface fraction stream 488 or stored mixed interface fraction 482 into the second fuel fraction stream 485 having the first predetermined composition such that substantially all of the mixed interface fraction stream generated from the movement of the first movement of the first fuel 417 between the first terminal 410 and the second terminal 420 is eliminated as second fuel having the second target specification 483, 486 rather than being lost as trans-mix that needs to be reprocessed at a refinery or similar facility. In certain embodiments, substantially the entire volume of the mixed interface fraction stream generated from the movement of the first movement of the first fuel 417 between the first terminal 410 and the second terminal 420, as well as the mixed interface volumes 462, 464 generated as a result of the transport of the mixed interface volume from the second terminal 420 to the third terminal 430, is eliminated as second fuel having the second target specification 483, 486 rather than being lost as trans-mix that needs to be reprocessed at a refinery or similar facility. In certain embodiments, the entire volume of the first movement of the first fuel 417 transported from the first terminal 410 to the second terminal 420 qualifies and/or maintains its qualifying status for the Renewable Identification Number (RIN) credit and the Low Carbon Fuel Standard (LCFS) credit, as a result of the mixed interface reinjection system 405 and method 400 depicted in FIG. 4. In certain embodiments, the entire volume of the second movement of the first fuel 465, as well as the entire volume of the second fuels 461 and mixed interface volumes 462, 463, 464 transported from the second terminal 420 to the third terminal 430 qualifies and/or maintains its qualifying status for the Renewable Identification Number (RIN) credit and the Low Carbon Fuel Standard (LCFS) credit, as a result of the mixed interface reinjection system 405 and method 400 depicted in FIG. 4.

In certain embodiments, the third terminal 430 may be an end product terminal with respect to the second fuel stream 486 or stored second fuel fraction 483 having the second target composition or the second target composition. In such embodiments, the method 400 may include supplying the second fuel stream 486 having the second target specification to a storage tank, such as storage tank 433, in fluid communication with or fluidly coupled with pipeline segment 475 or pipeline 402. Method 400 may further include supplying, from the storage tank (e.g., storage tank 433 or another storage tank at the third terminal 430), the second fuel having the second target specification 486 or the stored second fuel fraction 483 to one or more transportation vehicles selected from the group consisting of a waterborne transport vessel, tanker truck, railway car, and aircraft. Method 400 may alternatively include supplying the second fuel having the second target specification 486 or the stored second fuel fraction 483 to one or more end-use product pipelines.

Method 400 may further include restricting the transport of the second fuel in pipeline segments 450, 475 and/or pipeline 402 to second fuel compositions having the first predetermined composition, a first specification, or first composition, e.g., "Fuel 2 Spec 1." The predetermined composition, first specification, or first composition may be characterized, in certain embodiments, by a selected or maximum amount of the first fuel, or a component thereof. In certain embodiments, the selected or maximum amount is less than the selected or maximum amount allowed in a second target specification or second target composition for the second fuel. In certain embodiments, method 400 may include restricting use of pipeline 402 and/or pipeline segments 450, 475 with respect to all movements of the second fuel to second fuel compositions having the first predetermined composition, first specification, or the first composition. In certain embodiments, method 400 may include restricting the use of selected terminals of the pipeline 402, such as the first terminal 410, second terminal 420, and third terminal 430, depicted in FIG. 4, with respect to movements of second fuel to second fuel compositions having the first predetermined composition, first specification, or first composition.

Restricting the transport of the second fuel in pipeline segments 450, 475 and/or pipeline 402 to second fuel compositions having the first predetermined composition, first specification, or first composition may include, for example, changing the requirements of the transport of all movements of fuels classified as the second fuel on pipeline 402 and/or pipeline segments 450, 475 between the first terminal 410 and the second terminal 420, and between the second terminal 420 and the third terminal 430, such that all movements of fuels classified as the second fuel have a composition corresponding to the first predetermined composition, the first specification, or the first composition. As a result, all users or shippers using the pipeline 402 and/or pipeline segments 450, 475 would be restricted from the transport or movement of fuels classified as the second fuel unless that fuel is characterized by a composition meeting the first predetermined composition, the first specification, or the first composition.

In certain embodiments, the first predetermined composition, first specification, or the first composition may comprise a selected or maximum amount of first fuel by volume. For example, in certain embodiments, the first specification or first composition may comprise a selected or maximum amount of 2% by volume of first fuel. In certain other embodiments, the first specification or first composition may comprise a selected or maximum amount of 3% by volume of first fuel. In certain embodiments, the first specification or first composition may comprise a selected or maximum amount of about 1% by volume, or about 1.25% by volume, or about 1.5% by volume, or about 1.75% by volume, or about 2.0% by volume, or about 2.25% by volume, or about 2.5% by volume, or about 2.75% by volume, or about 3.0% by volume, or about 3.25% by volume, or about 3.5% by volume, or about 3.75% by volume, or about 4.0% by volume, or about 4.25% by volume, or about 4.5% by volume of first fuel, or a component thereof. In certain embodiments, the first specification or the first composition may correspond to a selected or maximum amount of from about 0% to about 3% by volume, or from about 0% to about 2% by volume, or from about 0% to about 4.5% by volume, or from about 1% to about 2.5% by volume, or from about 1% to about 3% by volume or from about 1% to about 4.5% by volume, or from about 2% to about 4.5% by volume of first fuel, or a component thereof.

In certain embodiments, the first predetermined composition, first specification, or first composition may comprise a selected or maximum amount of the first fuel, or a component thereof, that is 60% or less of the selected or maximum amount allowed in the second compositional target specification. In certain embodiments, the first specification or first composition may comprise a selected or maximum amount of the first fuel, or a component thereof, that is no greater than half of the selected or maximum amount allowed in the second compositional target specification. In certain other embodiments, the first specification or the first composition may comprise a selected or maximum amount of the first fuel, or a component thereof, that is 40% or less of the selected or maximum amount allowed in the second compositional target specification. In still other embodiments, the first specification or first composition may comprise a selected or maximum amount of the first fuel, or a component thereof, that is 60% of the selected or maximum amount allowed in the second compositional target specification. In certain embodiments, the first specification or first composition may comprise a selected or maximum amount of the first fuel, or a component thereof, that is half of the selected or maximum amount allowed in the second compositional target specification. In certain other embodiments, the first specification or first composition may comprise a selected or maximum amount of the first fuel, or a component thereof, that is 40% of the selected or maximum amount allowed in the second compositional target specification.

In certain embodiments, the first fuel may be a biodiesel fuel. In certain other embodiments, the first fuel may be renewable diesel. In certain embodiments, the second fuel, such as "Fuel 2 Spec 1" depicted as an exemplary embodiment in FIG. 4, is a substantially non-renewable diesel fuel. In such embodiments, the diesel fuel may be classified as a type or sub-type of diesel fuel but is not classified as a renewable diesel fuel. In certain embodiments, the diesel fuel may be classified as a No. 2 diesel fuel. In certain embodiments, the diesel fuel may be an Ultra Low Sulfur Diesel Fuel (ULSD). In such embodiments, the diesel fuel may be a diesel fuel comprising a sulfur level no greater than 0.0015 percent by weight (15 ppm). In some embodiments, the diesel fuel may be a No. 2 diesel fuel with a sulfur level no greater than 0.0015 percent by weight (15 ppm) and with an aromatic hydrocarbon content limited to 10 percent by volume. In certain embodiments, the diesel fuel may be a California Air Resources Board (CARB) Ultra Low Sulfur Diesel Fuel (ULSD) No. 2.

In certain embodiments, the second target specification or second target composition may correspond to a second fuel composition selected from the group consisting of a second fuel end product specification, a second fuel labeling requirement, a second fuel composition required for government accreditation or credit, a second fuel composition corresponding to a particular known emissions rating, and any combination thereof. In certain embodiments, the second target specification or second target composition comprises less than 5% by volume of the first fuel. In certain embodiments, the first movement of the first fuel 417 and/or the second movement of the first fuel 465 may comprise a minimum volume of 10,000 barrels. In certain embodiments, the first movement of the first fuel 417 and/or the second movement of the first fuel 465 may comprise a minimum volume of 12,500 barrels, or 15,000 barrels, or 17,500 barrels, or 20,000 barrels. In certain embodiments, the first movement of the first fuel 417 and/or the second movement of the first fuel 465 may comprise a volume of from about 10,000 barrels to about 12,500 barrels, or from about 10,000 barrels, to about 15,000 barrels, or from about 10,000 barrels to about 17,500 barrels, or from about 10,000 barrels to about 20,000 barrels. In certain embodiments, method 400 may further include restricting pipeline 402 and/or pipeline segments 450, 475 to first fuel movements having a minimum volume of 10,000 barrels and a selected or maximum volume of 12,500 barrels, or having a minimum volume of 10,000 barrels and a selected or maximum volume of 15,000 barrels, or having a minimum volume of 10,000 barrels and a selected or maximum volume of 17,500 barrels, or having a minimum volume of 10,000 barrels and a selected or maximum volume of 20,000 barrels.

In certain embodiments, the first movement of second fuel 419 and/or the second movement of second fuel 415 and/or the third movement of second fuel 461 may comprise a minimum volume of 10,000 barrels. In certain embodiments, the first movement of second fuel 419 and/or the second movement of second fuel 415 and/or the third movement of second fuel 461 may comprise a minimum volume of 20,000 barrels, or 25,000 barrels, or 30,000 barrels, or 32,000 barrels, or 35,000 barrels, or 37,000 barrels, or 40,000 barrels. In certain embodiments, the first movement of second fuel 419 and/or the second movement of second fuel 415 and/or the third movement of second fuel 461 may comprise a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 400 may further include restricting pipeline 402 and/or pipeline segments 450, 475 to second fuel movements having a minimum volume of 20,000 barrels, or 25,000 barrels, or 30,000 barrels, or 32,000 barrels, or 35,000 barrels, or 37.000 barrels, or 40,000 barrels. In certain embodiments, method 400 may further include restricting pipeline 402 and/or pipeline segments 450, 475 to second fuel movements having a volume of from about 10,000 barrels to about 15,000 barrels, or from about 10,000 barrels to about 20,000 barrels, or from about 10,000 barrels to about 25,000 barrels, or from about 10,000 barrels to about 30,000 barrels, or from about 10,000 barrels to about 35,000 barrels, or from about 10,000 barrels to about 40,000 barrels, or from about 20,000 barrels to about 30,000 barrels, or from about 20,000 barrels to about 40,000 barrels, or from about 30,000 barrels to about 40,000 barrels.

In certain embodiments, method 400 may further include restricting pipeline 402 and/or pipeline segments 450, 475 to a total volumetric flow ratio, with respect to the first fuel and the second fuel, of no less than about 20,000 barrels, or about 25,000 barrels, or about 30,000 barrels, or about 32,750 barrels, or about 35,000 barrels, or about 37,500 barrels, or about 40,000 barrels, or about 45,000 barrels, or about 50,000 barrels of second fuel for every 10,000 barrels of first fuel transported through pipeline 402 or a segment thereof, such as pipeline segments 450, 475. In certain embodiments, method 400 may include injecting at least a portion of the mixed interface fraction stream 488 or stored mixed interface fraction 482 into the second fuel fraction stream 485 such that substantially all of the mixed interface fraction stream generated from the movements of the first movement of first fuel 417 between the first terminal 410 and the second terminal 420, as well as the second movement of the first fuel 465 and the movement of mixed interface 463 (generated during the first movement of the first fuel) from the second terminal 420 to the third terminal 430, is eliminated as second fuel having the second target specification 483, 486 rather than being lost as trans-mix that needs to be reprocessed at a refinery or similar facility. In certain embodiments, the entire volume of the first movement of the first fuel 417 transported from the first terminal 410 to the second terminal 420 qualifies and/or maintains its qualifying status for the Renewable Identification Number (RIN) credit and the Low Carbon Fuel Standard (LCFS) credit, as a result of the mixed interface reinjection system 405 and method 400 depicted in FIG. 4. In certain embodiments, the entire volume of the first and second movements of the first fuel 417, 465 transported from the first terminal 410 to the third terminal 430 qualifies and/or maintains its qualifying status for the Renewable Identification Number (RIN) credit and the Low Carbon Fuel Standard (LCFS) credit, as a result of the mixed interface reinjection system 405 and method 400 depicted in FIG. 4.

In certain embodiments, the third terminal 420 may be an end product terminal with respect to the second fuel stream 483 or stored second fuel fraction having the second target composition or the second target composition. In such embodiments, the method 400 may include supplying the second fuel stream 486 having the second target specification to a storage tank, such as storage tank 433, in fluid communication with or fluidly coupled with pipeline segment 475 or pipeline 402. Method 400 may further include supplying, from the storage tank (e.g., storage tank 433 or another storage tank at the third terminal 430), the second fuel having the second target specification 486 or the stored second fuel fraction 483 to one or more transportation vehicles selected from the group consisting of a waterborne transport vessel, tanker truck, railway car, and aircraft. Method 400 may alternatively include supplying the second fuel having the second target specification 486 or the stored second fuel fraction 483 to one or more end-use product pipelines.

In certain embodiments, method 400 may further include determining one or more chemical or physical characteristics of the second fuel fraction stream 485 having the first specification or first composition (e.g., "Fuel 2 Spec 1") and/or the mixed interface stream 488 or stored mixed interface fraction 482. The one or more chemical or physical characteristics may be measured by one or more measurement devices placed in-line or coupled with pipeline segment 475, the separator for separating the fuel streams at the second terminal 430, or the conduits 435, 438 conducting the second fuel fraction stream 485 or mixed interface stream 488, as further elucidated in FIGS. 6-8. In certain embodiments, the one or more chemical or physical characteristics of the stored mixed interface fraction may be measured at or in the storage tank 432 containing the stored mixed interface fraction 482. In at least certain embodiments, the one or more chemical or physical characteristics may be specific gravity. In such embodiments, the specific gravity may be measured by one or more gravitometers. For example, the one or more measurement devices may be one or more in-line gravitometers or one or more manual gravitometers.

Method 400 may also include determining the flow rate of the second fuel fraction stream 485 having the first specification or first composition. For example, the flow rate may be measured by one or more flowmeters coupled with conduit 425 conducting the flow of the second fuel fraction stream 485 having the first specification or first composition, as further elucidated in FIGS. 6-8. Method 400 may further include determining, based on the determined one or more chemical or physical characteristics and the flow rate, one or more injection parameters such that when the stored mixed interface fraction 482 (e.g., "Fuel 1/Fuel 2 Interface") is injected according to the one or more determined injection parameters, the second fuel stream having the second target specification 486 (e.g., "Fuel 2 Spec 2") is produced. The one or more injection parameters may be, for example, the injection flow rate necessary to efficiently consume the stored mixed interface fraction 482 while still generating the second fuel stream having the second target specification 486 (e.g., "Fuel 2 Spec 2"). Method 400 may further include injecting, based on the one or more determined injection parameters, the stored mixed interface fraction 482, or a portion thereof, into the first flow stream 485 to produce the second fuel stream meeting the second target specification 486.

Figure 5:
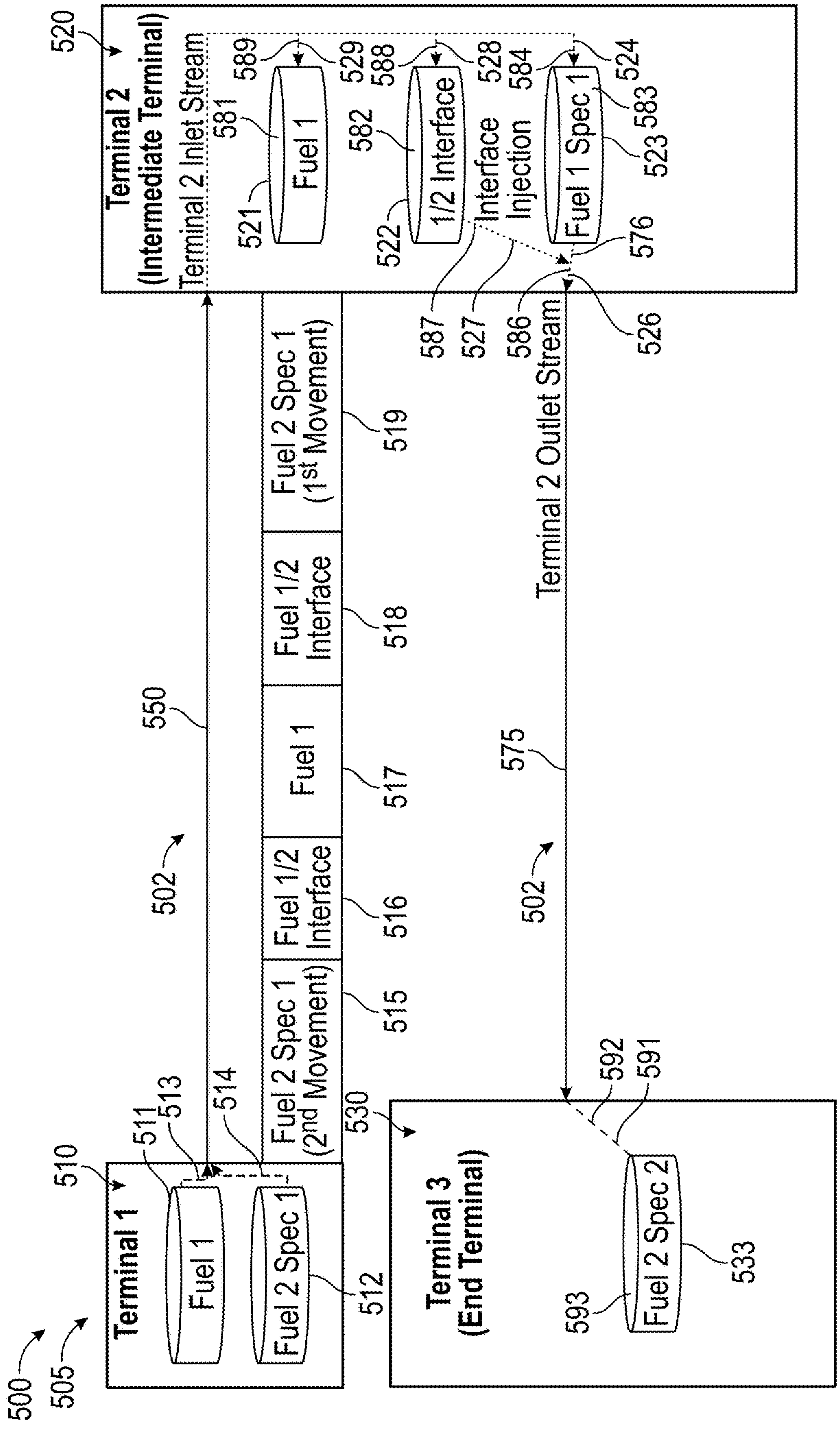
FIG. 5 is a graphical representation of a system and method for transporting a first fuel and a second fuel compatible with the first fuel through a pipeline between a first terminal and a second terminal, according to an exemplary embodiment of the present disclosure.

FIG. 5 is a graphical representation of a method 500 and a system 505 for transporting a first fuel (e.g., "Fuel 1") 517 through a pipeline segment 550 of pipeline 502 between a first terminal 510 and a second terminal 520, according to an exemplary embodiment of the present disclosure. Method 500 and system 505 are similar to method 300 and system 305 depicted in FIG. 3, except that method 500 and system 505 involve an alternative method of injecting the stored mixed interface fraction 582 into the second fuel having the first predetermined composition 583 to generate the second fuel having the target specification stream 586.

In particular, as shown in FIG. 5, the second fuel having the first predetermined composition (e.g., "Fuel 2 Spec 1") is separated from the inlet stream at the second terminal 520 to form a second fuel having the first predetermined composition stream 584 which is conducted to storage tank 523 via conduit 524 to generate a stored second fuel having the first predetermined composition fraction 583. In method 500 and system 505, the stored mixed interface fraction 582 is injected into the stored second fuel fraction 583 as the stored second fuel fraction 583 is conducted toward pipeline segment 575 of pipeline 502 via conduit 576 in order to be transported to third terminal 530. As shown in FIG. 5, the stored mixed interface fraction 582 is injected into flow stream 576 of second fuel fraction 583 via injection stream 587 conducted by conduit 527. Conduit 527 is in fluid communication with or fluidly coupled with conduit 576 carrying the stored second fuel fraction 583 thereby causing the mixing of the stored mixed interface 582 and the stored second fuel fraction 583 to form the second fuel having the second target composition stream 586. The second fuel having the second target composition stream 586 may then be conducted to pipeline segment 575 of pipeline 502 via conduit 526 to be transported to the third terminal 530. Further details of this method and system for injecting the mixed interface volume into the outlet flow stream of a storage tank containing the second fuel having the first predetermined composition are provided in FIG. 7.

FIG. 6 is a graphical representation of a system 605 and method 600 for injecting a mixed interface stream generated by the transport of a first fuel through a pipeline into a compatible second fuel to produce a second fuel stream having a second target specification. In certain embodiments, system 605 and method 600 may also comprise the separation and controlled injection portions of systems 105, 205, 305, 405 and methods 100, 200, 300, 400 described above and depicted in FIGS. 1-4. As shown in FIG. 6, system 605 may include a downstream pipeline terminal 620 in fluid communication with or fluidly coupled with one or more upstream pipeline terminals 610 via pipeline segment 650 of pipeline 602. As depicted in FIG. 6, downstream pipeline terminal 620 is designated as "Terminal 2" 620, however, downstream pipeline terminal 620 may be any number of downstream terminals where the mixed interface injection system 605 and method 600 may be used, including, for example, "Terminal 3." For example, in some embodiments, downstream pipeline terminal 620 may be "Terminal 2" 120, 320 of system 105, 305 and method 100, 300 described above and depicted in FIGS. 1 and 3, or may be "Terminal 3" 230, 430 of system 205, 405 and method 200, 400 described above and depicted in FIGS. 2 and 4.

The downstream pipeline terminal 620 may be configured to receive an inlet stream 681 from one or more upstream terminals 610, such as "Terminal 1" 610, via inlet conduit 671. The inlet stream 681 may include a first fuel wrapped head and tail with a second fuel compatible with the first fuel. The presently disclosed method 600 and system 605 may be suitable for use with many compatible fuels or liquids that may be transported through a pipeline segment 650 or pipeline 602. In certain embodiments, the first fuel may be renewable diesel or a biodiesel fuel. In certain embodiments, the second fuel compatible with the first fuel may be a diesel fuel. In certain other embodiments, the second fuel may be a substantially non-renewable diesel fuel. In such embodiments, the diesel fuel may be classified as a type or sub-type of diesel fuel but is not classified as a renewable diesel fuel. In certain embodiments, the diesel fuel may be classified as a No. 2 diesel fuel. In certain embodiments, the diesel fuel may be an Ultra Low Sulfur Diesel Fuel (ULSD). In such embodiments, the diesel fuel may be a diesel fuel comprising a sulfur level no greater than 0.0015 percent by weight (15 ppm). In some embodiments, the diesel fuel may be a No. 2 diesel fuel with a sulfur level no greater than 0.0015 percent by weight (15 ppm) and with an aromatic hydrocarbon content limited to 10 percent by volume. In certain embodiments, the diesel fuel may be a California Air Resources Board (CARB) Ultra Low Sulfur Diesel Fuel (ULSD) No. 2.

In the exemplary embodiment depicted in FIG. 6, the first fuel is renewable diesel and the second fuel is a diesel fuel having a first predetermined composition, a first specification, or first composition, referred to herein as "Diesel Fuel Spec 1." Downstream terminal 620 of system 605 may include a separator 664 the fuel volumes in the inlet stream 681 received from pipeline segment 650 of pipeline 602. In particular, the separator 664 is operable to separate the fuel volumes in inlet stream 681 into a first fuel fraction stream 682 (e.g., "Renewable Diesel (RD)" stream 682), a second fuel fraction stream 684 (e.g., "Diesel Fuel Spec 1" stream 684), and an interface fraction stream 683 (e.g., "RD/DF Spec 1 Interface" stream 683) comprising a mixture of the first and second fuels generated by interfacial mixing during transport from upstream terminal 610 to downstream terminal 620 via pipeline segment 650 of pipeline 602.

Downstream terminal 620 further includes a first storage tank 621 coupled with the downstream terminal 620 and the separator 664 via conduit 672. The first storage tank 621 may be configured to receive and store the first fuel fraction stream 682 (e.g., "Renewable Diesel (RD)" stream 682). As depicted in FIG. 6, downstream terminal 620 may also include a second storage tank 622 in fluid communication with or fluidly coupled with the downstream terminal 620 and the separator 664 via conduit 673. The second storage tank 622 may be configured to receive and store the interface fraction stream 683 (e.g., "RD/DF Spec 1 Interface" stream 683). Downstream terminal 620 of system 605 may further include a third storage tank 623 in fluid communication with or fluidly coupled with the downstream terminal 620 and the separator 664 via first flow line 674. First flow line 674 is operable to flow the second fuel fraction stream 684 (e.g., "Diesel Fuel Spec 1" stream 684) from the separator 664 towards the third storage tank 623. The first flow line 674 may be in fluid communication with or fluidly coupled with an injection flow line 677 in fluid communication with or fluidly coupled with the second storage tank 622 and operable to receive at least a portion of the interface fraction stream 683 stored in the second storage tank 622 (e.g., the stored mixed interface fraction stream 682) in the form of injection stream 687 and inject injections stream 687 into the second fuel fraction stream 684 conducted by the first flow line 674 to generate a second fuel stream having the target specification or target composition 686 (e.g., "Diesel Fuel Spec 2" stream 686).

In certain embodiments, the injection stream 687 comprising the mixed interface fraction stream 683 or stored mixed interface fraction stream 682 may be injected into a mixing manifold 663 in fluid communication with or fluidly coupled with the first flow line 674 and injection flow line 677. Mixing manifold 663 may be operable to receive the injection stream 687 and the second fuel fraction stream 684 and configured to facilitate homogeneous mixing of the two streams to generate the second fuel stream having the target specification or target composition 686 (e.g., "Diesel Fuel Spec 2" stream 686). Mixing manifold 663 may be in fluid communication with or fluidly coupled with third storage tank 623 via conduit 676 operable to conduct the second fuel stream having the target specification or target composition 686 to the third storage tank 623 for storage and containment.

System 605 and method 600 further includes an injection control system 900 configured to control the injection of the injection stream 687 comprising the stored mixed interface fraction stream 682 (e.g., "RD/DF Spec 1 Interface" stream 682) into the second fuel fraction stream 684 (e.g., "Diesel Fuel Spec 1" stream 684) to generate the second fuel stream having the target specification or target composition 686 (e.g., "Diesel Fuel Spec 2" stream 686). Injection control system 900 may include a controller 902 in electronic communication with one or more measurements devices 641-647, one or more flowmeters 631-634, one or more injection valves, 661, 662 and one or more pumps 665, collectively providing for controlled injection of injection stream 687 to generate the second fuel stream having the target specification or target composition 686.

Controller 902 may be operable to determine one or more injection parameters based on mixed interface compositional data of the stored mixed interface fraction stream 682, compositional data for the second fuel fraction stream 684, and the flow rate of the second fuel fraction stream in the first flow line 674. In certain embodiments, the one or more injection parameters may be the injection flow rate of injection stream 687 necessary to efficiently consume the stored mixed interface fraction stream 682 while generating the second fuel stream having the target specification or target composition 686.

In certain embodiments, the mixed interface compositional data may be collected by physically measuring one or more chemical or physical characteristics of the stored mixed interface fraction stream 682 by, for example, one or more measurement devices 641, 642, 644, 645. In some instances, the chemical or physical characteristics of the stored mixed interface fraction stream may be measured by one or more of measurement devices 641, 642 positioned in the inlet conduit 671 and in inlet stream 681 of downstream terminal 620. For example, in some embodiments, the same measurement devices 641, 642 that may be used to determine which fuel volumes to cutout or separate from inlet stream 681 using the separator 664, may also be used to determine the one or more chemical or physical characteristics of the stored mixed interface.

In other embodiments, the one or more chemical or physical characteristics of the stored mixed interface 682 may be measured by measurement device 644 positioned in the flow path of mixed interface fraction stream 683 in conduit 673, between the separator 664 and the second storage tank 622. In still other embodiments, the one or more chemical or physical characteristics of the stored mixed interface 682 may be measured by measurement device 645 positioned in the injection stream 687 in injection flow line 677. The one or more physical characteristics may be a characteristic that informs as to the composition of the stored mixed interface 682, in particular the relative amounts of fuel 1, or renewable diesel, and fuel 2, or diesel fuel, that makes up the stored mixed interface 682. In certain embodiments, the one or more chemical or physical characteristics is specific gravity and the measurement devices 641, 642, 644, 645 may be an in-line or manual gravitometer.

However, physical measurement of one or more chemical or physical characteristics of the stored mixed interface 682 is not required by method 600 or system 605. The mixed interface compositional data of the stored mixed interface fraction stream 682 may be ascertained by other methods as well. In particular, in certain embodiments, the mixed interface compositional data may be assumed or approximated with sufficient certainty, based on the presently disclosed methods 100, 200, 300, 400 for transporting the first fuel and mixed interface volumes, in order for the controller 902 to determine the one or more injection parameters necessary to efficiently consume the stored mixed interface fraction stream 682 while generating the second fuel stream having the target specification or target composition 686. For example, as described above, methods 100, 200, 300, 400 for wrapping the first fuel (renewable diesel) head and tail with the second fuel (diesel fuel) can be expected to produce a 50/50 mixture by volume of the first fuel (renewable diesel) and the second fuel having the first predetermined composition, specification, or composition (diesel fuel), especially under certain pipeline operational parameters.

Additionally, methods 200, 400 for transporting and wrapping the mixed interface volume generated during a previous upstream movement of a first fuel (renewable diesel) can also be expected to produce a mixed interface volume comprising a 50/50 mixture by volume of the first fuel (renewable diesel) and the second fuel having the first predetermined composition, specification, or composition (diesel fuel), under certain pipeline operational parameters. Accordingly, mixed interface compositional data ascertained by assumption or approximation based on employing the presently disclosed transport methods and known pipeline operation parameters may be used by controller 902 as an input parameter to determine the one or more injection parameters.

In certain embodiments, the compositional data for the second fuel fraction stream 684 may be collected by physically measuring one or more chemical or physical characteristics of the second fuel fraction stream 684 by, for example, one or more measurement devices 641, 642, 643. In some instances, the chemical or physical characteristics of the second fuel fraction stream 684 may be measured by one or more of measurement devices 641, 642 positioned in the inlet conduit 671 and in inlet stream 681 of downstream terminal 620. For example, in some embodiments, the same measurement devices 641, 642 that may be used to determine which fuel volumes to cutout or separate from inlet stream 681 using the separator 664, may also be used to determine the one or more chemical or physical characteristics of the second fuel fraction stream 684.

In other embodiments, the one or more chemical or physical characteristics of the second fuel fraction stream 684 may be measured by measurement device 643 positioned in the flow path of first flow stream 674, between the separator 664 and the third storage tank 623. However, physical measurement of one or more chemical or physical characteristics of the second fuel fraction stream 684 is not required by method 600 or system 605. The second fuel fraction stream 684 compositional data may be ascertained by other methods as well. In particular, in certain embodiments, the second fuel fraction stream 684 compositional data may be assumed or approximated with sufficient certainty, based on the presently disclosed methods 100, 200, 300, 400 for transporting the first fuel and mixed interface volumes, in order for the controller 902 to determine the one or more injection parameters necessary to efficiently consume the stored mixed interface fraction stream 682 while generating the second fuel stream having the target specification or target composition 686. In particular, the presently disclosed method step of restricting movements of the second fuel (diesel fuel) in pipeline segment 650 or pipeline 602 to second fuels having the first predetermined composition, first specification, or first composition may be used to ascertain the compositional data for second fuel fraction stream 684 with sufficient specificity for controller 902 to determine the one or more injection parameters. For example, the composition of second fuel fraction stream 684 can be assumed to be that of the predetermined composition, first specification, or first composition itself. In at least one exemplary embodiment for the transport of renewable diesel, described with respect to methods 100, 200 above, the composition of the diesel fuel (second fuel) may be assumed to be 2% by volume renewable diesel based on restricting the pipeline or segment thereof to diesel fuels having nor more than 2% by volume renewable diesel (e.g., the first predetermined composition, first specification, or first composition). In other embodiments, more precise compositional data of the second fuel fraction stream 684 may be ascertained by reporting provided by the supplier of the particular fuel and/or movement to the pipeline 602 or pipeline segment 650.

The flow rate of the second fuel fraction stream 684 in the first flow line 674 may be measured by one or more flowmeters, such as flowmeter 633, positioned in first flow line 674. In some instances, where the pressures in first flow line 674 may be substantially the same as those in the inlet stream 681 in inlet conduit 671, flowmeters positioned in the inlet stream 681 or inlet conduit 671 may be sufficient to determine the flow rate of second fuel fraction stream 684 in first flow line 674.

In certain embodiments, injection control system 900 may also include one or more feedback measurement devices 646, 647 and feedback flowmeters 634 to provide feedback data used to ensure correct operation of the injection control system 900. As depicted in FIG. 6, system 605 may include measurement device 646 positioned in the flow path of the second fuel having the second target composition stream 686 in conduit 676 connecting mixing manifold 663 with third storage tank 623. Measurement device 646 may measure one or more chemical or physical characteristic of the second fuel having the second target composition stream 686 to ensure that the second fuel has the second target composition or does not exceed the second target composition or specification.

Additionally, injection control system 900 and system 605 may include measurement device 647 coupled with the third storage tank 623 via conduit 675 and operable to measure one or more chemical or physical characteristic of the stored second fuel having the second target composition fraction 685 to ensure that the stored second fuel has the second target composition or does not exceed the second target composition or specification. Further, injection control system 900 and system 605 may include flowmeter 634 positioned in the flow path of injection stream 687 in injection conduit 677 to provide feedback to controller 902 regarding the flow rate of injection stream 687 and ensure that the actual measured flow rate corresponds to the flow rate determined by the controller 902 to be necessary to generate the second fuel having the target composition.

Controller 902 of injection control system 900 is electronically coupled with one or more pumps, such as pump 665, operable to cause the injection stream 687 to flow from the second storage tank 622 to the mixing manifold 663 to mix with second fuel stream 684 at the flow rate determined by controller 902. Accordingly, pump 665 is in fluid communication with or fluidly coupled with storage tank 622 and conduit 677. Injection control system 900 may further include one or more injection valves, such as injection valves 661, 662 operable to regulate the flow of injection stream 687 in conduit 677 connecting storage tank 622 to the mixing manifold 663.

An advantage of system 605 and method 600 is that the injection of the stored mixed interface fraction 682 into the first flow line 684 or mixing manifold 663 connected to the first flow line 684 helps ensure homogeneous mixing of the two compatible fuels prior to being flowed into a storage tank. This avoids the need for storage tanks at terminals to have fuel blending or mixing equipment. In an alternative embodiment, shown in FIG. 7, method 700 and system 705 for injecting a mixed interface stream into a compatible second fuel may involve injecting injection stream 687 into the outlet stream of third storage tank 623 during the discharge of stored second fuel having the first specification or composition to a downstream terminal 730. In particular, as depicted in FIG. 7, second fuel stream 684 is flowed through first flow path 674 to the third storage tank 623 to generate stored second fuel fraction 688 having the first composition or specification. Injection stream 687 is pumped into mixing manifold 663 which is in fluid communication with or fluidly coupled with stored second fuel outlet stream 689 via conduit 778. Following mixing of injection stream 687 and stored second fuel outlet stream 689 in mixing manifold 663 to generate second fuel having the target specification stream 686, the second fuel stream 686 may be flowed to a downstream pipeline segment 776 to a further downstream terminal 730, such as "Terminal 3" 730, via conduit 775. System 705 and method 700 may further include measurement device 748 and flowmeter 733 in conduit 778 to facilitate determining the flow rate and one or more chemical or physical characteristics of the second fuel having the first composition or specification. Additionally, system 705 and method 700 may include feedback measurement device 747 for confirming the composition of the second fuel having the second target composition 686.

In certain embodiments, injection stream 687 may be injected directly into the third storage tank 623 receiving second fuel stream 684 from first flow path 674, as shown for system 805 and method 800 in FIG. 8. In such embodiments, the second fuel having the second target composition 686 is generated in the third storage tank 623 from the mixing of the injection stream 687 comprising the stored first fuel fraction stream 682 (e.g., "Renewable Diesel (RD)" stream 682) and the second fuel stream 684 having the first composition or specification. System 805 may also include a circulator/mixer unit 890 coupled to third storage tank 623 via conduit 875. Circulator/mixer 890 may be operable to mix the contents of third storage tank 623 in order to produce a homogeneous second fuel having the second target composition 686. Measuring device 847 may also be positioned in the flow path of conduit 875 and operable to measure one or more physical or chemical characteristic of the second fuel composition contained in third storage tank 623 in order to confirm the composition of the second fuel having the second target composition 686.

Figure 9:
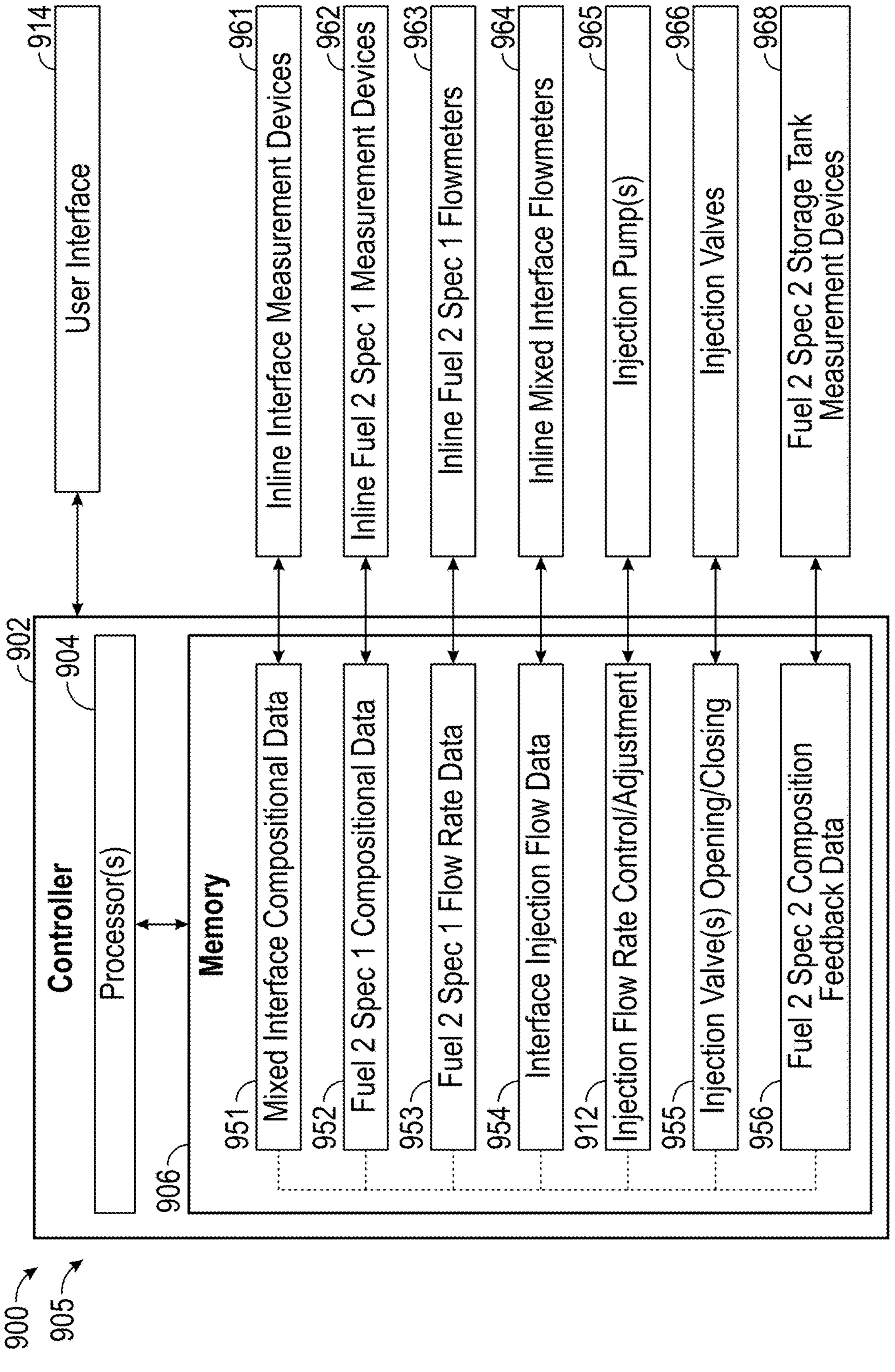
FIG. 9 is a graphical representation of an injection control system and method for injecting a mixed interface stream generated by the transport of a first fuel through a pipeline into a compatible second fuel to produce a second fuel stream having a second target specification, according to an exemplary embodiment of the present disclosure.

An exemplary embodiment of an injection control system 900 for controlling the injection of mixed interface volumes into compatible fuel volumes is provided in FIG. 9. Other embodiments of injection control systems are within the spirit and scope of the present disclosure. As depicted in FIG. 9, injection control system 900 may include a controller 902. Controller 902 may comprise one or more controllers, a programmable logic controller (PLC), a supervisory control and data acquisition (SCADA) system, a computing device, and combinations thereof, as well as other components, to manage or control the injection operations necessary to generate the second fuel having the second target composition or target specification. Controller 902 may include one or more processors (e.g., processor 904) to execute instructions stored in memory 906. In an exemplary embodiment, the memory 906 may be a machine-readable storage medium. As used herein, a "machine-readable storage medium" may be any electronic, magnetic, optical, or other physical storage apparatus to contain or store information such as executable instructions, data, and the like. For example, any machine-readable storage medium describe herein may be any of random access memory (RAM), volatile memory, non-volatile memory, flash memory, a storage drive (e.g., hard drive), a solid state drive, any type of storage disc, and the like, or a combination thereof. As noted, the memory 906 may store or include instructions executable by processor 904. As used herein, a "processor" may include, for example one processor or multiple processors included in a single device or distributed across multiple computing devices. The processor 904 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution of instructions stored on a machine-readable storage medium, or a combination thereof.

Instructions stored in the memory 906 and executable by the processor 904 may include instructions 912 to control or adjust injection flow rate. Instructions 912 may include instructions to determine the one or more injection parameters necessary to efficiently consume the stored mixed interface fraction stream while generating the second fuel stream having the target specification or target composition. For example, the one or more injection parameters may include the flow rate of the injection stream delivering the mixed interface fraction stream. Controller 902 may control injection pump(s) 965 based on instructions 912 for determining the one or more injection parameters. Pump(s) 965 may include, for example, pump 665 in systems 605, 705, 805 depicted in FIGS. 6-8.

Instructions 912 to determine the one or more injection parameters may require the processor 904 to process input data 951, 952, 953 stored in memory 906 according to instructions 912. Input data 951, 952, 953 may be obtained from one or more measurement devices 961, 962, one or more flowmeters 963, or user interface 914. In particular, instructions 912 for controlling and adjusting injection flow rate may require processing of mixed interface compositional data 951, second fuel (e.g., "Fuel 2 Spec 1") compositional data 952, and second fuel (e.g., "Fuel 2 Spec 1") flow rate data 953. Mixed interface compositional data 951 may be received from inline interface measurement devices 961 such as, for example, measurement devices 641, 642, 644, 645 in systems 605, 705, 805 depicted in FIGS. 6-8. Mixed interface compositional data 951 may also be received from user interface 914 or generally stored in memory 906 based on known mixed interface compositions resulting from the method of wrapping and transporting the first fuel or renewable diesel, as well as known pipeline operating parameters such as flow rates, pressures, cross-sectional diameters, and pipeline segment length.

Second fuel (e.g., "Fuel 2 Spec 1") compositional data 952 may be received from inline fuel 2 measurement devices 962 such as, for example, measurement devices 641, 642, 643 in systems 605, 705, 805 depicted in FIGS. 6-8. Second fuel compositional data 952 may also be received from user interface 914 or generally stored in memory 906 based on the compositional restrictions applied to movements of the second fuel on the pipeline segment or pipeline, such as the known restricted predetermined composition, first composition, or first specification.

Second fuel (e.g., "Fuel 2 Spec 1") flow rate data 953 may be received from inline fuel 2 flowmeters 963 such as, for example, flowmeters 631, 632, 633 in systems 605, 705, 805 depicted in FIGS. 6-8. Second fuel flow rate data 953 may also be received from user interface 914 or generally stored in memory 906 based on the known pipeline operational parameters. Instructions 912 to determine the one or more injection parameters to control or adjust injection flow rate may require the processor 904 to process feedback data 954, 956 stored in memory 906 according to instructions 912. In particular, interface injection flow data 954 may be received from inline mixed interface flowmeters 964 such as, for example, flowmeter 634 in systems 605, 705, 805 depicted in FIGS. 6-8. Interface injection flow data 954 may be used by processor 904 to determine if the flow rate control and adjustments 912 used to instruct injection pump(s) 965 are resulting in the intended injection flow rate. Additional feedback data may be received in the form of fuel 2 spec 2 composition feedback data 956 received from fuel 2 spec 2 storage tank measurement devices 968 such as, for example, measurement devices 647, 646 in systems 605, 705, 805 depicted in FIGS. 6-8. Fuel 2 spec 2 composition feedback data 956 may be used by processor 904 to confirm that the second fuel (e.g., diesel fuel) actually achieved the intended composition. Instructions 912 may be operable to adjust the injection flow rate based on feedback data 954, 956.

Instructions stored in the memory 906 and executable by the processor 904 may include instructions 955 to control or open or close one or more injection valve(s) 966. Instructions 955 may include instructions to determine whether injection valves 966 should be open or closed based on flowmeter 963 input data indicating whether the second fuel (e.g., fuel 2) is flowing in the first flow line toward the third storage tank. For example, injection valve(s) opening/closing instructions 955 may actuate the opening and closing injection valves 661, 662 based on input data from flowmeter 633 indicating the flow of second fuel in flow line 674 in systems 605, 705, 805 depicted in FIGS. 6-8.

In an embodiment, the separator may include one or more devices, components, or equipment, such as one or more flow control devices operating, in an example, in conjunction with one or more sensors or meters and the controller 902. In such embodiments, the controller 902 may include instructions to monitor and/or obtain various parameters and, based on those parameters, separate a stream at various points in time. In such examples, the controller may determine, based on a number of injection parameters and/or other parameters (such as gravity, density, bbl for each selected cut, and/or flow rate) when (for example, a time to separate one type of fluid from another) and where (for example, a selected storage tank and/or transportation vehicle) to divert a selected cut. In another embodiment, the flow control device may be manually actuatable to enable a user to physically divert flow, thus allowing for redundancy and backup. The flow control device may include one or more of a pump, a valve, a control valve, diverters, or a manifold. The flow control device may ensure that a pipeline cut is directed to the proper storage tank based on the selected cut (for example, the selected comprising one of the renewable diesel, the diesel fuel or first and second diesel fuel, and/or the mixed interface at the head or tail of the renewable diesel). In an embodiment, the one or more sensors or meters may include gravitometers, densitometers, temperature sensors, pressure sensors or transducers, flow meters, sensors or meters to determine other compositional characteristics of a fluid, and/or other sensors or meters configured to measure some parameter of fluid flowing through a pipeline. Such one or more sensors or meters may be positioned proximate the flow control and/or at a selected distance from the flow control device. Thus, diversion may occur at a time to minimize blending a mixing interface with a diesel or renewable diesel.

Figure 10:
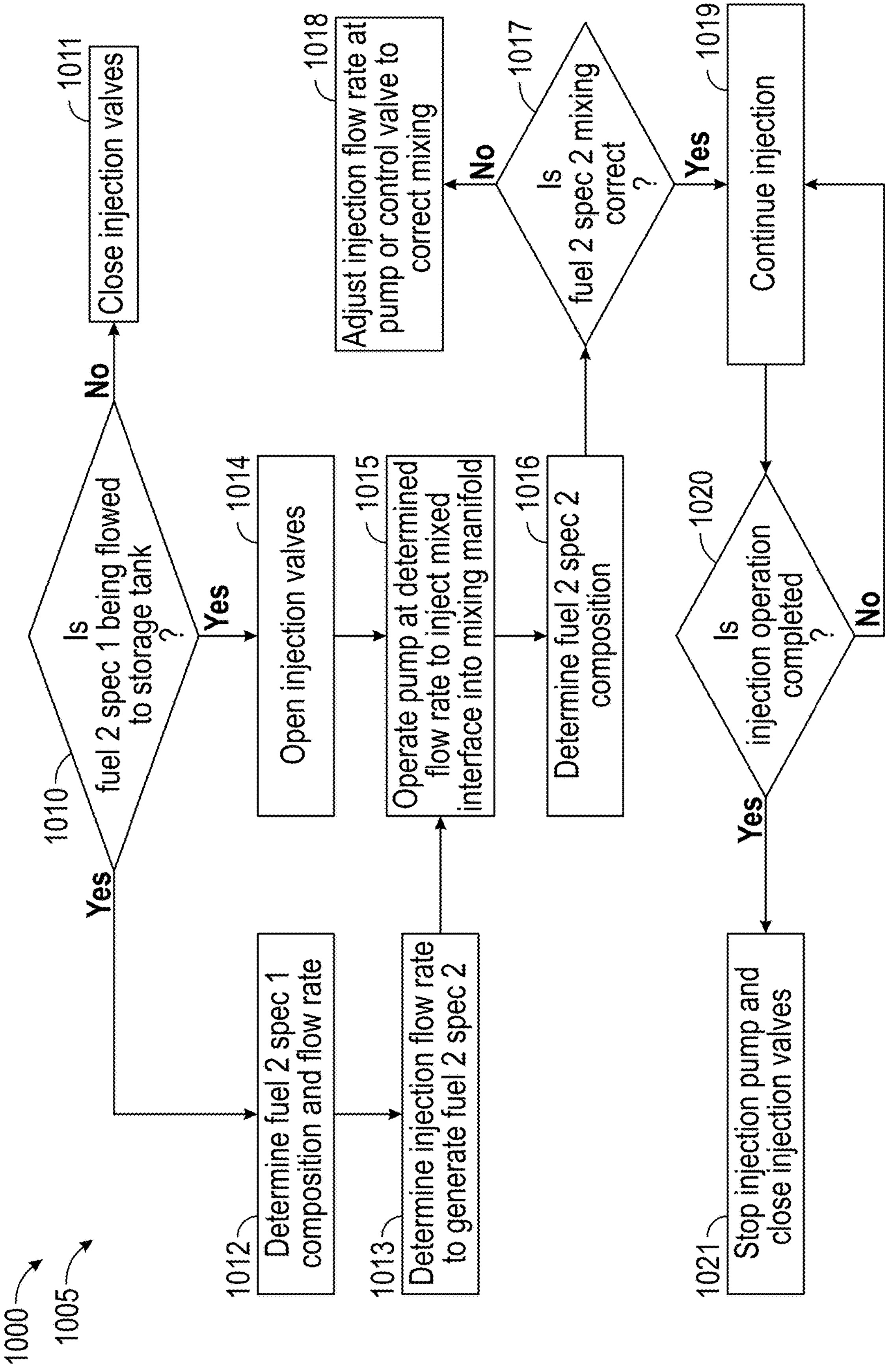
FIG. 10 is a flow diagram of controller operations in an injection control system and method for injecting a mixed interface stream generated by the transport of a first fuel through a pipeline into a compatible second fuel to produce a second fuel stream having a second target specification, according to an exemplary embodiment of the present disclosure.

FIG. 10 is a flow diagram, such as may be implemented by controller 902, of a method 1000 and system 1005 for controlling the injection of mixed interface volumes into compatible fuel volumes, according to an exemplary embodiment of the present disclosure. Method 1000 and system 1005 is detailed with reference to the controller 902 and injection control system 900 of FIG. 9. Unless otherwise specified, the actions of method 1000 may be completed, in an exemplary embodiment, within the controller 902, but may also be implemented in other systems and/or computing devices as will be understood by those skilled in the art. Specifically, method 1000 may be included in one or more programs, protocols, or instructions loaded into the memory 906 of the controller 902 and executed on the processor 904 or one or more processors of the controller 902. The order in which the operations are described is not intended to be construed as a limitation, and any number of the described blocks may be combined in any order and/or in parallel to implement the method 1000.

At block 1010, controller 902 may determine whether the second fuel having the first predetermined composition, first specification, or first composition (e.g., "Fuel 2 Spec 1") is being flowed to the storage tank. Such a determination by controller 902 may be made based on, for example, data received from flowmeter 633 indicating that a second fuel stream 684 is flowing through conduit 674 towards storage tank 623 in systems 605, 705, 805 depicted in FIGS. 6-8. If the controller 902 determines that fuel 2 spec 1 is not being flowed toward the storage tank, at block 1011, controller 902 may transmit a signal to one or more injection valves, such as injection valves 661, 662, to close the injection valves or maintain the injection valves in a closed state. If controller 902 determines that fuel 2 spec is being flowed toward the storage tank, at block 1012, controller 902 may determine the compositions and flow rate of fuel 2 spec 1. For example, controller 902 may base the determination of composition and flow rate based on data received from measurement devices 641, 642, 643 and flowmeters 631, 632, 633 or alternative input data or assumptions described above with respect to system 605 and method 600. At block 1013, controller 902 may determine the injection flow rate to generate fuel 2 spec 2 based on the methods described above for system 605 and method 600.

In parallel with performing the operations in blocks 1012, 1013, processor 902 may, upon determining that fuel 2 spec is being flowed toward the storage tank, open the injection valves, such as injection valves 661, 662, at block 1014. Controller 902 may also operate pump, such as pump 655, at the flow rate determined at block 1013 and through valves opened at block 1014 to inject the mixed interface stream into a fuel 2 volume in order to generate the second fuel having the second target composition or target specification (e.g., fuel 2 spec 2). For example, controller 902 may, in some embodiments, cause the flow of injection stream 687 through injection conduit 677 into mixing manifold 663.

At block 1016, controller 902 may determine the composition of fuel 2 spec 2, following mixing with the injection stream. For example, controller 902 may receive feedback data regarding the composition of fuel 2 spec 2 from measurement devices 646, 647, 748, 747, 847, as described above with respect to system 605, 705, 805. At block 1017, controller 902 may determine, based on the determination at block 1016, whether fuel 2 spec 2 actually does have the intended fuel 2 spec 2 composition and/or meets the second target specification. If controller 902 determines at block 1017 that fuel 2 spec 2 does not have the intended composition or target specification, then controller 902 may adjust the injection flow rate at block 1018 by sending a signal to the pump or control valves to adjust the flow rate of the injection stream. For example, controller 902 may send one or more signals to pump 665 and/or injection valves 661, 662 in order to adjust the flow rate of injection stream 687 conducted in injection conduit 677 towards mixing manifold 663. If at block 1017 the controller 902 determines that fuel 2 spec 2 does have the intended fuel 2 spec 2 composition and/or meets the second target specification, the controller continues the injection at block 1019 at the previously determined injection flow rate that was determined at block 1013.

At block 1020, the controller 902 determines whether the injection operation is completed. For example, controller 902 may receive feedback data regarding the continued flow of second fuel fraction stream 684 (e.g., fuel 2 spec 1 stream 684) from one or more flowmeters, such as flowmeter 633. If the feedback data indicates that the flow of fuel 2 spec 1 has ceased, controller 902 may send a signal to the injection pump, such as pump 665, to stop the injection flow of injection stream 687 and may also send a signal to injection valves, such as injections valves 661, 662 to close. If at block 1020, the controller 902 determines that the injection operation is not completed, for example, because controller 902 receives data indicating that fuel 2 spec 1 stream 684 is still flowing toward tank 623, controller 902 may continue the injection operation at block 1019.

In an embodiment, another method may include transporting the renewable diesel from a first pipeline terminal to a second pipeline terminal. Prior to injection or transport of the renewable diesel in a pipeline, a first diesel fuel may be injected into the pipeline. In other words, the first diesel fuel may be injected into the pipeline prior to injection of a head of the renewable diesel. Further, the method may include injecting the renewable diesel after the first diesel. Subsequently a second diesel may be injected into the pipeline. In other words, the method may include injecting a second diesel fuel subsequent to a tail of the renewable diesel. In other words, the renewable diesel may be wrapped head to tail with the first diesel and the second diesel, respectively. Once the first diesel, the renewable diesel, and the second diesel are injected into the pipeline, those components or fluids may flow, as separate fluids within the pipeline and, in embodiments, may form mixing interfaces (in other words, the portions where each diesel makes contact may experience some amount of mixing).

The method may further include restricting transport in the pipeline to diesel fuel compositions with a first specification. Such a first specification may include or may be characterized by a selected amount of the renewable diesel, or a component thereof (for example, about 3% total, 4% total, 5% total, or some other number or threshold corresponding to the amount of renewable diesel or other component allowable in the pipeline). As noted, the selected amount may be less than the selected amount allowed in a second target specification for one or more of the first diesel fuel or the second diesel fuel. In other words, the first diesel and/or the second diesel may follow a specification that includes larger amounts of renewable diesel or other components.

The method may also include separating, at the second pipeline terminal, a renewable diesel fraction stream, one or more diesel fuel fraction streams, and a mixed interface fraction stream. As noted, the mixed interface fraction stream may include a mixture of the renewable diesel and one or more of the first diesel fuel or the second diesel fuel. In an embodiment, such separation may be performed by a separator, The separator may include one or more valves, control valves, pumps, or manifolds. The separator may be controlled by a controller. The controller may determine when to cause the separator to allow a portion of the fluid to flow to a particular location or tank based on one or factors. For example, the controller may determine when a gravity or density of the fluid within the pipeline changes or exceeds and/or falls below a selected gravity or density range, respectively. Upon detecting such a change (for example, via measurements obtained via one or more sensors or meters), the controller may recognize that the next part of the diesel is reaching the second terminal. The controller may then cause the separator to allow another portion to flow to a second particular location or tank. Such operations may continue until all the fluids within the pipeline has been separated. For example, and as noted above, the first diesel may be separated, then the first mixing interface (in other words, a mixture of the first diesel and renewable diesel), then the renewable diesel, then the second mixing interface (in other words, a mixture of the second diesel and the renewable diesel), and then finally the second diesel. In other embodiments, various other fluids may be injected into the pipeline and separated as described above.

After such separation, the method may include combining at least a portion of the first and/or second interface with at least a portion of the first diesel and/or second diesel so as to produce a diesel fuel stream meeting the second target specification.

As used herein, the term "transmits a signal," or reference to other signal communications, in all their forms, refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, "transmits a signal" and other signal communications may involve or include one or more intermediate controllers, relays, or switches disposed between elements that are in signal communication with one another.

When ranges are disclosed herein, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, reference to values stated in ranges includes each and every value within that range, even though not explicitly recited. Thus, every point or individual value may serve as its own lower or upper limit combined with any other point or individual value or any other lower or upper limit, to recite a range not explicitly recited.

This application is a continuation of U.S. application Ser. No. 18/637,651, filed Apr. 17, 2024, titled "RENEWABLE DIESEL INTERFACE RECOMBINATION," which is a continuation of U.S. application Ser. No. 18/382,377, filed Oct. 20, 2023, titled "RENEWABLE DIESEL INTERFACE RECOMBINATION," now U.S. Pat. No. 11,994,259, issued May 28, 2024, which claims priority to and the benefit of U.S. Provisional Application No. 63/463,351, filed May 2, 2023, titled "RENEWABLE DIESEL INTERFACE RECOMBINATION," and U.S. Provisional Application No. 63/380,428, filed Oct. 21, 2022, titled "RENEWABLE DIESEL INTERFACE REINJECTION," the disclosures of which are incorporated herein by reference in their entireties.

Other objects, features and advantages of the disclosure will become apparent from the foregoing figures, detailed description, and examples. It should be understood, however, that the figures, detailed description, and examples, while indicating specific embodiments of the disclosure, are given by way of illustration only and are not meant to be limiting. In further embodiments, features from specific embodiments may be combined with features from other embodiments. For example, features from one embodiment may be combined with features from any of the other embodiments. In further embodiments, additional features may be added to the specific embodiments described herein.

What is claimed is:

1. A method of transporting a fuel through a pipeline, the method comprising:

injecting a first fuel through a pipeline after introducing a second fuel having a different composition than the first fuel into the pipeline;

forming a first mixed interface volume comprising a portion of the first fuel and a portion of the second fuel;

after injecting the first fuel into the pipeline, injecting another portion of the second fuel into the pipeline;

forming a second mixed interface volume comprising another portion of the first fuel and another portion of the second fuel;

separating the first mixed interface volume and the second mixed interface volume from the first fuel and the second fuel; and combining at least a portion of the second fuel with at least one of the first mixed interface volume or the second mixed interface volume to produce a target fuel composition.

2. The method of claim 1, wherein the target fuel composition is different from the composition of the second fuel.

3. The method of claim 1, wherein injecting a first fuel through a pipeline comprises injecting the first fuel immediately after and immediately before injecting the second fuel.

4. The method of claim 1, wherein separating the first mixed interface volume and the second mixed interface volume from the first fuel and the second fuel comprises separating the first mixed interface volume and the second mixed interface volume from the first fuel and the second fuel based on density.

5. The method of claim 1, further comprising determining compositional characteristics of the first fuel and the first mixed interface volume with one or more sensors.

6. The method of claim 1, wherein the composition of the second fuel comprises a maximum of 2 percent by volume of the first fuel.

7. The method of claim 6, wherein the target fuel composition comprises 60 percent or less of a maximum amount of the first fuel allowed in the second fuel.

8. The method of claim 1, wherein the first fuel comprises biodiesel or renewable diesel.

9. The method of claim 1, wherein the first fuel comprises less than 15 ppm sulfur.

10. The method of claim 1, wherein the first fuel has an aromatic hydrocarbon content less than 10 percent by volume.

11. The method of claim 1, wherein the first fuel comprises a renewable fuel.

12. The method of claim 1, wherein combining the volume of the second fuel with at least one of the first mixed interface volume or the second mixed interface volume to produce a target fuel composition comprises injecting the at least one of the first mixed interface volume or the second mixed interface volume from a tank into the second fuel to produce the target fuel composition.

13. The method of claim 1, further comprising measuring one or more chemical or physical characteristics of the first mixed interface volume and the second mixed interface volume.

14. The method of claim 1, further comprising measuring one or more chemical or physical characteristics of the second fuel.

15. The method of claim 1, wherein the mixed interface volume comprises a 50/50 mixture by volume of the first fuel and the second fuel.

16. The method of claim 1, wherein the first fuel maintains a qualifying status for a renewable identification number credit.

17. The method of claim 1, wherein substantially all of the first mixed interface volume and the second mixed interface volume is mixed with the volume of the second fuel and not lost as trans-mix.

18. A method of controlling injection of a mixed interface fuel volume, the method comprising:

flowing a first fuel towards a first storage tank;

responsive to determining that a second fuel is flowing towards a second storage tank, determining a composition and flow rate of the second fuel, the second fuel and the first fuel forming a mixed interface fuel comprising the first fuel and the second fuel;

storing the mixed interface fuel in a third storage tank;

determining an injection flow rate of the mixed interface fuel from the third storage tank into the second fuel to generate a mixed fuel having a target composition;

injecting the mixed interface fuel from the third storage tank into the second fuel to form a mixed fuel;

determining a composition of the mixed fuel; and comparing the composition of the mixed fuel to the target composition.

19. The method of claim 18, further comprising adjusting the flow rate of the mixed interface fuel responsive to the composition of the mixed fuel different from the target composition.

20. The method of claim 18, wherein determining the composition and flow rate of the second fuel comprises determining the composition and the flow rate based on data received from sensors.

21. A controller for transporting two fuels through a pipeline, the controller comprising:

a processor and a machine-readable storage medium storing instructions thereon that, when executed by the processor, cause the processor to:

determine a composition and an amount of a first fuel pumped through a pipeline;

determine a composition and an amount of a second fuel pumped through the pipeline;

determine a composition of a mixed interface volume between the first fuel and the second fuel;

cause the mixed interface volume to be stored in a tank; and determine a flow rate of the mixed interface volume from the tank to mix with the second fuel to form a fuel having a target composition.

* * * * *